United States Patent [19]

Tabuchi et al.

[11] Patent Number: 5,175,630

[45] Date of Patent: Dec. 29, 1992

[54] APPARATUS FOR RECORDING AND REPRODUCING HIGH RESOLUTION IMAGE VIDEO SIGNALS HAVING DIFFERENT SIGNAL BANDWIDTHS

[75] Inventors: Toshiaki Tabuchi; Kyoji Kasuga, both of Nara; Michiyuki Sugino, Tokyo; Takayoshi Yamaguchi, Chiba, all of Japan

[73] Assignee: Sharp Kabushiki Kaisha, Osaka, Japan

[21] Appl. No.: 531,381

[22] Filed: Jun. 1, 1990

[30] Foreign Application Priority Data

Jun. 20, 1989 [JP] Japan .................. 1-158075

[51] Int. Cl.⁵ .......................... H04N 5/78
[52] U.S. Cl. ................... 358/330; 358/310; 360/73.04; 360/73.09; 360/64
[58] Field of Search ............ 358/330, 310; 360/73.04, 73.09, 64

[56] References Cited

U.S. PATENT DOCUMENTS

| | | | |
|---|---|---|---|
| 4,293,880 | 10/1981 | Tsukada et al. | 360/64 |
| 4,719,518 | 1/1988 | Kido et al. | 358/330 |
| 4,730,222 | 3/1988 | Schauffele | 358/310 |
| 5,057,944 | 10/1991 | Ozaki et al. | 360/64 |

FOREIGN PATENT DOCUMENTS 0080297 6/1983 European Pat. Off. .
0227210 7/1987 European Pat. Off. .

OTHER PUBLICATIONS

Itoga et al., "Two Channel FM Recording for High-Definition Baseband Signals", 1988 IEEE, pp. 78-83.
Itoga et al., "Wideband Recording Technology for High-Definition Baseband VCR's", 1987 IEEE, pp. 203-209.

Primary Examiner—Roy N. Envall, Jr.
Assistant Examiner—P. W. Huber
Attorney, Agent, or Firm—Nixon & Vanderhye

[57] ABSTRACT

An apparatus for selectively recording a baseband signal and a MUSE signal on a magnetic tape and for reproducing them at different speeds including: a magnetic head circuit having first and second groups of heads provided separately form each other. Each of the head groups includes four rotary heads for consecutively and helically scanning the tape to record and reproduce the baseband and MUSE signals. The apparatus further includes: an apparatus for providing a mode designating signal for designating an operational mode of the apparatus; a signal processing circuit which can process the baseband and MUSE signals, in response to the mode designating signal, for processing one of the baseband and MUSE signals; a head switching circuit for switching the connection between the signal processing circuit and the respective rotary heads in response to the mode designating signal; and a scanning speed adjusting circuit for adjusting the relative scanning speed of the rotary head and the recording tape in response to the mode designating signal. The apparatus can appropriately switch the scanning speed and the connection between the rotary heads and the signal processing circuit according to the type of signal and operational mode. Thus, the baseband signal is recorded as a two channel signal on the magnetic tape and the MUSE signal is recorded as a one channel signal. Also, the apparatus can reproduce the baseband and MUSE signals recorded according to the above-described track pattern at a different speeds, respectively.

28 Claims, 26 Drawing Sheets

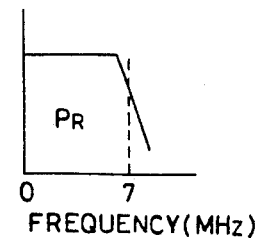
FIG.3 (a)
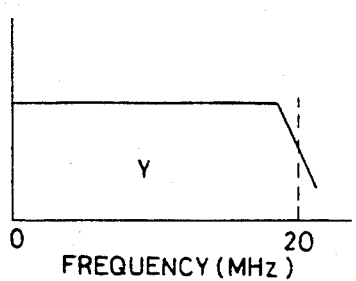
FIG.2
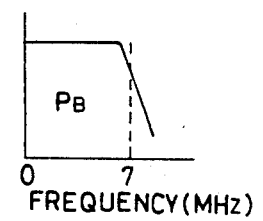
FIG.3 (b)
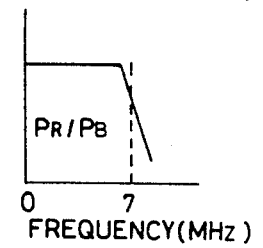
FIG.3 (c)
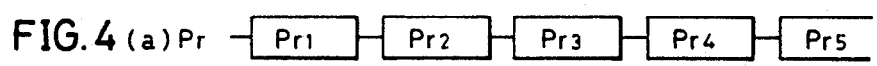
FIG.4 (a) Pr
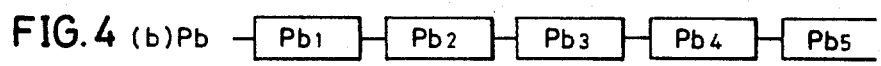
FIG.4 (b) Pb
FIG.4 (c)
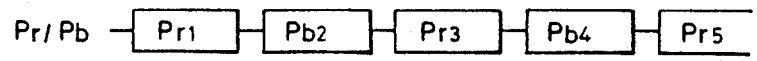
Pr/Pb

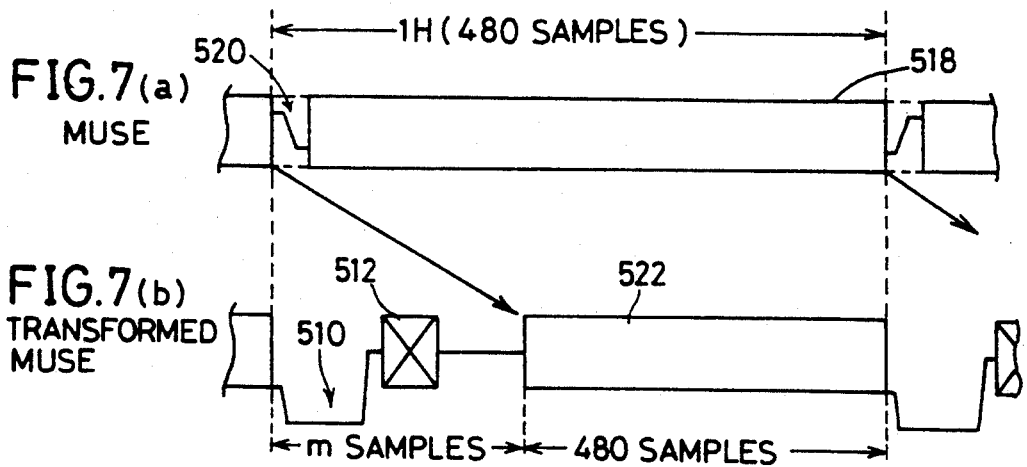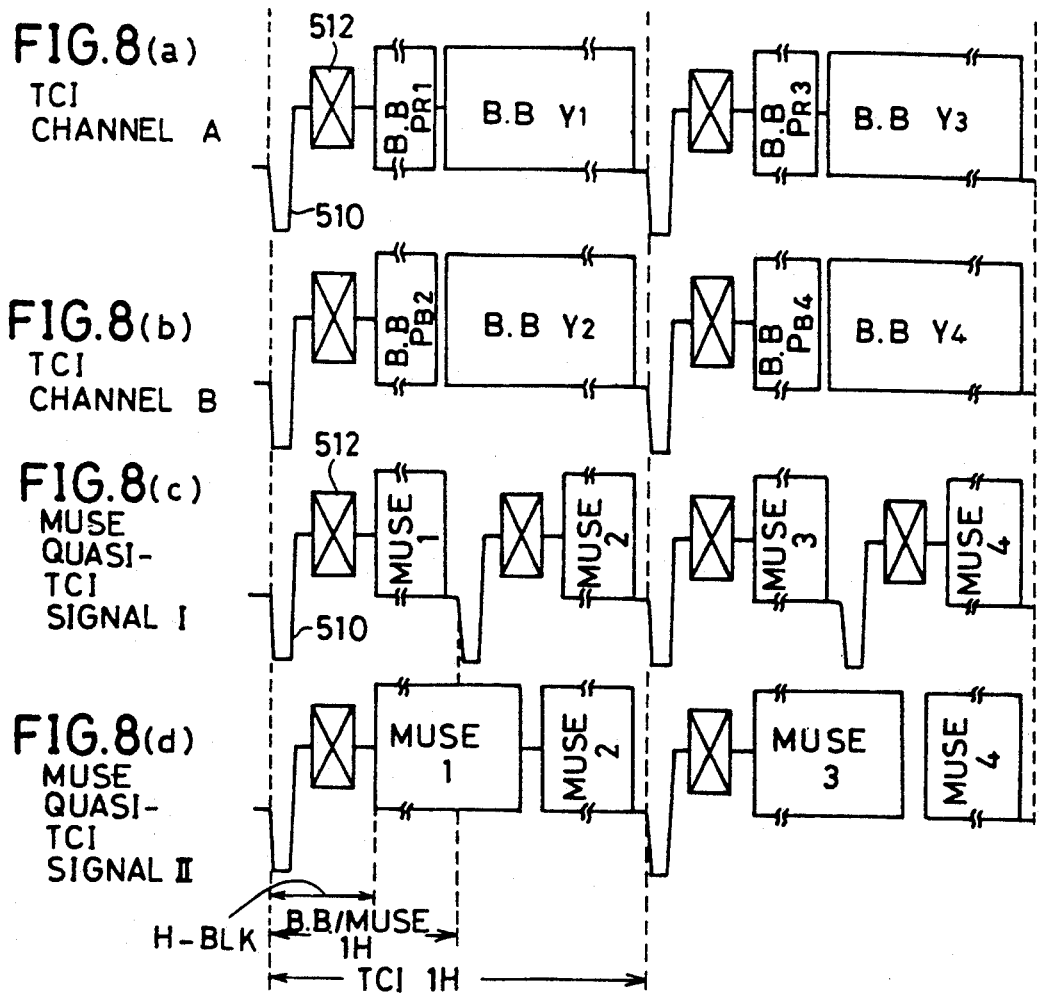

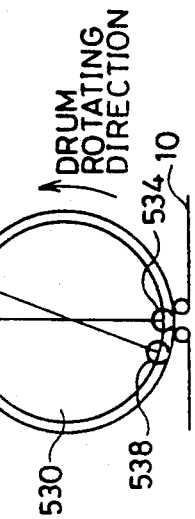
FIG.15
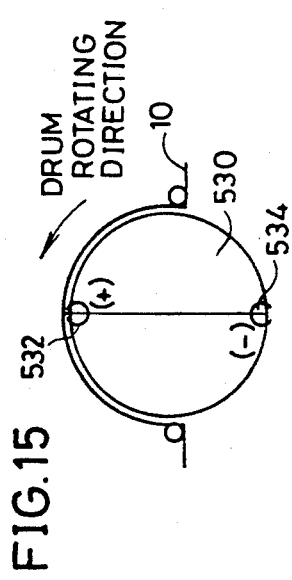
FIG.16(a)
FIG.16(b)
FIG.16(c) (+)AZIMUTH HEAD
FIG.16(d) (-)AZIMUTH HEAD
FIG.16(e)
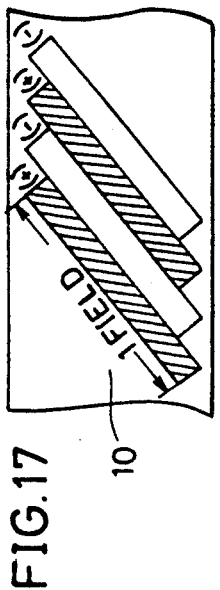
FIG.17
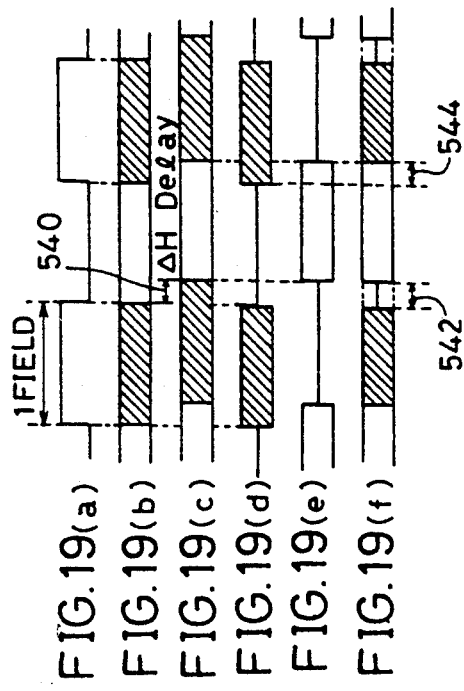
FIG.18
FIG.19(a)
FIG.19(b)
FIG.19(c)
FIG.19(d)
FIG.19(e)
FIG.19(f)

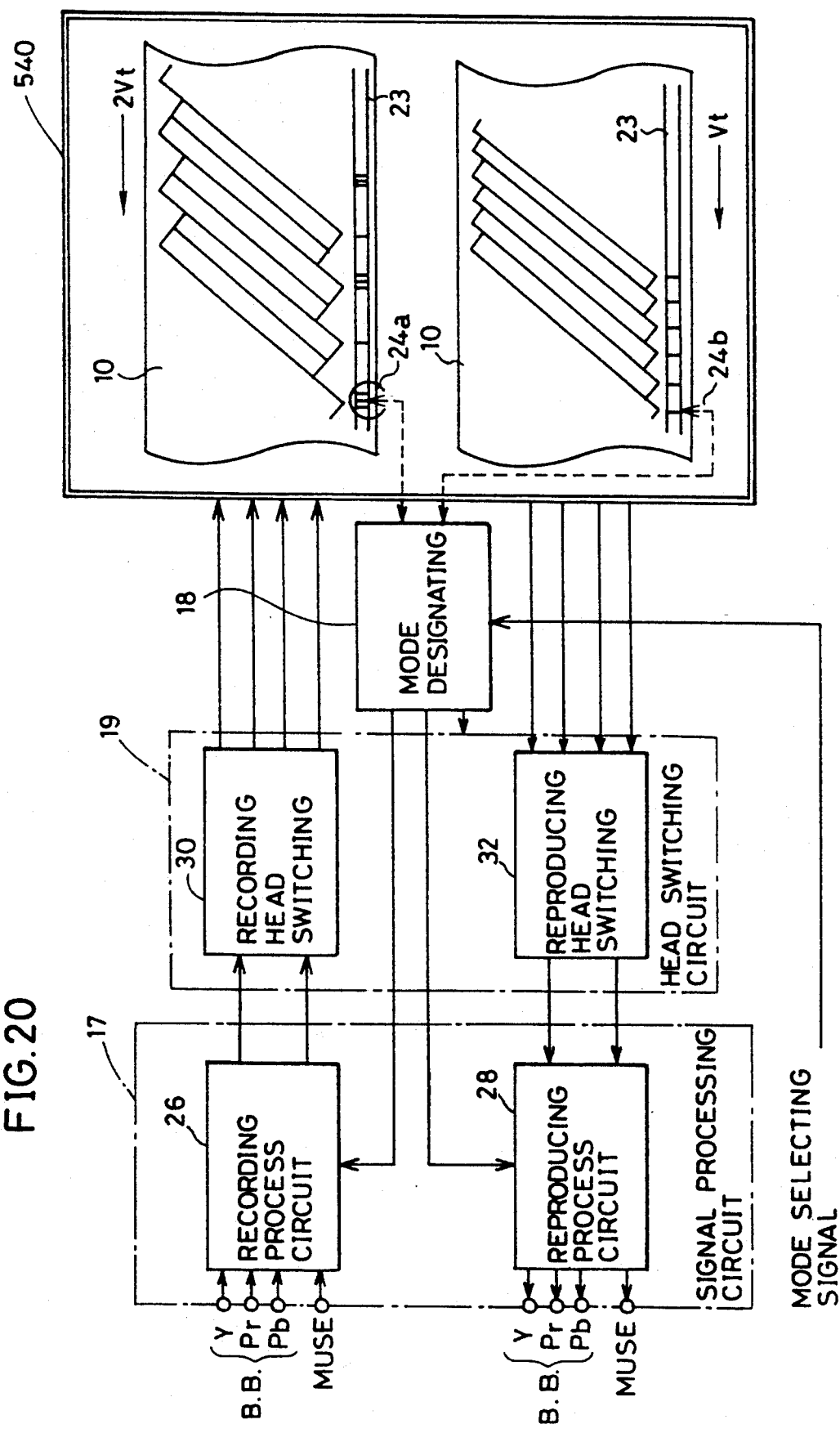

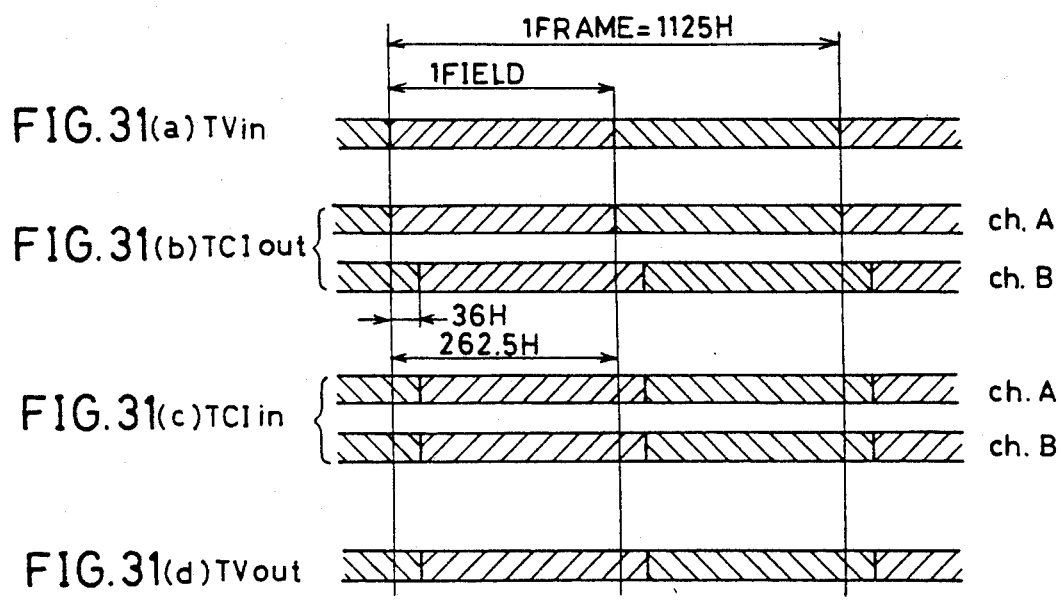
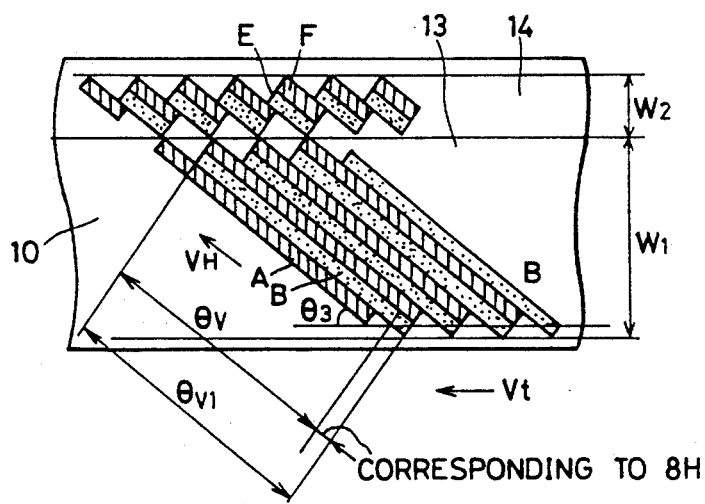

FIG.31B(a) ROTARY HEAD 2 PLAY1

FIG.31B(b) ROTARY HEAD 3 PLAY2

FIG.31B(c) COMBINED SIGNAL

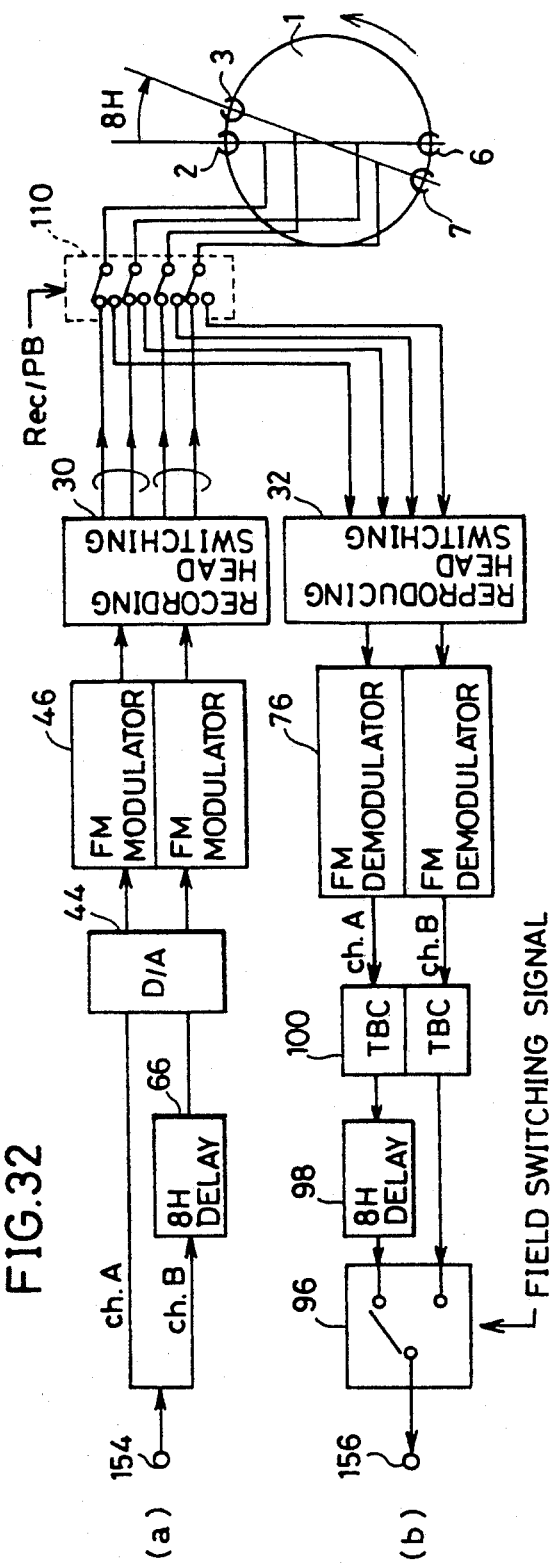
FIG.32
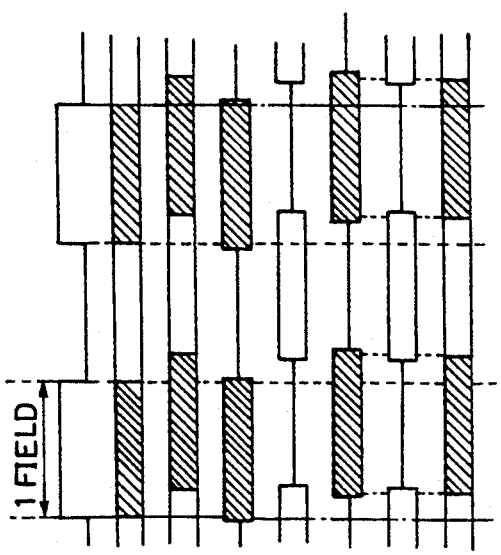
FIG.33(a)
FIG.33(b)
FIG.33(c)
FIG.33(d)
FIG.33(e)
FIG.33(f)
FIG.33(g)
FIG.33(h)

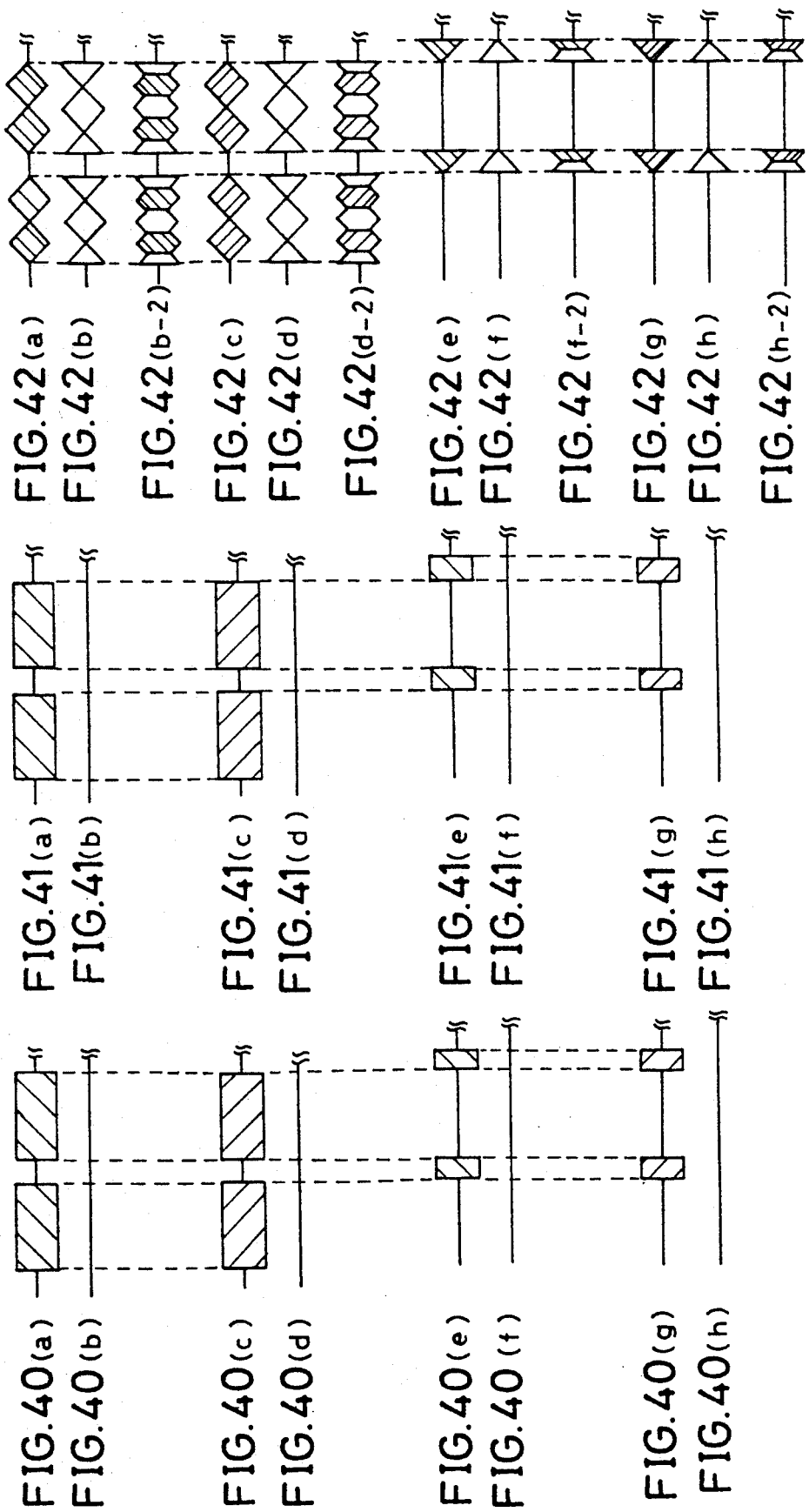

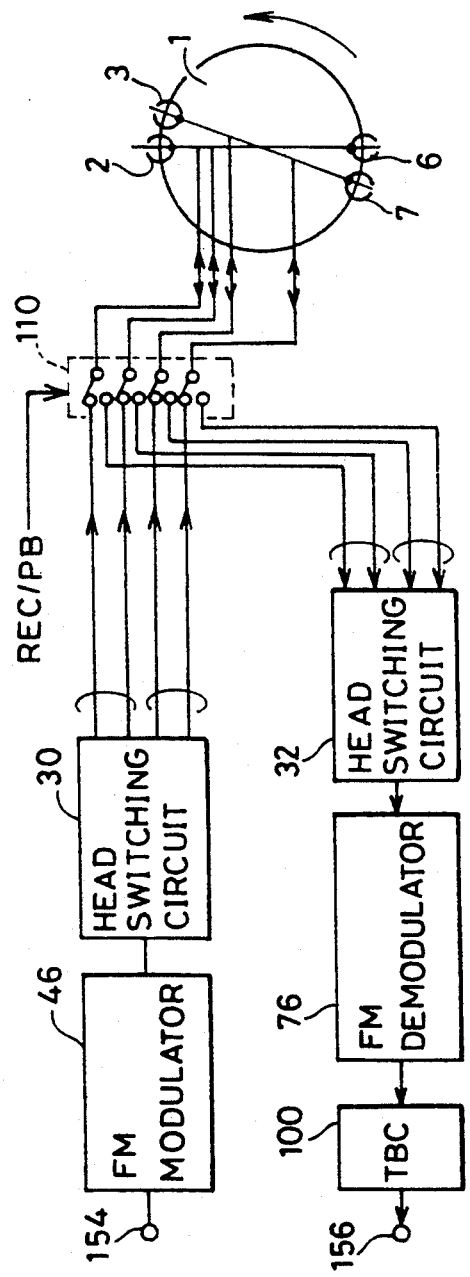
FIG.43
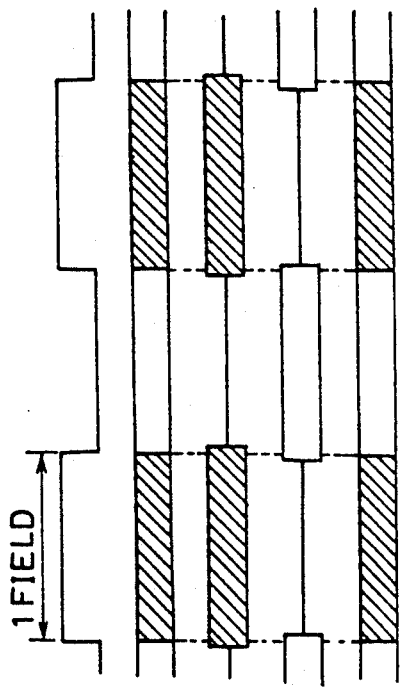
FIG.44(a)
FIG.44(b)
FIG.44(c)
FIG.44(d)
FIG.44(e)

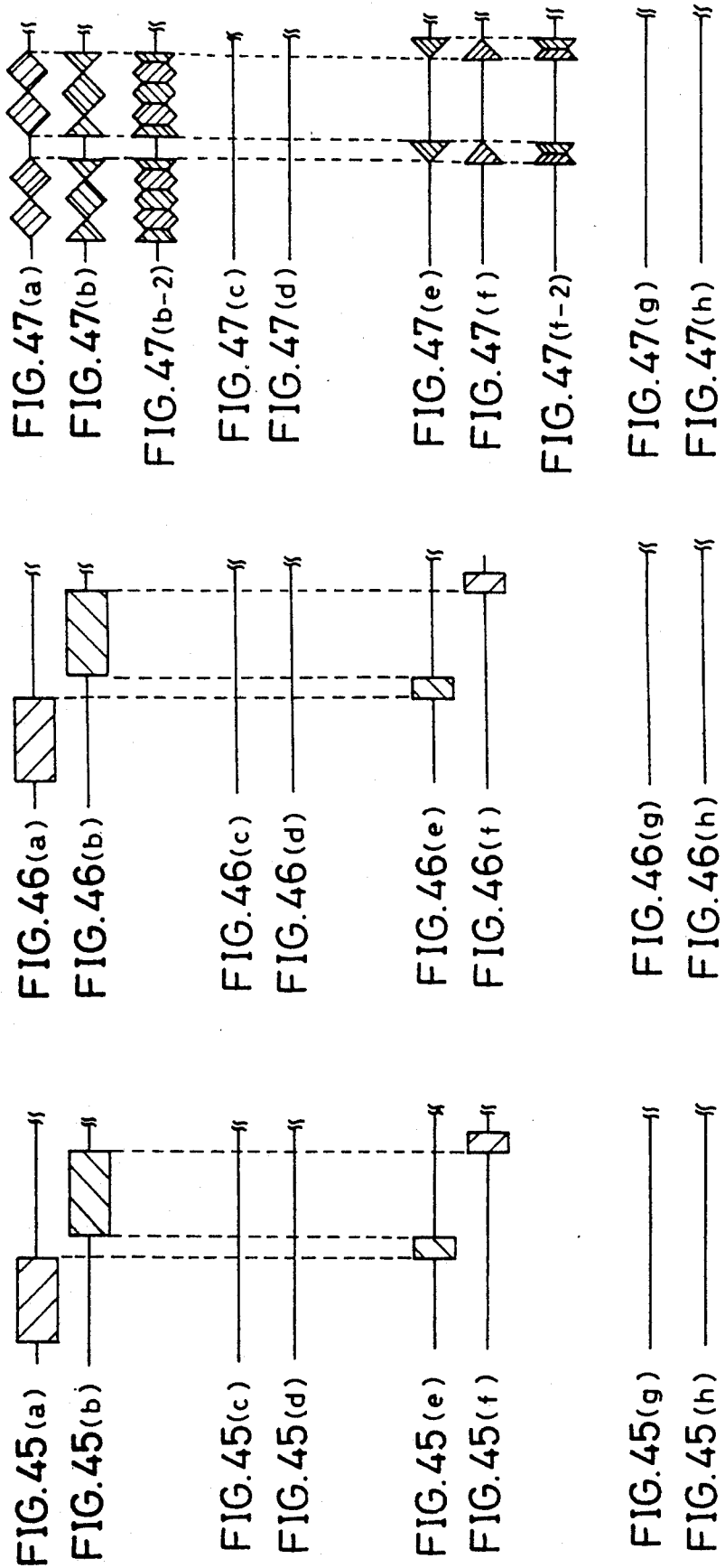

APPARATUS FOR RECORDING AND REPRODUCING HIGH RESOLUTION IMAGE VIDEO SIGNALS HAVING DIFFERENT SIGNAL BANDWIDTHS

BACKGROUND OF THE INVENTION

1. Field of the Invention

The present invention relates to an apparatus for recording and reproducing video signals, or a video tape recorder (VTR), and more particularly, to an apparatus which can record and reproduce both of the MUSE (Multiple Sub-Nyquist Sampling Encoding) signals employed mainly for satellite broadcasting and the baseband signals frequently employed for studio use, video theater or as input signals from a video camera.

2. Description of the Related Art

Recently, a demand for high resolution television image has been rapidly increasing. To satisfy the demand, a so-called HD-TV (High-Definition Television) and satelite broadcasting employing signals with broader bandwidth than that of a conventional system are in a practical phase.

The baseband signals employed in the HD-TV system have a signal bandwidth more than 20 MHz to obtain high-definition image. Compared to bandwidths of current NTSC signals (4.2 MHz) and PAL signals (5.5 MHz), this bandwidth is about 4-5 times broader. Note that all the values above-mentioned are of luminance signals.

To record/reproduce the video signal with such broad bandwidth, it is required that the relative speed in scanning of a magnetic tape by a magnetic head and the rotation speed of a rotary drum holding the magnetic head are considerably increased.

For example, in a current VTR, the relative speed of a magnetic head and a magnetic tape is 5.767 m/s in the VHS system, and 6.993 m/s in the $\beta$ system. The rotation speed of a current rotary drum is 1800 r.p.m. Meanwhile, to record the baseband signals on a magnetic tape, the relative speed of the magnetic head and the magnetic tape have to be increased to two to four times greater than the current one, and the rotation speed of the drum is required to be increased to two to four times, i.e., 3,600-7200 r.p.m. Furthermore, to reduce the recording bandwidth, one track on a recording medium is divided into two channels to reduce the bandwidth per channel by half.

For example, in the case where a bandwidth of a baseband signal is 24 MHz, by dividing a track into two channels, the bandwidth per channel can be reduced to 12 MHz.

The MUSE signal is a signal transmission system developed for broadcasting high resolution image in the satellite broadcasting having limitation of available bandwidth. Accordingly, in transmission by the MUSE signal, the baseband signal is bandwidth-compressed to 8.1 MHz. Roughly speaking, the signal bandwidth required for recording/reproducing the MUSE signal can be less than half the signal bandwidth for processing the baseband signal.

An example of a VTR for recording baseband signals in the HD-TV system is disclosed by Masami Itoga et al in "Wideband Recording Technology for High-Definition Baseband VCRs" (1988, IEEE Vol. CE-33, No. 3, pp. 203-209).

One example of a VTR for recording the MUSE signal is as follows. The bandwidth of the MUSE signal is about two times wider than that in a conventional NTSC system. In a proposed VTR, the rotation speed of a rotatory drum is twice that of a conventional household VTR. One field period of video signal is divided into two segments and recorded on a magnetic tape in one channel. A VTR according to this system can record/reproduce signals over a longer time period than one specialized in the baseband signal.

As described above, the signal bandwidths of the baseband signal and the MUSE signal are considerably different from each other. Therefore, conventionally, apparatuses specialized in recording the baseband signal and apparatuses specialized in recording the MUSE signal have been separately manufactured.

However, as the satellite broadcasting and video theater having high resolution image employing the baseband signal are increasingly spreading, a demand for a VTR for utilizing them at home increases. Providing both apparatuses specialized in the baseband signal and the MUSE signal costs too much for use at home. Also, the space used by the apparatuses for processing respective signals should be saved.

SUMMARY OF THE INVENTION

The present invention is intended to solve the above-mentioned problems, and one object of the present invention is to provide an apparatus which can record/reproduce high resolution video signals of more than two kinds with considerably different signal bandwidths, such as a MUSE signal and a baseband signal.

Another object of the present invention is to provide an apparatus which can record/reproduce both of the two video signals with considerably different signal bandwidths and reproduce both signals at high speed.

Still another object of the present invention is to provide an apparatus with simple structure which can record both of two video signals with considerably different signal bandwidths and reproduce them at different speeds.

An additional object of the present invention is to provide an apparatus which can record both signals on a recording medium and reproduce the same, by recording a signal with broad bandwidth in two channels and recording a signal with narrow signal bandwidth in one channel.

A still additional object of the present invention is to provide a head structure and a signal processing circuit which can record signals on the recording medium in one channel or two channels according to the type of signals to be processed.

Another object of the present invention is to provide an apparatus which can record signals of more than one kind having considerably different signal bandwidths on a recording medium with high density, and reproduce the same.

The above-mentioned objects can be achieved by providing an apparatus including: a magnetic head unit having a first and a second head portions provided separately from each other, a circuit for supplying a mode designating signal for designating operational mode of the apparatus, and a signal processing circuit which can process a first signal having a first frequency bandwidth and a second signal having a second frequency bandwidth narrower than half of the first frequency bandwidth, for processing one of the above-mentioned two signals in response to the mode designating signal. Each of the head portions includes four rotary heads for recording and reproducing the first and second signals on a recoding medium by subsequently performing helical scanning on the recording medium. The apparatus further includes a head switching circuit for switching the connection between the signal processing circuit and the rotary heads in response to the mode designating signal, and a scanning speed adjusting apparatus for adjusting the relative speed of scanning of the rotary head and the recording medium in response to the mode designating signal.

In an apparatus according to the present invention, a suitable combination of rotary heads for recording/reproducing the signals is selected according to the type of the signal and the operational mode. The signals to be recorded or the reproduced signals are processed by the signal processing circuit which functions in accordance with the type of the signal and the operational mode. The scanning speed is changed according to the operational mode. Accordingly, this apparatus can record and reproduce both of the first and the second signals and also can reproduce both of the above-mentioned signals at different speeds.

In accordance with a preferred embodiment of the present invention, both of the first and the second signals include video signals having a plurality of frame periods. The respective frame periods include two field periods. The relative speed of scanning is selected so that a length of the recording medium corresponding to one field period is scanned by one revolution of the rotary heads.

In the apparatus above described, as a length corresponding to one field period is recorded on a recording medium in one scanning, the video signal can be reconstructed without complicated process when reproduced. Accordingly, the structure of the apparatus can be simple.

According to a more preferred embodiment in accordance with the present invention, respective rotary heads are provided to rotate around a common rotation axis. As to the first, second, third and fourth rotary heads in the second head portion, each of them is paired with the four rotary heads in the first head portion, the first, second, third, fourth ones, respectively. The two rotary heads paired with each other are provided having a predetermined phase difference, preferably 180°, about the rotation axis.

In the above-mentioned apparatus, a main track is formed by the rotary head in the first head portion and a subtrack is formed by the corresponding rotary head in the second head portion respectively, on the recording medium. By selecting the rotary head pairs in suitable combinations, the track patterns to be formed can agree with one recorded by a conventional apparatus.

According to a further preferred embodiment of the present invention, the apparatus includes a guiding mechanism for guiding the recording medium around the magnetic head so that the length of the recording medium corresponding to the phase difference between the first and the second rotary head can be scanned in addition to the length corresponding to one field period.

In the above-mentioned apparatus, when recording the second signal in one channel, if the first and the second rotary heads are employed alternately for each field, the signal can be fully recorded on the recording medium without delaying the signals supplied to the second rotary head. By employing the first and the second rotary heads alternately for each field when reproducing, the phase difference included in the recorded signal is canceled by the phase difference of the reproducing heads. As it is not required to divide the signals into two portions and delay one of them when processing the second signals, the apparatus can be implemented with a very simple the structure.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing a frequency bandwidth of a luminance signal of the baseband signal.

FIG. 3(a-c) is a diagram showing the frequency bandwidths of two chrominance signals Pr, Pb and a line-sequential chrominance signal Pr/Pb.

FIG. 4(a-c) is a schematic diagram showing the principle of the line-sequencing process of chrominance signal.

FIG. 7(a-b) is a waveform diagram schematically showing the time-transformation of a MUSE signal.

FIG. 8(a-d) is a waveform diagram showing waveforms of TCI transformed baseband signals and quasi TCI transformed MUSE signals.

FIG. 15 is a schematic plan view of a rotary drum having two rotary heads with different azimuth angles.

FIG. 16(a-e) is a schematic diagram showing the relationship between signals to be recorded and signals to be supplied to the respective heads.

FIG. 17 is a schematic diagram of a track pattern formed on the recording medium by the two heads.

FIG. 18 is a schematic plan view of a rotary drum having two groups of heads, each of which has two heads arranged with a predetermined phase displacement.

FIG. 19(a-f) is a schematic timing chart showing omissions of signals which occur when two heads arranged with phase difference are alternately used for each field.

FIG. 20 is a block diagram showing a principle structure of the preferred embodiment of the present invention.

FIG. 31(a-d) is a timing chart showing the relation between signals in recording/reproducing the baseband signals in two channels.

FIG. 32(a-b) is a block diagram of a MUSE signal recording/reproducing circuit formed in the apparatus according to the preferred embodiment of the present invention, when processing of MUSE signals is selected.

FIG. 33(a-h) is a timing chart showing the relation between the respective signals in recording the MUSE signals.

FIGS. 34 and 34A are schematic diagrams of track patterns formed on the recording medium in another preferred embodiment of the present invention.

FIG. 40(a-h) is a waveform diagram of signals supplied to the respective rotary heads in recording the baseband signal.

FIG. 41(a-h) is a waveform diagram of signals outputted from the respective rotary heads in reproducing the baseband signals at normal speed.

FIG. 42(a-h) is a waveform diagram of signals outputted from the respective rotary heads in reproducing the baseband signals at high speed, and a reproduced signal obtained by alternately selecting one of the outputted signals.

FIG. 43 is a block diagram of a circuit for processing the MUSE signal formed in an apparatus according to the second preferred embodiment of the present invention when the processing of the MUSE signal is selected.

FIG. 44(a-e) is a timing chart showing the relation between signals recorded/reproduced in the second preferred embodiment of the present invention.

FIG. 45(a-h) is a waveform diagram of signals supplied to the respective rotary heads in recording the MUSE signals.

FIG. 46(a-h) is a waveform diagram of signals outputted from the respective rotary heads in reproducing the MUSE signals.

FIG. 47(a-h) is a waveform diagram showing signals outputted from the respective rotary heads when reproducing the MUSE signals at doubled speed and a reproduced signal obtained by alternately selecting one of the outputted signals.

DESCRIPTION OF THE PREFERRED EMBODIMENTS

Basic Concept of the Present Invention

The embodiments of the present invention relate to systems which can record and reproduce both of baseband signals and MUSE signals. Before describing the embodiments, to make the embodiments understood easily, respective principles of signal processing of the baseband signal and the MUSE signal will be described.

Baseband Signal

In the HD-TV system, the baseband signal is obtained by transforming RGB signals into a luminance signal Y and chrominance signals Pr, Pb by matrix process. The bandwidth of the luminance signal Y is 20 MHz and the bandwidths of the chrominance signals Pr, Pb are about 7 MHz, respectively. The baseband signal has so wide bandwidth that it can not be recorded magnetically. Therefore, conventionally, the baseband signal is first bandwidth-narrowed by TCI and channel dividing processes, and then frequency-modulated, magnetic-recorded and reproduced.

Figure 1:
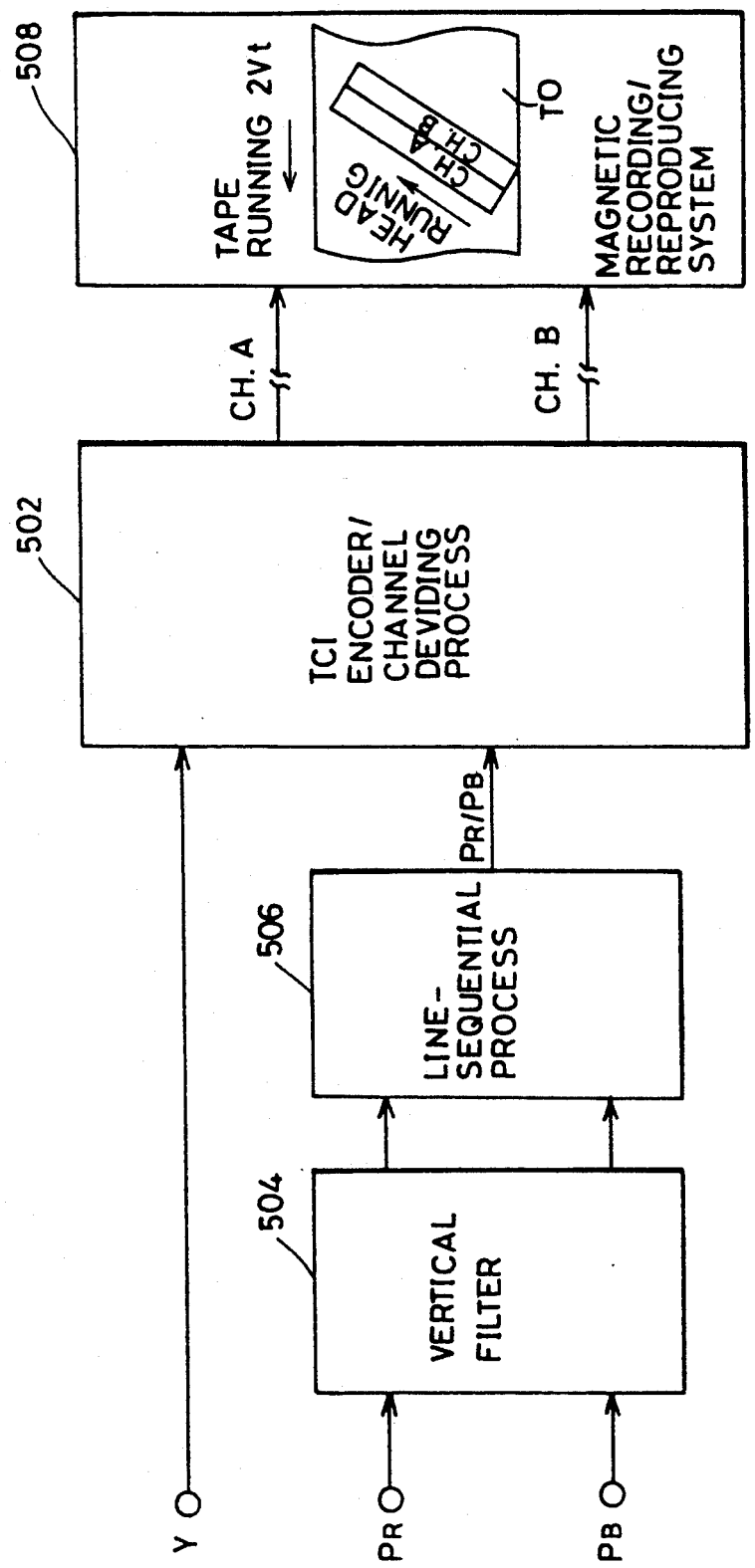
FIG. 1 is a schematic diagram showing a principle of two-channel recording of the baseband signal.

Referring to FIG. 1, a system for narrowing the bandwidth of the baseband signal includes a vertical filter 504 for receiving chrominance signals Pr and Pb and for limiting the bandwidth of the respective chrominance signals, a line sequential process circuit 506 for receiving the chrominance signals Pr and Pb bandwidth-limited by the vertical filter 504, and for outputting the chrominance signals Pr and Pb alternately for each line, thereby performing a so called line sequential process, and a TCI encoder/channel dividing process circuit 502 receiving chrominance signal Y and the line sequential chrominance signal Pr/Pb for TCI transforming the same, and for dividing the same in two channels, for example, the channels A and B. The channels A and B of the signals outputted from the circuit 502 are, after being frequency-modulated, recorded simultaneously and in parallel on a magnetic tape 10.

As previously described, referring to FIG. 2, the bandwidth of the luminance signal Y is 20 MHz. Referring to FIGS. 3 (a) and (b), the bandwidths of the chrominance signals Pr, Pb are 7 MHz respectively. Therefore, to record these signals intactly, a frequency bandwidth of 34 MHz is required. Signals with such wide frequency bandwidths can not be magnetically recorded intactly. Therefore, it is required that their frequency bandwidths should be narrowed down.

What is known as a "line sequential process" is one of methods for narrowing down the frequency bandwidth. Referring to FIG. 4 (a), the chrominance signal Pr is a signal formed of consecutive signals Pr1, Pr2, Pr3, . . . for respective lines. Referring to FIG. 4 (b), the chrominance signal Pb is also a signal formed of consecutive chrominance signals Pb1, Pb2, Pb3 ... for respective lines. The line sequential process circuit 506 outputs the chrominance signals Pr and Pb alternately for each line. Accordingly, in an output from the line sequential circuit 506, the chrominance signals Pr and Pb are sequenced alternately for each line as the signal Pr/Pb shown in FIG. 4 (c). Because the line sequential process circuit 506 merely outputs the chrominance signal Pr and the chrominance signal Pb alternately for each line, the bandwidth of the line sequential chrominance signal Pr/Pb remains 7 MHz as shown in FIG. (c). Thus, the frequency bandwidth of the baseband signal to be recorded is narrowed down to 27 MHz.

By performing the line sequential process, the sampling frequency in a vertical direction of the respective chrominance signals Pr and Pb is reduced by half. If the bandwidths of the respective chrominance signals Pr and Pb are not limited in advance to reduce the vertical resolution, the chrominance signals cannot be correctly reproduced. The vertical filter 504 is provided for that purpose, limits the bandwidths of the received chrominance signals Pr and Pb, and provides the same to the line sequential process circuit 506.

The luminance signal Y, the chrominance signals Pr, Pb provided to the processing circuit of the baseband signal shown in FIG. 1 are analog/digital (A/D) converted in advance. The TCI waveform outputted from the circuit 502 is also a digital signal having such waveform as shown in FIG. 5, which is frequency-modulated and provided to the magnetic recording/reproducing system 508 after digital/analog (D/A) converted.

Figure 5:
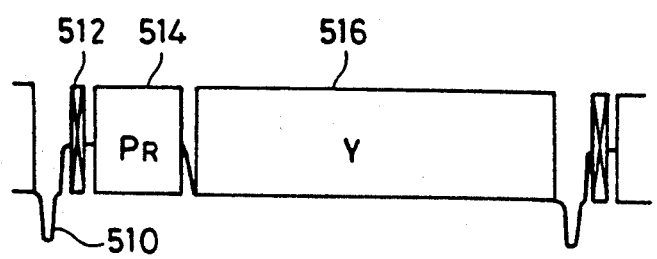
FIG. 5 is a waveform diagram of a TCI (Time Compressed Integration) encoded baseband signal.

Referring to FIG. 5, the TCI signal waveform outputted from the circuit 502 includes a negative H-sync signal 510, a burst signal 512, a chrominance signal portion 514, and a luminance signal portion 516. Examples of frequency of a master clock and effective sample number in TCI encoding for obtaining the TCI signal waveform shown in FIG. 5 are shown in the Table 1.

TABLE 1

| Y signal sampling frequency | 48.6 MHz |
|---|---|
| Pr/Pb signal sampling frequency | 16.2 MHz |
| Y signal sample number (effective) | 1440 (1260) |
| Pr/Pb signal sample number (effective) | 480 (420) |
| TCI signal sampling frequency | 30.375 MHz |
| TCI signal sample number (effective) | 1800 (1680) |

Figure 6A:
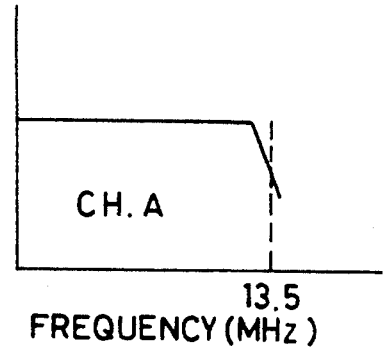
FIG. 6(a-b) is a diagram showing bandwidths of a baseband signal divided into two channels.
Figure 6B:
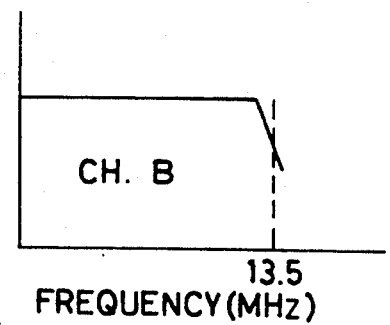

By performing TCI encoding according to the values shown in the Table 1, the luminance signal Y is bandwidth-expanded by 1/1.6 and the line sequential chrominance signal Pr/P is bandwidth-compressed by 1/0.533. The bandwidth per one channel of the TCI output signal is narrowed down with the luminance signal Y and expanded with the chrominance signal Pr/Pb, and becomes about 13.5 MHz in both cases. That is to say, referring to FIG. 6, both of the channels A and B have frequency bandwidth of 13.5 MHz.

After that, the TCI signals of two channels having respective frequency bandwidths of 13.5 MHz are recorded through an amplifier according to a track format of "two channels per one track" as shown in FIG. 1.

In the following description, it is assumed that the TCI transforming process of the baseband signal includes all of the processes performed by the vertical filter 504, the line sequential process circuit 506, the TCI encoder/channel dividing process circuit 502, referring to FIG. 1.

MUSE Signal

As described above, the baseband signal is transformed into the two channel TCI signal having bandwidth of about 13 MHZ per channel when it is actually recorded on a tape. Accordingly, in a case where the signal has a bandwidth of 13 MHz or less per channel, it is possible to record it using one channel employing a mechanism for recording the baseband signal. As described above, the MUSE signal has bandwidth of 8.1 MHz. Employing the mechanism which can transform the baseband signal into the 2-channel TCI signal, and record it in parallel on the medium, the MUSE signal also can be recorded in one channel.

However, the MUSE signal has a waveform different from that of the baseband signal divided into two channels. Therefore, the MUSE signal have to be transformed into a signal having a waveform suitable for recording. The principle of signal processing for recording the MUSE signal in one channel employing the mechanism recording the baseband signal will be described below.

In the MUSE signal, video signals and audio signals are inserted into the periods corresponding to horizontal blanking periods and vertical blanking periods of the baseband signal. Taking the fact into consideration, referring to FIG. 7, the MUSE signal should be first subjected to a time-transformation. Referring to FIG. 7 (a), one horizontal period (1H) of the MUSE signal includes a horizontal synchronous signal (HD) portion 520 and an effective information portion 518. 1H of the MUSE signal includes 480 sampled data.

The MUSE signal employs the "sampled value transmission" system. Each of the sampling points is provided by a clock having frequency of 16.2 MHz which is phase-synchronized with a frame pulse and a horizontal synchronizing signal of the MUSE signal. One horizontal scanning line (1H) of the MUSE signal is scanned with frequency of 33.75 kHz. Accordingly, sampling 1H with the sampling frequency of 16.2 MHz, 480 samples are obtained per 1H (16.2 MHz/33.75 kHz).

To record the MUSE signal of the waveform as described above by a mechanism for recording the baseband signal, it is required that the waveform of the MUSE signal is similar to the waveform of the TCI signal of the baseband signal as shown in FIG. 5. Referring to FIG. 7 (b), assume that the transformed MUSE signal includes a negative H-sync signal 510, a burst signal 512, and a sampled data portion 522 after the transformation. The negative H-sync signal 510 and the burst signal 512 are employed in reproducing process, especially for correcting a time base error of the signal.

The frequency of clock for recording the transformed MUSE signal is selected to satisfy the following conditions.

(1) A positive integral m clocks are assigned to the negative H-sync signal 510 and the burst signal 512.

(2) 480 clocks are assigned to the sampled data portion 522 of the MUSE signal in a manner similar to the original MUSE signal.

(3) One horizontal period of the MUSE signal after transformation equals to one horizontal period of the original MUSE signal.

(4) It is required that the expression (1) below is satisfied, wherein the bandwidth per one channel of the baseband signal transformed into the TCI signal is assumed to be $\Delta Ft$.

$$8.1 \cdot (m-480)/480 \geq \Delta Ft \qquad \ldots (1)$$

The condition (4) is required due to the following reasons. If the MUSE signal is transformed according to such clock as will satisfy the conditions (1)–(3), the bandwidth of a signal after transformation is $(m+480)/480$ times the original bandwidth. If the bandwidth of the signal after transformation is smaller than the bandwidth per one channel $\Delta Ft$ of the baseband signal transformed into the TCI signal, the MUSE signal can be recorded in one channel by the mechanism for recording the baseband signal in two channels.

Assume that $\Delta Ft = 13$ MHz. To satisfy the expression (1), m can be selected to be equal to 282, for example. In this case, one horizontal period of the MUSE signal after the transformation includes 762 samples (282+480).

The MUSE signal transformed as described above, after being converted into an analog signal, is frequency-modulated and recorded in one channel on a magnetic tape. In this case, the running speed of the tape can be reduced by half compared to that in recording the baseband signal. It is because the MUSE signal requires only one channel while the baseband signal requires two channels for recording.

Basic Concept of Integration of the Baseband/MUSE Signal Process

Considering the characteristics of the respective signals above-mentioned, to implement an apparatus for recording and reproducing both of the baseband signal and the MUSE signal, following two problems should be considered.

(1) The time-compression process of the MUSE signal should be performed to satisfy the expression (1).

(2) Common reference signals should be employed for correcting time base errors of signals in reproducing.

As described above, it is possible to satisfy the first condition. As to the second condition, two signals, a horizontal synchronizing signal and a signal for obtaining reference phase of 1H should be considered as reference signals. A conventional negative H-sync signal 510 (FIGS. 5 and 7) is employed as the former horizontal synchronizing signal and a burst signal 512 of a constant frequency (FIGS. 5 and 7) is employed as the latter. Accordingly, when 1H of the baseband signal is the TCI signal having the waveform shown in FIG. 5, and the transformed MUSE signal has the waveform shown in FIG. 7 (b), the processes for correcting the time base error in reproducing can be shared by the two signals.

In the following, assuming that the time-compression process of the MUSE signal satisfies the condition (1), an example of a recorded signal waveform which satisfies the condition (2) will be described.

FIGS. 8 (a) and (b) show TCI waveforms in the case where the baseband signals are divided into channel A and channel B, respectively. 1H of the TCI signal is selected to be twice of 1H of the baseband signal to simplify the circuit of transforming the baseband signal into TCI signal. The first horizontal period of the channel A signal includes a negative H-sync signal 510, a burst signal 512, the first line chrominance signal Pr1, and the first line luminance signal Y1. The channel A signal of the second horizontal period includes a negative H-sync signal, a burst signal, a chrominance signal Pr3 of the third line and a luminance signal Y3 of the third line.

Meanwhile, the first horizontal period of the TCI signal of the channel B includes a negative H-sync signal, a burst signal, a chrominance signal Pb2 of the second line, and a luminance signal Y2 of the second line. The second horizontal period of the channel B signal includes a negative H-sync signal, a burst signal, a chrominance signal Pb4 of the fourth line, and a luminance signal Y4 of the fourth line.

As described above, the chrominance signal is line sequenced in advance. Therefore, only the chrominance signal Pr among chrominance signals is included in the channel A and the chrominance signal Pb among chrominance signals is included in the channel B. Of course, the distribution of the signals Pr and Pb are not limited thereto. For example, the distribution can be selected such that consecutive signals (Pr1, Y1), (Pb2, Y3), ... are assigned to the channel A whereas the signals (Pr3, Y2), (Pb4, Y4) are assigned to the channel B. On the other hand, as the luminance signals are not line sequential, they are sequentially distributed over the two channels of A and B.

FIGS. 8 (c) and (d) show possible waveforms of the MUSE signal after transformation, respectively. As the transformed MUSE signal as shown in FIGS. 8 (c) and (d) has a quasi TCI signal waveform similar to that of the TCI signal, the baseband signal and the MUSE signal can share a common configuration of a signal processing circuit for recording and reproducing. The MUSE quasi TCI signal I shown in FIG. 8 (c) shows a method for compressing and inserting the MUSE signal of 2 Hs into 1H period of a TCI signal of the baseband signal. The MUSE quasi TCI signal II shown in FIG. 8 (d) shows a method for inserting a horizontal synchronous signal and a burst signal for every 2Hs of the MUSE signal.

According to the first method, the period of 1H of the obtained signal is half that of the TCI signal for baseband. Therefore, if this method is taken, it is required that timing signals for defining such as an interval of clamp pulses for a DC clamping circuit in signal reproducing are discriminated between processing of the baseband and MUSE signals.

First Embodiment

Figure 9:
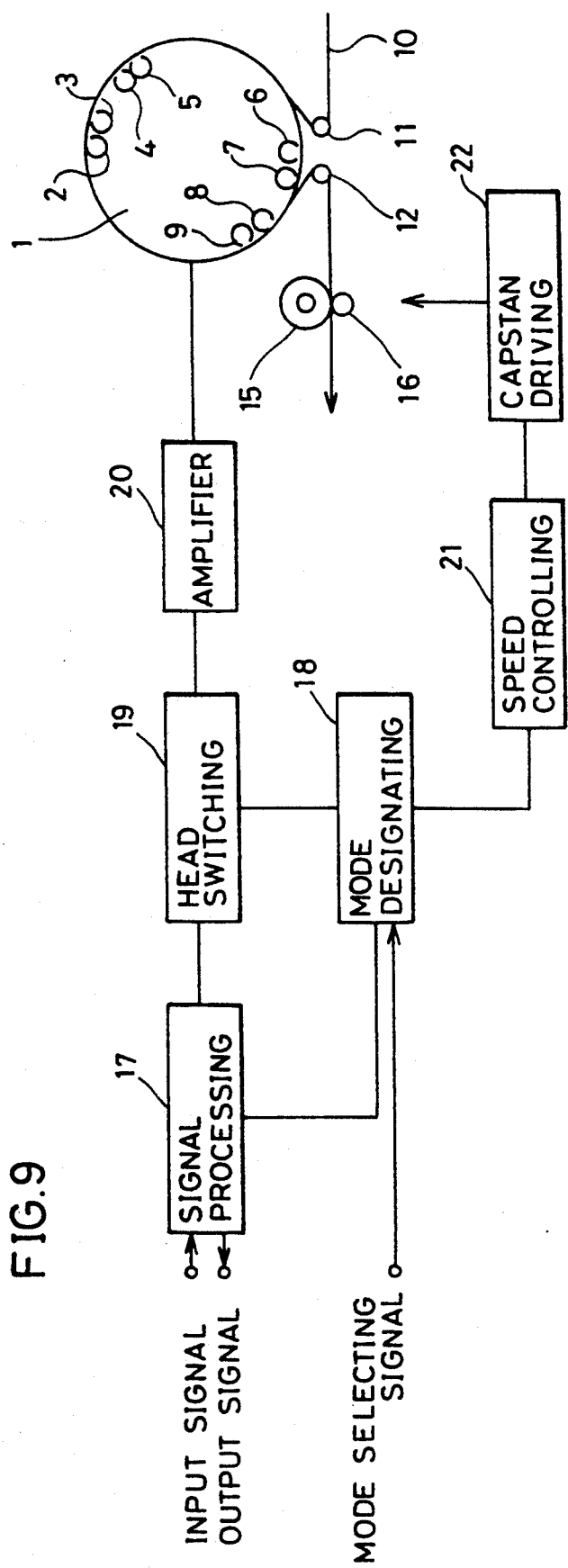
FIG. 9 is a block diagram of an apparatus according to a preferred embodiment of the present invention.

Referring to FIG. 9, a video signal recording/reproducing apparatus according to the present invention includes: a signal processing circuit 17 for receiving a signal to be recorded and converting the same into a signal suitable for recording, and for receiving a reproduced signal, converting the same into a signal of an externally adaptable form and outputting the converted signal; a rotary head 1 having eight heads 2–9 and rotatable around a center axis; a mode designating circuit 18 for designating an operational mode of the apparatus in accordance with a mode selecting signal from the operator or a type of the inputted signal; a speed controlling circuit 21 connected to the mode designating circuit 18 for controlling driving speed of a tape 10 in accordance with a mode; a capstan driving circuit 22 connected to the speed controlling circuit 21 for driving a capstan 16 for running the tape 10; a head switching circuit 19 connected to the signal processing circuit 17 and the mode designating circuit 18 for switching a head to be connected to the signal processing circuit 17 in accordance with a type of the signal to be processed, an operational mode of the recording/reproducing, and a mode for reproduction at a normal speed, and such as modes for high speed reproduction at a doubled speed or ninefold speed; and an amplifier portion 20 connected to the head switching circuit 19 and the rotary heads 2-9 provided in the rotary drum 1 for amplifying such that a signal is recorded with an optimal recording current in recording the signal and for amplifying a weak reproduced signal in reproducing the signal.

The apparatus further includes guide poles 11 and 12 for guiding the tape 10 to be wrapped around the rotary drum 1 and a pinch roller 15 for causing the capstan 16 to drive the tape 10 by pressing the tape 10 to the capstan 16.

The tape 10 is helically wrapped around an outer periphery of the rotary drum 1 by the guide poles 11 and 12. The tape 10 is driven by the capstan 16 to travel on the outer periphery of the rotary drum 1 in a direction of the rotation of the rotary drum 1 at a predetermined speed.

Figure 10:
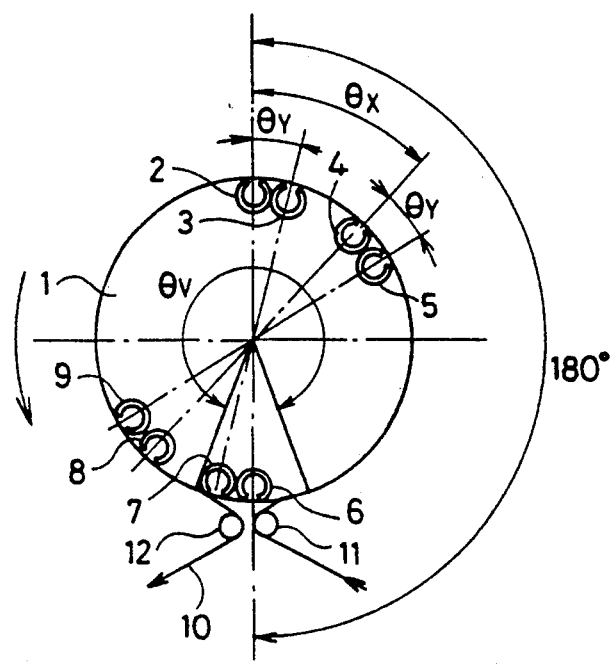
FIG. 10 is a schematic plan view of a rotary drum showing one example of arrangement of the magnetic heads employed in the preferred embodiment of the present invention.

Referring to FIG. 10, on the outer periphery of the rotary head 1 are provided a first group of rotary heads and a second group of rotary heads each having four rotary heads. The first group of the rotary heads is for scanning a main track on the magnetic tape 10 and includes the rotary heads 2, 3, 4 and 5. The second group of the rotary heads is for scanning a subtrack on the magnetic tape 10 and includes the rotary heads 6, 7, 8 and 9.

The magnetic heads 2 and 6, 3 and 7, 4 and 8, and 5 and 9 are located on the outer periphery of the rotary drum 1 each pair having a phase difference of 180° with each other. The rotary heads 6, 7, 8 and 9 are located displaced from the rotary heads 2, 3, 4 and 5 by H (for example 5.4817 mm) to a direction perpendicular to a direction of the locus of the head $V_H$.

The first rotary heads 2 and 6 of the respective groups are provided at a positive azimuth angle.

The second rotary heads 3 and 7 of the respective groups are provided having a predetermined phase difference $\theta_Y$ (for example 5.12°) with respect to the first heads 2 and 6, respectively, along the head locus direction $V_H$ and 0.25 μm below the first heads 2 and 6 in a direction perpendicular to the head locus direction $V_H$.

The third heads 4 and 8 of the respective groups are provided having a predetermined phase difference $\theta_X$ (for example 46.08°) and displaced by $h_2$ (for example 13.28 μm) above with respect to the first heads 2 and 6 of the respective groups.

The fourth rotary heads 5 and 9 of the first and second groups are provided having a phase difference $\theta_Y Y$ and displaced by $h_1$ below with respect to the third rotary heads 4 and 8, respectively.

Both of the first rotary heads 2 and 6 and the fourth rotary heads 5 and 9 of the respective groups have a positive azimuth angle. On the other hand, all of the second rotary heads 3 and 7 and the third rotary heads 4 and 8 are provided having a negative azimuth angle.

The above-described phase differences $\theta_X$ and $\theta_Y$ are selected as the following. Because of the above-described phase differences of the rotary heads, it is necessary to adjust a signal gap corresponding to these phase differences in the signal processing. In this case, if a phase difference of a signal caused by this phase difference is a multiple of 1H of the signal, the signal processing can be easily performed. In case of the present embodiment, 1H of the MUSE signal is recorded on the magnetic tape by the rotation of 0.64° of the rotary drum 1. In addition, a ratio of the number of the recording lines per field of the baseband signal to that of the MUSE signal is 1:2. A length ratio of 1H of the respective signals is 2:1. Namely, in case of the baseband signal, 1H is recorded by the rotation of 1.28° of the rotary drum 1.

In providing the rotary head on the rotary drum 1, a certain interval is required because of the physical limitations. In case of the present embodiment, $\theta_Y$ is selected to correspond to an angle equivalent to 8H of the MUSE signal and 4H of the baseband signal. Accordingly, $\theta_Y = 5.12° = 0.64° \times 8 = 1.28° \times 4$. $\theta_X$ is selected to correspond 36H of the baseband signal. Namely, $\theta_X = 46.08° = 1.28° \times 36$. Note that the above-specified values are by way of an example only and are not limited thereto. For example, smaller $\theta_X$, $\theta_Y$ can be selected by employing multiple chip heads on a headbase, whereby the circuit can be reduced in scale for compensating the signal phase difference.

The traveling speed of the tape 10 and the rotation speed of the rotary drum 1 in are selected such that a video signal of one field is formed on the tape 10 by one rotation of the rotary drum 1 in accordance with a diameter of the rotary drum 1. Since one frame of the video signal includes two fields, the video signal of one frame is recorded or reproduced every two rotations of the rotary drum 1. The method is hereafter referred to as "1.1 head system" in the specification.

Figure 12:
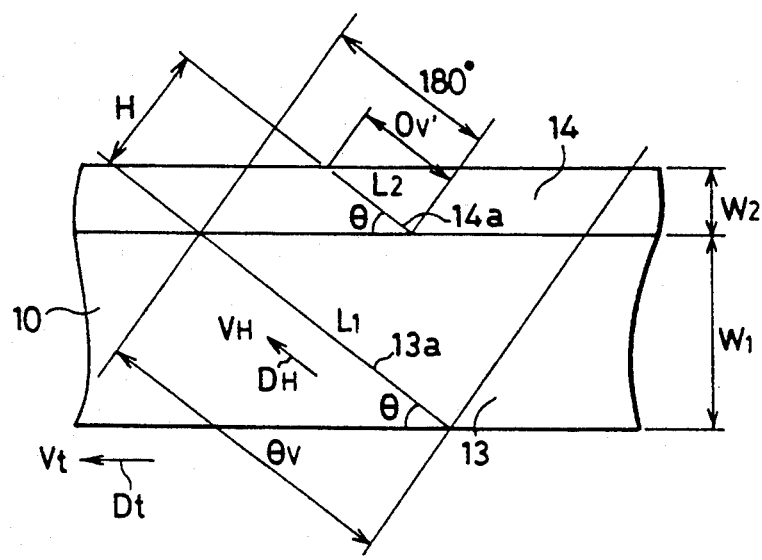
FIG. 12 is a schematic diagram of a track pattern formed on a recording medium.

Referring to FIG. 12, a track pattern on the magnetic tape 10 is formed as the following. A recording surface of the magnetic tape 10 is divided into a main track area 13 in which main tracks are formed and a subtrack area 14 in which a subtracks are formed. An effective recording width of the main track area 13 is W1 and an effective recording width of the subtrack area 14 is W2. Both of a main track 13a and a subtrack 14a are formed with a track lead angle $\theta$. The main track 13a has a recording length L1 and the subtrack 14a has a recording length L2. The tape 10 travels in a direction of the arrow $V_t$ at a speed of, for example, $V_t$. The head travels in a direction indicated by the arrow $D_H$ at a head speed of $V_H$. The main track 13a and the subtrack 14a are formed spaced apart by H in parallel with each other.

The track lead angle $\theta$, the recording length L1 of the main track, the effective recording width W1 of the main track, the recording length L2 of the subtrack and effective recording width W2 of the subtrack are related one another as represented by the following equations.

$$\theta = \sin^{-1}\left(\frac{W_1}{L_1}\right)$$
$$= \sin^{-1}\left(\frac{W_2}{L_2}\right)$$

Supposing that a drum diameter of the rotary drum 1 is D and an effective tape wrap angle to the rotary drum 1 is $\theta_1$, the following equation holds.

$$L_1 = \pi D \cdot \frac{\theta_1}{360}$$

In the present embodiment, D=76 mm and $\theta_1=312°$. An auxiliary tape wrap angle $\theta_1'$ for forming the subtrack 14a is selected such that $\theta_1'=48°$. The main track 13a and the subtrack 14a are formed by a rotary head for forming a main track and another rotary head for forming the subtrack 14a, respectively. A pair of the main track 13a and the subtrack 14a covers the whole periphery of the rotary drum 1.

Figure 13:
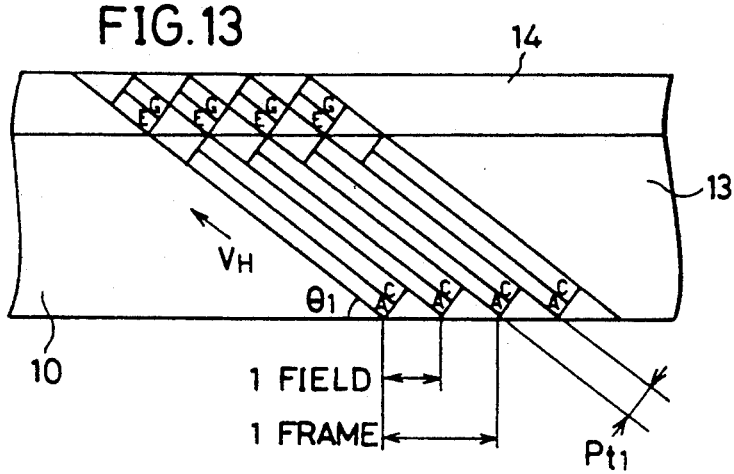
FIG. 13 is a schematic diagram showing a track pattern of baseband signals formed on the recording medium.
Figure 14:
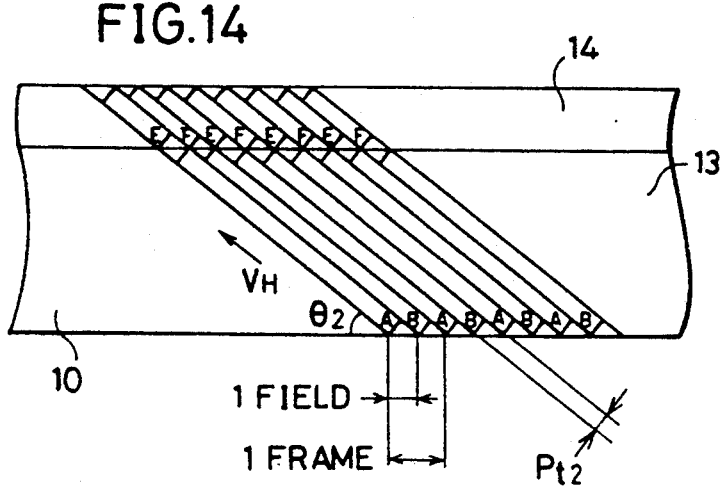
FIG. 14 is a schematic diagram of a track pattern of MUSE signals formed on the recording medium.

The head switching circuit 19 of the apparatus according to the present embodiment switches each of the rotary heads such that the baseband signal and the MUSE signal are recorded on the magnetic tape in a track patterns shown in FIGS. 13 and 14, respectively. In order to realize such recording patterns, the head switching circuit 19 switches the respective rotary heads in accordance with a type of a signal to be processed and a reproduction mode (normal reproduction/high speed reproduction), as shown in Table 2.

Referring to Table 2, in recording and reproducing the MUSE signal, the head switching circuit 19 switches the first rotary heads 2 and 6 and the second rotary heads 3 and 7 of the respective groups every field. In recording the baseband signal and reproducing the same in a normal mode, the head switching circuit 19 uses the first rotary heads 2 and 6 and the third rotary heads 4 and 8 of the respective groups. In reproducing the baseband signal at a high-speed, the head switching circuit 19 uses all the rotary heads 2-9.

TABLE 2

| ROTARY HEAD | MUSE Normal | MUSE High Speed | BASE BAND Normal | BASE BAND High Speed | MODE |
|---|---|---|---|---|---|
| 2 | ○ | ○ | ○ | ○ | |
| 3 | ○ | ○ | X | ○ | |
| 4 | X | X | ○ | ○ | One Head |
| 5 | X | X | X | ○ | |
| 6 | ○ | ○ | ○ | ○ | |
| 7 | ○ | ○ | X | ○ | 0.1 head |
| 8 | X | X | ○ | ○ | |
| 9 | X | X | X | ○ | |

Shown in Table 3 are basic parameters for recording the baseband signal and the MUSE signal in the track patterns shown in FIGS. 13 and 14.

TABLE 3

| ITEM | SIGNAL MUSE | BASE BAND |
|---|---|---|
| TRACK PITCH | 17.9 μm | 35.7 μm |
| TAPE TRAVELLING SPEED | 25.4 mm/s | 50.8 mm/s |
| TRACK LEAD ANGLE (RUN) | 2.414° | 2.418° |
| TRACT LEAD ANGLE (STILL) | 2.410° | 2.410° |
| EFFECTIVE TAPE WRAP ANGLE | 312° | 312° |

Referring to FIG. 13, the main track for recording the baseband signal includes a first channel A and a second channel C. The subtrack includes a first channel E and a second channel G. The first channel A is recorded by the first rotary head 2. The second channel C is recorded by the third rotary head 4. The first channel E of the subtrack is formed by the first magnetic head 6. The second channel G of the subtrack is formed by the third rotary head 8. In FIG. 13, the head moves in a direction indicated by an arrow at a head speed $V_H$. The tape 10 travels in a direction indicated by the arrow Dt at a speed $2V_T$. Both of the main track and the subtrack have a recording width Pt1. Each track is formed on the magnetic tape with a track lead angle $\theta_1$.

Referring to FIG. 14, the MUSE signal is recorded by the following track pattern. Main tracks A and B are alternately formed in the main track area 13. Subtracks E and F are alternately formed in the subtrack area 14. The MUSE signal is recorded in one channel in each of the tracks. Namely, a main track A and a subtrack E or a main track B and a subtrack F record the MUSE signal of one field. Two tracks record one frame of the MUSE signal.

In recording the MUSE signal, the tape 10 travels in a direction indicated by the arrow Dt at a speed Vt. Each track is formed having a recording width Pt2 and a track lead angle $\theta_2$ on the magnetic tape. The main track A is formed by the first rotary head 2. The main track B is formed by the second rotary head 3. The subtrack E is formed by the first rotary head 6. The subtrack F is formed by the second rotary head 7.

Figure 11:
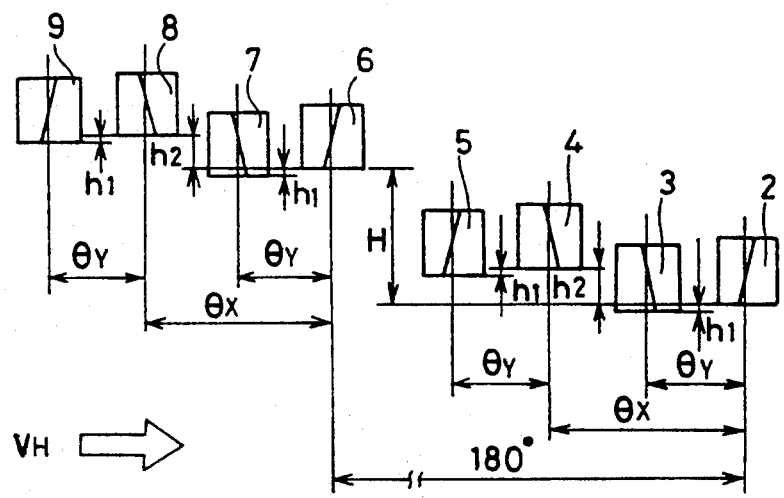
FIG. 11 is a schematic diagram showing positioning in the scanning direction of the magnetic heads in accordance with the preferred embodiment of the present invention.

The arrangement of the rotary heads shown in FIGS. 10 and 11 is selected to enable the formation of both track patterns shown in FIGS. 13 and 14. However, in order to realize the "one track per one field" recording (recording one field of a video signal on one track by one rotation of the drum) shown in FIG. 13 by the 1.1 head system, the following problems are to be solved.

FIG. 15 shows a rotary drum and an arrangement of rotary heads for use in a conventional video signal recording apparatus of the VHS system. Referring to FIG. 15, a rotary head 530 of the VHS system has a rotary head 532 having a positive azimuth angle and a rotary head 534 disposed at the opposite side of the rotary head 532 and having a negative azimuth angle. The tape 10 is wrapped at an angle of about 180° with respect to the rotary drum 530. The rotary drum 530 rotates in a direction indicated by an arrow. The tape 10 also travels along the outer periphery of the rotary drum 530 in the same direction as the movement of the rotary heads 532 and 534 by the rotation of the rotary drum 530.

FIG. 16 is a timing chart showing the recording of a signal by the rotary heads 532 and 534 shown in FIG. 15. FIG. 16 (a) shows a field switching pulse for generating a timing of head switching. This pulse is for switching the rotary head having the positive azimuth and the rotary head having the negative azimuth to cause each of the heads to form one track for every field of a video signal.

Referring to FIG. 16 (b), when the field switching pulse is at a "high" level, a hatched one field of the video signal is supplied to the rotary head 532. When the field switching pulse is at a "low" level, a white portion of one field of the video signal shown in FIG. 16 (b) is supplied to the rotary head 534.

FIG. 16 (c) shows the video signal supplied to the rotary head 532. FIG. 16 (d) shows the video signal supplied to the rotary head 534. The video signals supplied to the rotary heads 532 and 534 are overlapped with each other near the timing for switching the field by a time equivalent to certain number of horizontal periods. The overlap is for facilitating the formation of a single-system signal in reproducing the video signal. Without these overlapped portions, the reproduced signals are sometimes coupled satisfactorily and sometimes not satisfactorily since the signals reproduced from the two heads 532 and 534 include error in time-axis. In such a case, the reproduced picture is damaged. The overlapped portions allow the switching of the reproduced signals by the heads 532 and 534 at any time point during the periods to obtain satisfactorily combined reproduced signals as shown in FIG. 16 (e).

The track pattern shown in FIG. 17 is formed on the magnetic tape 10 by the application of the video signals to the rotary heads 532 and 534 at such timing as shown in FIGS. 16 (c) and (d).

FIG. 18 is a schematic diagram of the rotary drum 530 for implementing the 1.1 head system with respect to the MUSE signal. The rotary drum 530 includes a rotary drum 532 for forming a main track, a rotary head 536 provided at a difference in angle of $\Delta\theta°$ with respect to the rotary drum 532 for forming a main track alternately with the rotary head 532 every one field, and rotary heads 534 and 538 provided on the opposite sides of the rotary heads 532 and 536 with respect to the center of the rotary drum 530, respectively, for forming subtracks in pair with the rotary heads 532 and 536, respectively. The magnetic tape 10 is wrapped around the rotary drum 530 at a wrap angle of 325° in this case.

The rotary drum 530 rotates in a direction shown by an arrow. The tape 10 also travels in the same direction as that of the rotation of the rotary drum along the outer periphery thereof.

FIG. 19 (a) shows a field switching pulse similar to the signal shown in FIG. 16 (a).

While the field switching pulse is at the "high" level, one field signal of a hatched portion out of the rotary heads 532 and 534. As a result, such video signals as shown in FIG. 19 (d) are supplied to the pair of the rotary heads 532 and 520. Note that, for convenience of a description, FIG. 19 does not show how the signals are allotted to the respective rotary heads 532 and 534.

Out of the video signals shown in FIG. 19 (b) one field of a video signal corresponding to the white portion should be supplied to the rotary heads 536 and 538 at an instance the field switching pulse attains the "low" level. However, due to the angle difference $\Delta\theta$, the video signals to be supplied to the rotary heads 536 and 538 should be delayed by a time corresponding to $\Delta\theta$. Otherwise, out of the video signals recorded on the tape 10 by the rotary heads 536 and 538, an initial part thereof is not recorded on the track. Accordingly, the video signals supplied to the rotary heads 536 and 538 should be delayed by $\Delta H = k \cdot \Delta\theta$, wherein k denotes time required for one rotation of the rotary drum 530.

Namely, the video signals supplied to the rotary heads 536 and 538 are signals corresponding to the white portion out of the signals obtained by delaying the video signals supplied to the rotary heads 532 and 534 by $\Delta H$, like the video signals shown in FIG. 19 (c). By taking out the signal of this portion in synchronization with the signal obtained by delaying the field switching pulse by $\Delta H$, such video signals as shown in FIG. 19 (e) are derived and are supplied to the rotary heads 536 and 538. As a result, the video signal is recorded by the rotary heads 536 and 538 from the beginning of the track without omission.

However, such problem as follows occurs in reproducing the signal recorded as described above. The video signal reproduced by the rotary heads 532 and 534 becomes what is shown in FIG. 19 (d). On the other hand, the video signal reproduced by the rotary heads 536 and 538 becomes what is shown in FIG. 19 (e). If the video signal is coupled using the same field switching pulse as that of the conventional VHS system, there occurs omission of the video signal as shown in FIG. 19 (f).

Referring to FIG. 19 (f), in the period 542, the video signal is supplied neither by the pair of the rotary heads 532 and 534 nor by the rotary heads 536 and 538, so that omission occurs in the video signal. In the period 544, the video signal reproduced by the rotary heads 532 and 534 and the video signal reproduced by the rotary heads 536 and 538 are overlapped with each other. These overlaps, different from the overlapped portion prepared by considering the reproduction as shown in FIGS. 16 (c) and (d), are portions wherein different video signals are recorded. Therefore, in the video 544, only one of the signals (in FIG. 19, only the signal reproduced by the rotary heads 536 and 538) is adopted and the other signal (in FIG. 19, the signal reproduced by the rotary heads 532 and 534) is abandoned.

When the period 542 is caused, noise bar due to the omission of the video signal is generated in a vertical direction of the reproduced picture. In the period 544, there appears notable discontinuity of the video in the vertical direction.

Accordingly, also in the apparatus having the head arrangement shown in FIGS. 10 and 11, the same problem as in the apparatus shown in FIGS. 18 and 19 arises in recording the MUSE signal by the "1 track per 1 field" method. In the apparatus according to the present invention, the problem is resolved by delaying one of the two signals in recording the signal and the other in reproducing the same.

FIG. 20 is a block diagram of a main part of the apparatus for recording and reproducing a video signal according to the embodiment. Referring to FIG. 20, the signal processing circuit 17 includes a recording processing circuit 26 connected to the signal selecting circuit 18 and the head switching circuit 19 for externally receiving the MUSE signal and a luminance signal Y, chrominance signals Pr and Pb of the baseband signal, converting the same into those of a waveform suitable for the recording as previously described and applying the converted signals to the head switching circuit 19, and a reproducing processing circuit 28 connected to the signal selecting circuit 18 and the head switching circuit 19 for receiving a reproduced signal from the head switching circuit 19, reversely converting the signal in response to a mode designating signal from the signal selecting circuit 18 and outputting the MUSE signal and the luminance signal Y, the chrominance signals Pr and Pb of the the baseband signal.

The head switching circuit 19 includes a recording head switching circuit 30 connected to the recording processing circuit 26 and the signal selecting circuit 18 for supplying the signal applied from the recording processing circuit 26 to the rotary heads 2, 4, 6 and 8 shown in FIGS. 10 and 11 in accordance with a type of the signal to be processed, and a reproduction head switching circuit 32 connected to the rotary heads 2-9, the amplifier 20, the signal selecting circuit 18 and the reproducing processing circuit 28 for switching at a suitable timing and combining the signal reproduced from the magnetic tape by the rotary heads 2-9 and applying the same to the reproducing processing circuit 28.

The signal selecting circuit 18 is supplied with a mode setting signal set by the operator. The mode setting signal defines types of baseband signal/MUSE signal and types of normal reproduction/high speed reproduction.

The magnetic recording/reproducing system 540 includes such not-shown apparatuses as a rotary drum shown in FIGS. 10 and 11, a driving system of a tape, and a control head for use in a servo subsystem for stabilizing tape travelling speed. Referring to FIG. 20, the magnetic tape 10 for recording the baseband signal and the MUSE signal is provided with a control track 23. This control track is a track for use in the above-described servo system for driving a capstan motor and for recording/reproducing a control signal. In recording a signal, the mode designating circuit 18 records in the control track 23 information as to whether the signal is recorded in a mode of the baseband signal or that of the MUSE signal.

For example, in recording the baseband signal, the mode designating circuit 18 records a baseband/MUSE mode identifying signal 24a in the control track 23 and in recording the MUSE signal, the circuit 18 records a baseband/MUSE mode identifying signal 24b in the control track 23. In reproducing, the mode designating circuit 18 determines whether the signal recorded on the tape 10 is a baseband signal or a MUSE signal by electrically inspecting the control signal reproduced from the control track 23 by the not-shown control head.

Figure 21:
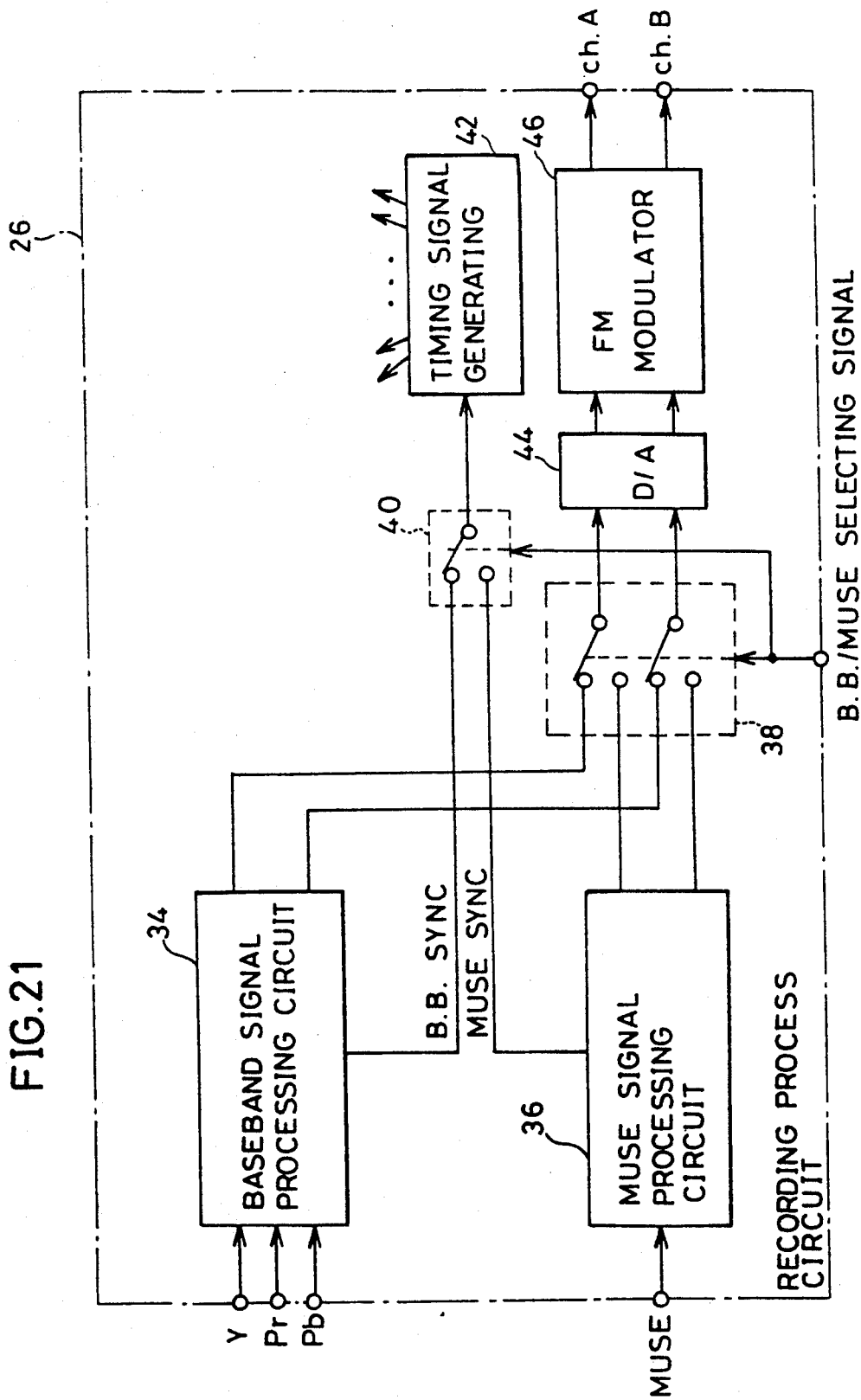
FIG. 21 is a block diagram of a recording process circuit.

Referring to FIG. 21, the recording processing circuit 26 includes a baseband signal processing circuit 34 for receiving the luminance signal Y, the chrominance signals Pr and Pb of the baseband signal to perform such TCI transformation processing as previously described, dividing the TCI transformed signals into signals of two channels and outputting the same, a MUSE signal processing circuit 36 for receiving the MUSE signal to subject the previously-described time axis transformation processing to the same, transforming the same into a signal of one channel having the above-described quasi TCI signal waveform, and for further dividing the signal by two, delaying one of the signals by a predetermined time and outputting the delayed signal, a baseband/MUSE switch 38 connected to the baseband signal processing circuit 34, the MUSE signal processing circuit 36 and the signal selecting circuit 18 for switching outputs of the baseband signal processing circuit 34 and the MUSE signal processing circuit 36 in response to the baseband/MUSE selecting signal applied from the signal selecting circuit 18 and outputting the same as a signal of two channels, a D/A converter 44 for digital-analog converting the signal of two channels outputted by the baseband/MUSE switch 38, an FM modulator 46 for FM modulating the analog signal outputted by the D/A converter 44 and outputting the FM modulated signal to the channels A and B, a baseband/MUSE synchronous switch 40 connected to the base band signal processing circuit 34, the MUSE signal processing circuit 36 and the signal selecting circuit 18 for selectively outputting a baseband synchronizing signal outputted from the baseband signal processing circuit 34 and a MUSE synchronizing signal outputted from the MUSE signal processing circuit 36 in response to the baseband/MUSE selecting signal, and a timing signal generating circuit 42 for generating timing signals in synchronization with an output of the switch 40.

Figure 22:
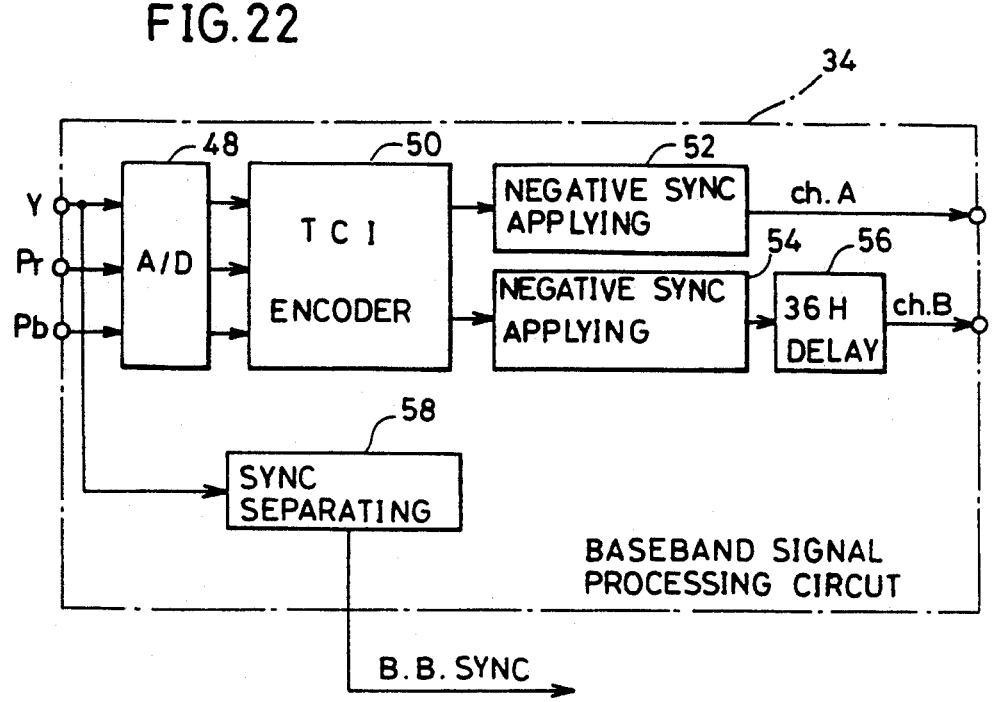
FIG. 22 is a block diagram of a baseband signal processing circuit.

Referring to FIG. 22, the baseband signal processing circuit 34 includes: an A/D converter 48 receiving a luminance signal Y and chrominance signals Pr and Pb of the baseband signal for analog-digital converting the same and outputting the converted signal; a TCI encoder 50 for subjecting the digitized luminance signal Y and chrominance signals Pr and Pb outputted by the A/D converter 48 to the previously-described vertical filtering processing, line sequential processing, TCI converting processing and the like, and for dividing the processed signals into signals of two channels and outputting the same; a negative synchronizing signal applying circuit 52 and 54 for applying a negative synchronizing signal to signals of the channels A and B outputted from the TCI encoder 50, respectively; a 36H delay circuit 56 for delaying the signal of channel B outputted from the negative synchronizing signal applying circuit 54 by a time corresponding to 36H of the baseband signal with respect to the signal of channel A; a synchronization separating circuit 58 receiving the luminance signal Y, for separating the synchronizing signal and outputting the same to the switch 40.

The MUSE signal processing circuit 36 includes an A/D converter 60 for receiving an analog MUSE signal and A/D converting the same; a time-axis transforming circuit 62 for subjecting the digitized MUSE signal to the above-described time axis transformation processing; a negative synchronizing signal applying circuit 64 for applying a negative synchronizing signal to the one-channel signal outputted from the time axis converting circuit 62, and for dividing the signal applied with the negative synchronizing signal into two channels A and B and outputting the same; an 8H delay circuit 66 for delaying the signal of the channel B by a time corresponding to 8H of the MUSE signal with respect to the signal of the channel A; and a synchronization separating circuit 68 receiving the digitized MUSE signal, for separating the synchronizing signals and applying the same to the switch 40.

The MUSE signal includes a so-called "positive synchronizing signal" which differs from a synchronizing signal of a conventional NTSC signal and a baseband signal of a conventional HD-TV system in that a horizontal synchronizing signal and a frame pulse signal fall within a dynamic range of a video signal. Therefore, it is not possible to use the same one as the synchronizing separating circuit 58 of the baseband signal shown in FIG. 22. The MUSE signal synchronous separating circuit 68 is a dedicated circuit for separating the synchronizing signal from the MUSE signal digitized by the A/D converter 60.

It should be noted that although the signal outputted from the time axis converting circuit 62 is divided into two channels A and B, these signals are substantially the same signals of one channel.

Figure 24:
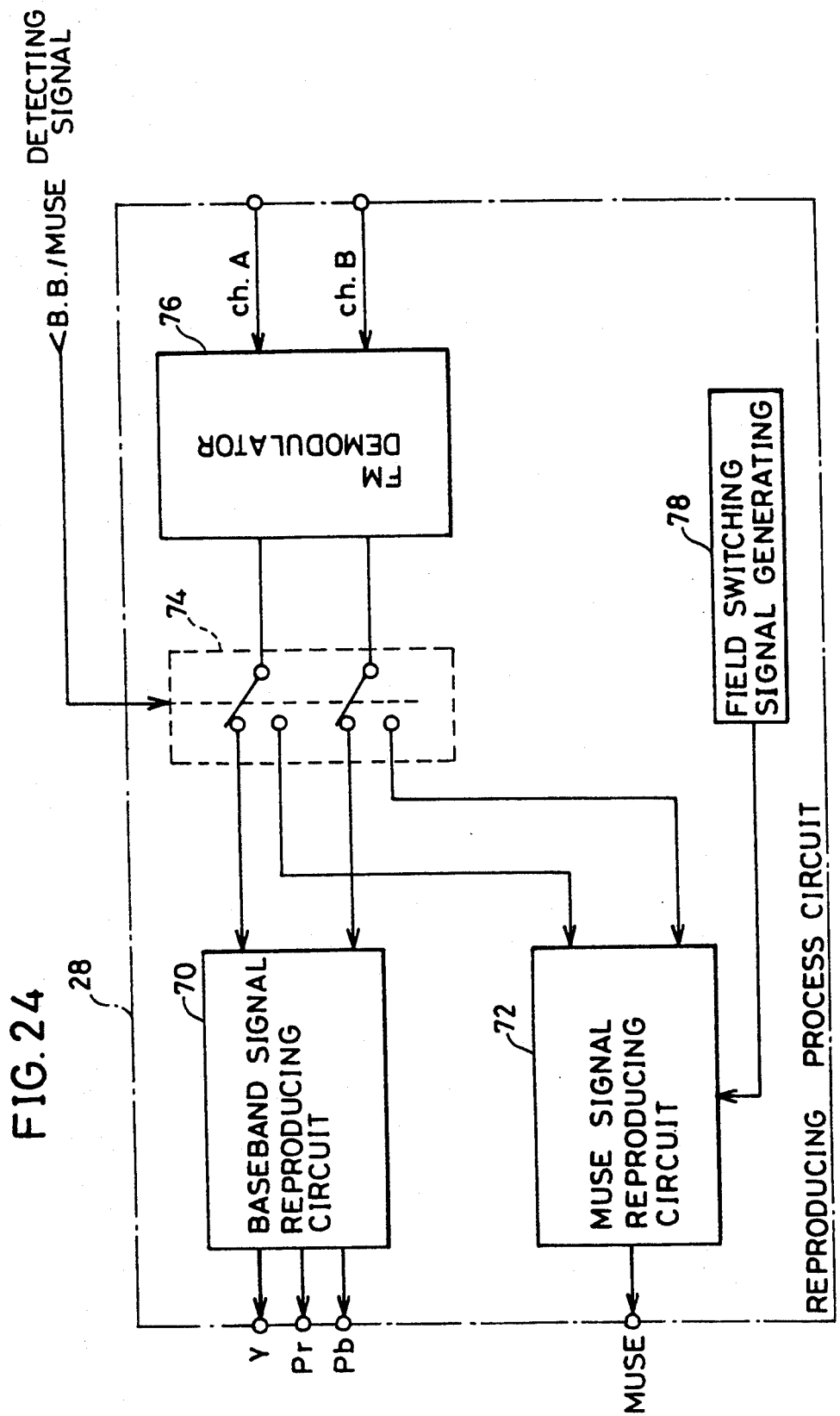
FIG. 24 is a block diagram of a reproducing process circuit.

Referring to FIG. 24, the reproducing processing circuit 28 includes an FM modulator 76 receiving the signals of the two channels A and B from the reproduction head switching circuit 32 and for FM modulating the respective signals; a baseband signal reproducing circuit 70 for reproducing the signal to output the luminance signal Y, the chrominance signals Pr and Pb of the baseband signal when the signal demodulated by the FM modulator 76 is a baseband signal; a MUSE signal reproducing circuit 72 for time-axis-transforming the signal to output a MUSE signal when the signal outputted from the FM demodulator 76 is a MUSE signal; a baseband/MUSE switch 74 provided between the FM modulator 76, and the baseband signal reproducing circuit 70 and the MUSE signal reproducing circuit 72 responsive to a baseband/MUSE detection signal applied from the signal mode designating circuit 18 for selecting one of the baseband signal reproducing circuit 70 and the MUSE signal reproducing circuit 72 and for applying the output of the FM modulator 76 thereto; and a field switching signal generation circuit 78 for generating a field switching signal indicating a timing of switching the two signals every field in order to combine the same and to reproduce the same as a single-system signal. and for applying the field switching signal to the MUSE signal reproducing circuit 72.

Figure 25:
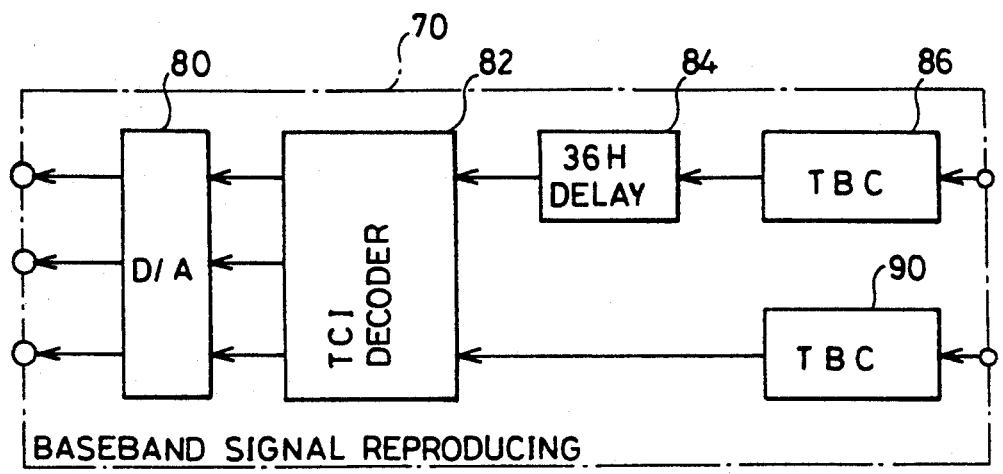
FIG. 25 is a block diagram of a baseband signal reproducing circuit.

Referring to FIG. 25, the baseband signal reproducing circuit 70 includes a TBC (Time Base Corrector) circuit 86 for correcting time base error of the signal of the channel A applied from the FM modulator 76 through the switch 74; a 36H delay circuit 84 for delaying a signal outputted from the TBC circuit 86 by a time corresponding to 36H of the baseband signal; a TBC circuit 90 for correcting time base error of the signal of the channel B inputted from the FM modulator 76 through the switch 74; a TCI decoder 82 for decoding the signals of the channels A and B applied from the delay circuit 84 and TBC circuit 90. respectively. converting the decoded signals into digital luminance signal Y, chrominance signals Pr and Pb of the baseband signal and outputting the converted signals; and a D/A converter 80 for D/A converting the luminance signals Y, Pr and Pb outputted from the TCI decoder 82.

Figure 26:
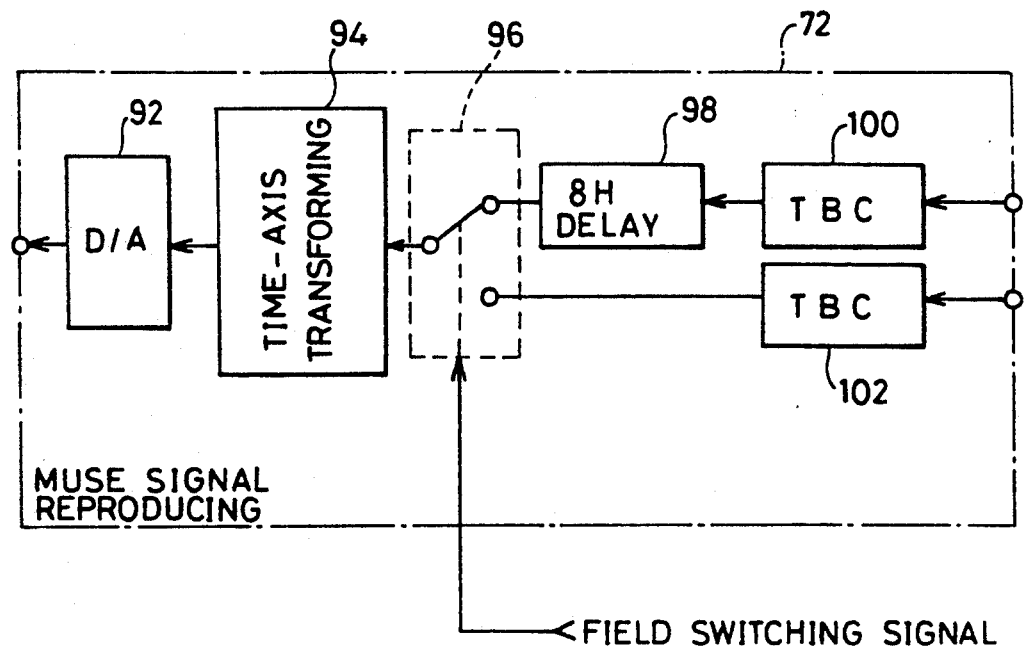
FIG. 26 is a block diagram of a MUSE signal reproducing circuit.

Referring to FIG. 26, the MUSE signal reproducing circuit 72 includes a TBC circuit 100 for correcting time base error of the signal of the channel A inputted from the FM modulator 76 through the switch 74; an 8H delay circuit 98 for delaying the output of the TBC circuit 100 by a time corresponding to 8H of the MUSE signal, compared to the signal of the channel B; a TBC circuit 102 for correcting time base error of the signal of the channel B inputted from the FM modulator 76 through the switch 74; a video switch circuit 96 responsive to a field switching pulse for alternately outputting an output of the 8H delay circuit 98 and an output of the TBC circuit 102; a time axis transforming circuit 94 connected to an output of the video switch circuit 96 for transforming the inputted reproduced signal in the time axis to output an original digitized MUSE signal; and a D/A converter 92 for D/A converting the digital signal outputted from the time axis transforming circuit 94.

Figure 27:
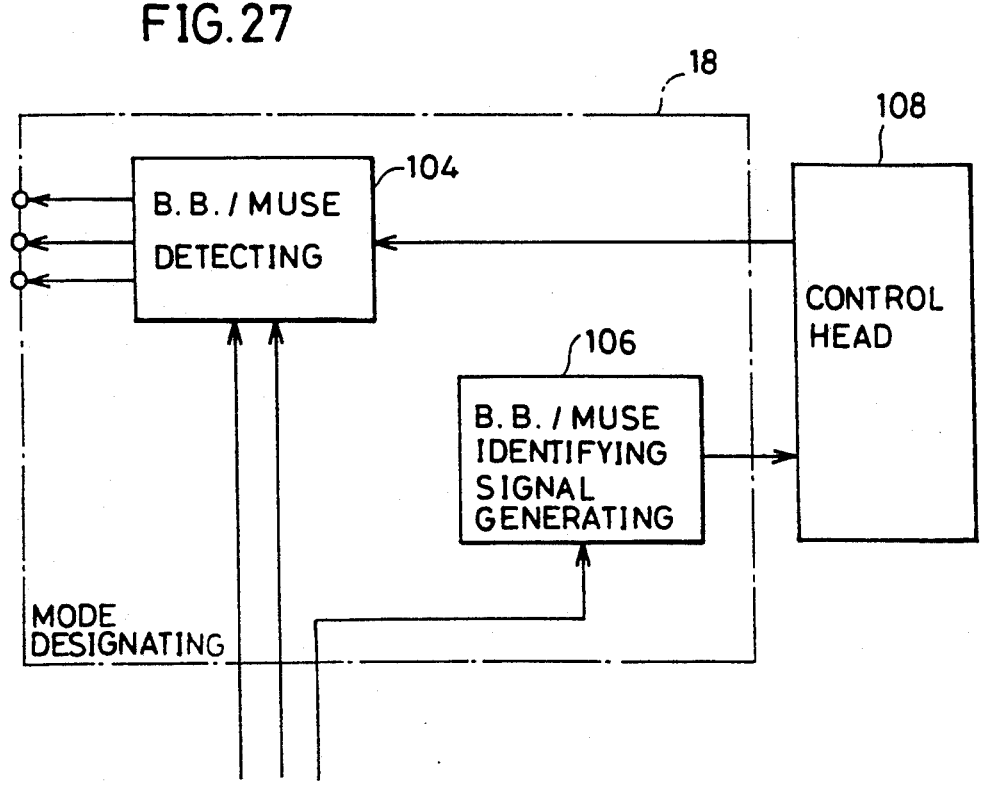
FIG. 27 is a block diagram of a mode designating circuit.

Referring to FIG. 27, the mode designating circuit 18 includes a baseband/MUSE identifying signal generation circuit 106 responsive to a processing mode of a baseband/MUSE signal set by the operator for generating a baseband/MUSE identifying signal and applying the same to a control head 108, and a baseband/MUSE detection circuit 104 responsive to the baseband/MUSE identifying signals 24a or 24b (FIG. 20) reproduced by the control head 108 in reproduction for detecting whether the signal being reproduced is a baseband signal or a MUSE signal and outputting a baseband/MUSE detection signal, as well as outputting a signal designating a processing type such as recording/reproduction and a type of reproduction speed such as normal reproduction/high speed reproduction.

Figure 28:
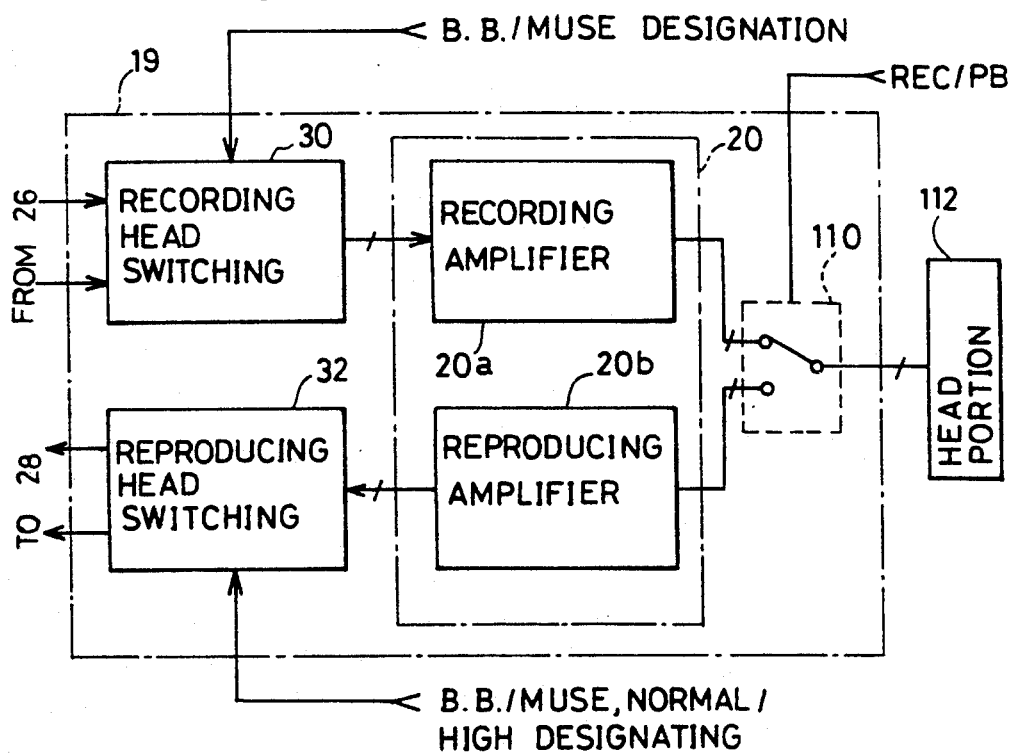
FIG. 28 is a block diagram of a head switching circuit.

Referring to FIG. 28, the head switching circuit 19 includes the recording head switching circuit 30 and the reproduction head switching circuit 32, as previously described. The circuit 19 further includes amplifier 20 connected to the output of the circuit 30 and to the input of the circuit 32. The amplifier 20 includes a recording amplifier 20a for adjusting the output level of the circuit 30, and a reproducing amplifier system 20b for amplifying the output of the head portion 112. The circuit 19 further includes a recording/reproducing switch 110 having a common terminal connected to the head portion 112 responsive to a recording/reproducing designating signal applied from the mode designating circuit 18 for selectively connecting the recording amplifier 20a and the reproducing amplifier system 20b to the head portion 112. The recording head switching circuit 30 operates in response to the baseband/MUSE designating signal applied from the mode designating circuit 18. The reproducing head switching circuit 32 operates in response to a baseband/MUSE detection signal and a signal for designating a normal reproduction/high speed reproduction applied from the mode designating circuit 18.

The head portion 112 includes the rotary heads 2-9. The reproducing amplifier system 20b includes amplifiers respectively connected to the rotary heads 2-9 for amplifying signals picked up by the rotary heads and equalizers respectively connected to the amplifiers for equalizing the amplified signals.

Referring to FIGS. 9-28, the apparatus according to the preferred embodiment of the present invention operates as follows. For convenience's sake. recording and reproducing of a baseband signal will be first described and recording and reproducing of a MUSE signal will be described subsequently.

(1) Baseband signal
(A) Recording

In recording a baseband signal, the operator selects a processing of a baseband signal and a recording processing by a mode setting signal applied to the mode designating circuit 18. The mode designating circuit 18 sets a baseband/MUSE selecting signal to a value indicating a selection of a baseband signal, for example to a "high" level. The mode designating circuit 18 also sets a signal indicating the recording/reproducing to a value indicating the recording. for example. to a "high" level.

Referring to FIG. 21, the baseband/MUSE switch 38 connects the baseband signal processing circuit 34 to the D/A converter 44. The baseband/MUSE synchronization switch 40 connects the baseband signal processing circuit 34 and the timing signal generating circuit 42.

Referring to FIG. 22, the A/D converter 48 is supplied with the luminance signal Y and the chrominance signals Pr and Pb of the baseband signal. The luminance signal Y is also applied to the synchronization separating circuit 58. The synchronization separating circuit 58 separates synchronizing signals of the baseband signal from the luminance signal Y. The separated synchronizing signals are applied to the timing signal generation circuit 42 through the switch 40. The timing signal generation circuit 42 outputs timing signals in synchronization with the synchronizing signal of the baseband signal.

Referring to FIG. 27, the baseband/MUSE identifying signal generation circuit 106 generates an identifying signal indicating a baseband signal and applies the same to the control head 108. The control head 108 records the identifying signal 24a on the control track 23 (see FIG. 2) of the tape 10.

Referring to FIG. 28, the recording/reproducing switch 110 of the head switching circuit 19 connects the recording head switching circuit 30 and the recording amplifier 20a in response to the recording/reproducing signal.

The baseband signal of the two channels applied from the recording processing circuit 21 is switched to be supplied to an appropriate head by the recording head switching circuit 30, which currents are optimally controlled by the recording amplifier 20a and then applied to the head portion 112. Since the recording head switching circuit 30 is supplied with the baseband-/MUSE designating signal from the mode designating circuit 18, the circuit 30 switches the heads suitable for the recording of the baseband signal.

When the recording of the baseband signal is selected as described above, the respective switches make necessary switching of the circuits such that the respective circuits perform the recording processing of the baseband signal in response to the baseband/MUSE designating signal. As a result, there is formed in the apparatus according to the present embodiment, a system for recording a baseband signal as shown in FIG. 29.

Figure 29:
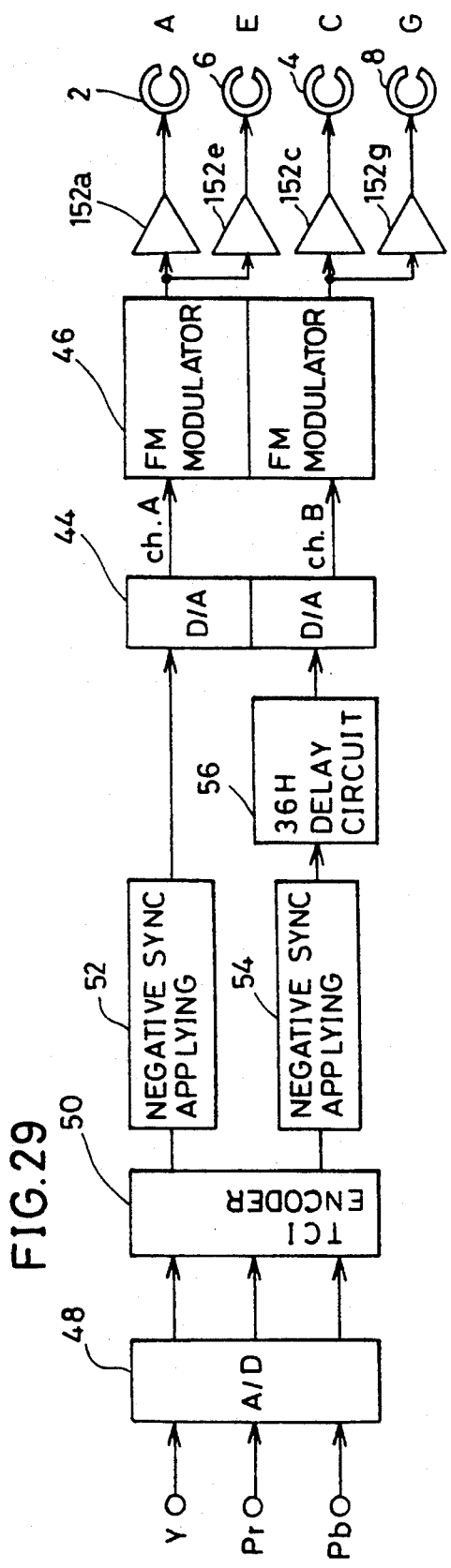
FIG. 29 is a block diagram of a baseband signal recording circuit which is formed in the preferred embodiment of the present invention when the recording process of the baseband signal is selected.

Referring to FIG. 29, the system includes an A/D converter 48 for receiving the signals Y, Pr and Pb and A/D converting the same; a TCI encoder 50 for subjecting the digitized signals Y, Pr and Pb to the previously-described vertical filtering processing, line sequentializing processing, and TCI converting processing, dividing the processed signals into two channels of A and B and for outputting the same; a negative synchronizing signal applying circuit 52 for applying a negative synchronizing signal to the outputted signal of the channel A; a negative synchronizing signal applying circuit 54 for applying a negative synchronizing signal to the signal of the channel B; a 36H delay circuit 56 for delaying the signal of the channel B outputted from the negative synchronizing signal applying circuit 54 by a time corresponding to 36H to the baseband signal; a D/A converter 44 for D/A converting the signals of the channels A and B; an FM modulator 46 for FM modulating the analog signal outputted from the D/A converter 44; rotary heads 2 and 6 for receiving the signal of the channel A outputted from the FM modulator 46 and recording the same in the channel A of the main track (see FIG. 13) and the channel E of the subtrack on the tape 10, respectively; amplifiers 152a and 152e for optimally controlling the currents applied to the rotary heads 2 and 6; rotary heads 4 and 8 for recording the signal of the channel B outputted from the FM modulator 46 in the channel C of the main track (see FIG. 13) and the channel G of the subtrack (see FIG. 13) on the tape 10, respectively; and amplifiers 152c and 152g for optimally controlling the currents applied to the rotary heads 4 and 8.

Referring to FIG. 29, the system operates as follows. The signals Y, Pr and Pb are digitized by the A/D converter 48 and applied to the TCI encoder 50. After subjecting the chrominance signals Pr and Pb to the previously-described vertical filtering processing, the TCI encoder 50 subjects the signals to a line sequentializing processing. The TCI encoder 50 further TCI transforms the luminance signal Y and the line-sequential chrominance signals by multiplexing the same in the time domain, dividing the TCI transformed signals into the signals of two channels A and B and outputting the same.

The negative synchronizing signal applying circuit 52 applies a negative synchronizing signal to the signal of the channel A outputted from the TCI encoder 50. The signal of the channel A is further applied to the D/A converter 44, wherein it is converted into an analog signal. The analog signal of the channel A is modulated by the FM modulator 46 and applied to the rotary heads 2 and 6 through the amplifiers 152a and 152e.

The rotary heads 2 and 6 scan on a recording surface of the magnetic tape 10 as described above. Accordingly, the rotary heads 2 and 6 form the channel A of the main track (FIG. 13) and the channel E of the subtrack (FIG. 13), respectively.

The signal of the channel B outputted from the TCI encoder 50 is further applied with a negative synchronizing signal by the negative synchronizing signal applying circuit 54. Then, the signal of the channel B is delayed by a time corresponding to 36H the 36H delay circuit 56. This delay is necessary to realize such recording system of two channels per one track as shown in FIG. 13. The delayed signal is applied to the D/A converter 44. The signal of the channel B D/A converted by the D/A converter 44 is modulated by the FM modulator 46 and then applied to the rotary heads 4 and 8 while the currents of the modulated signal are optimally controlled by the amplifiers 152c and 152g.

The rotary heads 4 and 8 scan on the recording surface of the magnetic tape 10. The rotary heads 4 and 8 form the channel C of the main track (FIG. 13) and the channel G of the subtrack, respectively. As described above, the rotary heads 4 and 8 are disposed on the rotary drum 1 with a phase difference of 46.08° with respect to the rotary head 2 and the rotary head 6, respectively. As shown in FIG. 13, in order to synchronize the signal recorded in the channel A formed by the rotary head 2 with the signal recorded in the channel C formed by the rotary head 4, it is necessary to delay the signal to be applied to the rotary head 4 to cancel the displacement, considering the above-described displacement of the rotary heads 2 and 4. The 36H delay circuit 56 is provided for this purpose. Such main track including two channels A and C as shown in FIG. 13 is formed by delaying the signal applied to the rotary head 4 by 36H with respect to the signal applied to the rotary head 2.

Referring to FIG. 13, the same stands in the case of the channels E and G of the subtrack formed by the rotary heads 6 and 8. Namely, a phase difference corresponding to 36H between the signals applied to the rotary heads 6 and 8 allows the signals of the two channels of the subtrack formed on the tape 10 to synchronize with each other.

During the above-described decoding processing of the baseband signal, the speed controlling circuit 21 and the capstan driving circuit 22 (see FIG. 9) cause the tape 10 to travel at a constant speed of 2Vt in response to the signal for designating a baseband signal applied from the mode designating circuit 18. The baseband signal recording system shown in FIG. 29 enables the recording of the baseband signal on the magnetic tape 10 in the track pattern shown in FIG. 13. In recording the baseband signal, one track includes two channels and signals recorded in the two channels form one field of a baseband signal. Two tracks form one frame of a baseband signal.

(B) Reproduction

Reproduction of a baseband signal has two types. One is a reproduction at a normal speed and the other is a reproduction at a high speed. Operations of the apparatus according to the present embodiment in the respective modes will be sequentially described in the following.

(a) Normal reproduction

In a normal reproduction, the operator designates a reproduction at a normal speed to the mode designating circuit 18 by a mode setting signal. It is not necessary to designate whether a signal to be reproduced is a baseband signal or a MUSE signal. Because, referring to FIG. 20, in reproducing, it can be seen that the signal to be reproduced is a baseband signal by detecting that a reference signal for a capstan servo system reproduced from the control track 23 includes a baseband identifying signal 24a.

Referring to FIG. 27, in response to the baseband identifying signal 24a reproduced by the control head 108, the baseband/MUSE detection circuit 104 sets a value of the baseband/MUSE detection signal to a value indicating a baseband signal, for example, a "high" level. Also in response to a mode setting signal indicating a normal reproduction, the baseband/MUSE detection circuit 104 sets a signal indicating a reproducing speed to a value indicating "normal", and a value of a signal for designating recording/reproduction to a value indicating reproduction, for example, a "low" level.

Referring to FIG. 24, in response to the baseband/MUSE detection signal, the baseband/MUSE switch 74 connects the output of the FM modulator 76 to the input of the baseband signal reproduction circuit 70.

Referring to FIG. 28, in response to a signal designating the reproduction from the mode designating circuit 18, the recording/reproduction switch 110 connects the reproducing amplifier system 20b and the reproducing head switching circuit 32. The reproducing head switching circuit 32 is supplied with a signal for designating a reproduction of a baseband signal and a signal designating a reproduction at a normal speed.

Figure 30:
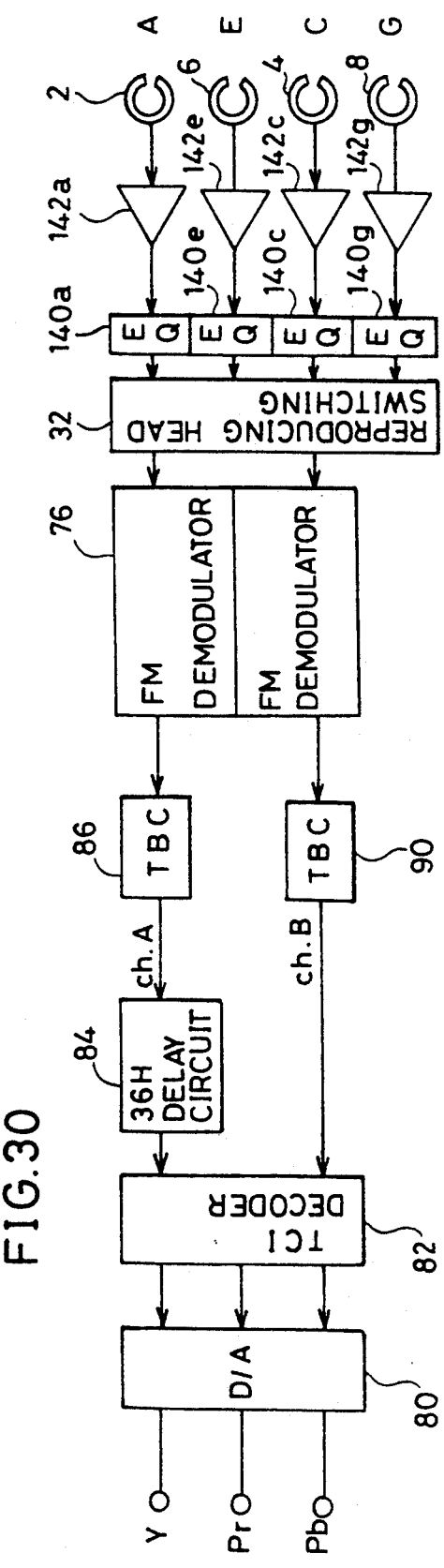
FIG. 30 is a block diagram of a baseband signal reproducing circuit which is formed in the preferred embodiment of the present invention when reproducing process of the baseband signal is selected.

In the case where the respective switches included in the apparatus according to the preferred embodiment perform necessary connection in response to the signal applied from the mode designating circuit 18 as described above, a system for reproducing a baseband signal as shown in FIG. 30 is formed in this apparatus.

Referring to FIG. 30, the reproducing system includes rotary heads 2, 4 for picking up signals recorded in the channels A, C of the main track, respectively; rotary heads 6, 8 for picking up signals recorded in the channels E, G of the subtrack, respectively; amplifiers 142a, 142e, 142c and 142g for amplifying the outputs of the rotary heads 2, 6, 4 and 8, respectively; equalizers 140a, 140e, 40c, 140g for equalizing the intensity of sidebands of FM carriers of the FM signals provided from the amplifiers 142a, 142e, 142c, 142g; a reproducing head switching circuit 32 for switching and combining the outputs of the equalizers 140a, 140e, 140c, 140g in response to the baseband/MUSE detecting signal and a normal reproducing head switching pulse to provide a signal of two channels; an FM demodulator 76 for FM demodulating the channel A, B signals provided from the reproducing head switching circuit 32; TBC circuits 86, 90 for correcting a time-base error of the channel A and channel B signals, respectively; a 36H delay circuit 84 for delaying the channel A signal by 36H; a TCI decoder 82 for decoding the channel A and channel B signals provided from the 36H delay circuit 84 and the TBC circuit 90 and providing digital signals Y, Pr, Pb; and a D/A converter 80 for D/A converting the signals provided by the TCI decoder 82 and for outputting the luminance signal Y, chrominance signals Pr, Pb.

The system shown in FIG. 30 operates as described below. The rotary heads 2, 4, respectively pick up the channel A, C signals in the main track. The rotary heads 6, 8 respectively pick up the channel E, G signals in the subtrack. The picked-up signal amplified by the respective amplifiers are supplied to the reproduction head switching circuit 32 through the equalizers. The reproducing head switching circuit 32 combines the signals provided from the rotary heads 2, 6 to output them to the channel A as a single system signal. The reproducing head switching circuit 32 also combines the signals picked up by the rotary heads 4, 8 to output them to the channel B as a single system signal.

Both of the signals of channels A, B are demodulated by the FM demodulator 76 and are corrected for their time base errors by the TBC circuit 86.

The signal in the channel A is delayed by a time corresponding to 36H by the 36H delay circuit 80 and provided to the TCI decoder 82. The signal in the channel B is supplied to the TCI decoder 82 without delay.

Referring to FIG. 31 (a), one frame of an original baseband signal ($TV_{in}$) includes 1125Hs. The one frame includes two fields.

Figure 31A:
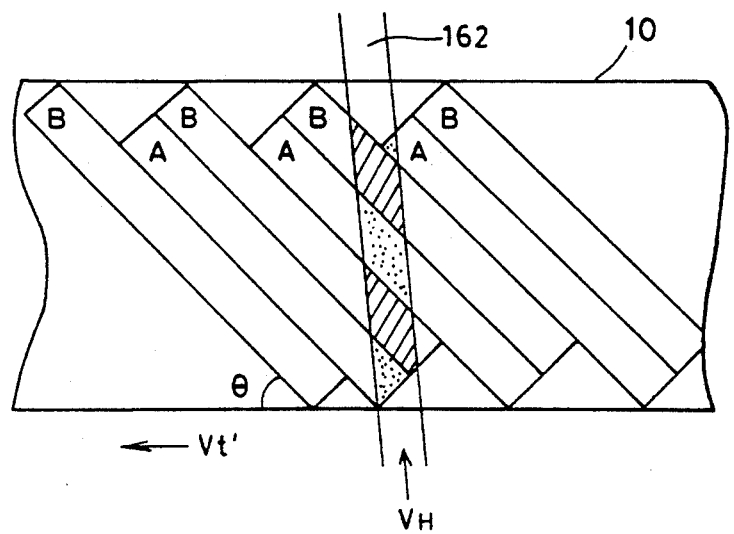
FIG. 31A is a schematic diagram of the track pattern for recording baseband signals.
Figure 31B:
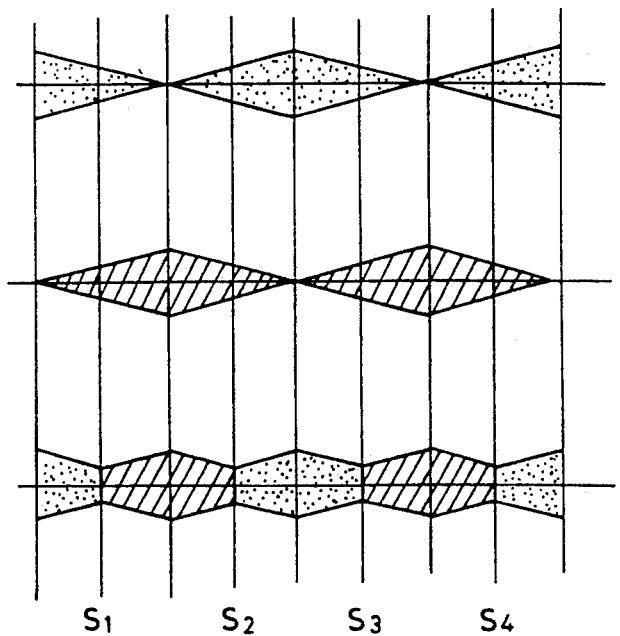
FIG. 31B(a-c) is a schematic waveform diagram of signals reproduced in a high-speed.

Referring to FIG. 31(b), the signal ($TCI_{out}$) recorded on the magnetic tape by the system shown in FIG. 29 is divided into the channels A, B as described above. That is to say, during the time period corresponding to one field of the original signal, signals corresponding to a half field are recorded on each of the channels A and B. However, due to the existence of the 36H delay circuit 56 in FIG. 29, the signal recorded in the channel B is delayed in phase by a period corresponding to 36H compared to the signal recorded in the channel A. Therefore, the channel B signal reproduced by the rotary heads 4, 8 is delayed in phase by 36H from the channel A signal reproduced by the rotary heads 2 and 6.

The 36H delay circuit 84 in the reproducing system is for compensating the phase gap between the above-described channel A signal and the channel B signal by delaying the channel A signal by a period corresponding to 36H. Therefore, the phase of the channel A and channel B of the signal ($TCI_{in}$) to be supplied to the TCI decoder 82 coincide with each other as shown in FIG. 31 (c). Based on the two channel signals, signals ($TV_{out}$) Y, Pr, Pb, provided by the TCI decoder 82 as shown in FIG. 31 (d), have a common cycle coinciding with that of the original signal.

(b) High speed reproduction

In high speed reproduction, an operator supplies a signal indicating that high speed reproduction is to be performed to the mode designating circuit 18. The mode designating circuit 18 supplies a recording/reproducing signal indicating that reproduction should be performed and a normal/high speed reproduction designating signal instructing high speed reproduction to the respective parts of the apparatus. The mode designating circuit 18 also provides a baseband/MUSE detecting signal indicating baseband signal processing in response to the baseband/MUSE identifying signal 24a reproduced from the control track 23.

Referring to FIG. 21, the switch 38 connects the baseband signal processing circuit 34 and the D/A converter 44. The switch 44 connects the baseband signal processing circuit 34 and the timing generating circuit 42.

Referring to FIG. 24, the switch 74 of the reproduction process circuit 28 connects the FM demodulator 76 and the baseband signal reproducing circuit 70.

Referring to FIG. 28, the switch 110 of the head switching circuit 19 connects the reproducing head switching circuit 32 and the reproducing amplifier system 20b.

Referring to FIG. 9, the speed controlling circuit 21 and the capstan driving circuit 22, in response to the signal indicating high speed reproduction supplied from the mode designating circuit 18, increase the rotation speed of the capstan 16 to run the magnetic tape 10 at a high speed.

By the above-described operation of the respective switches included in the apparatus of the present embodiment, a circuit for reproducing the baseband signal similar to that in FIG. 30 is formed in this apparatus. The system is different from the one in FIG. 30 in that all of the rotary heads are coupled to the reproducing head switching circuit 32.

In doubled speed reproduction, the tape runs at a speed $V_t'$ twice the normal speed $2V_t$ (As the normal speed is $2V_t$ in the case of reproducing baseband sign speed $V_t'$ equals to $4V_t$ at doubled speed reproduction). Therefore, the locus 162 of scanning head crosses the magnetic recording tape 10 at an angle much closer to a right angle as shown in FIG. 31A than a track lead angle $\theta 0$ in the normal reproduction. The respective heads sequentially cross the adjacent fields A,B,A,B,A. As the respective fields are azimuth-recorded, when reproducing the adjacent tracks, as shown in FIG. 31B (a) or 31B (b), the reproduced output can not be sufficiently obtained due to azimuth loss in some portions. In this condition, a good search image can not be obtained because a signal lacking portion occurs within a field.

However, the signal phases of the reproduced output Play₁ of the rotary head 2 and the reproduced output Play₂ of the rotary head 3 become opposite to each other. Therefore, by switching the rotary heads 2 and 3 at a high speed with timing of S1, S2, S3, S4 as shown in FIG. 31B in one scanning, the signal remains above a certain level so that a good search image can be obtained. In high speed reproduction of the baseband signal, two channel signals are reproduced employing 8 rotary heads.

The subsequent processes are the same as those in normal reproduction described above. Therefore, the detailed description thereof is not repeated here.

(2) MUSE signal

(A) Recording

When recording the MUSE signal, referring to FIG. 20, a value indicating recording process of the MUSE signal is provided to a mode designating circuit 18 as a mode setting signal. In response to the mode setting signal, the mode designating circuit 18 sets the baseband/MUSE selecting signal to a "low" level, for example, and the recording/reproducing signal, for example, to a "high" level.

Referring to FIG. 21, in response to the baseband/MUSE selecting signal, the recording process circuit 26 connects the MUSE signal processing circuit 36 and the D/A converter 44. The switch 40, in response to the baseband/MUSE selecting signal, connects the circuit 36 and the circuit 42. Thus, the signals provided from the timing signal generating circuit 42 become signals for processing the MUSE signal.

Referring to FIG. 27, the baseband/MUSE identifying signal generating circuit 106 generates an identifying signal indicating that the signal to be recorded is the MUSE signal and provides the same to the control head 108. Referring to FIG. 20, the control head 108 records the discriminating signal 24b on the control track 23 of the tape 10.

Referring to FIG. 28, the switch 110 of a head switching circuit 19, in response to the recording/reproducing designating signal, connects the recording head switching circuit 30 and the recording amplifier 20a. The recording head switching circuit 30, in response to the "low" level of the baseband/MUSE designating signal, performs operation for processing the MUSE signal.

Referring to FIG. 9, the speed controlling circuit 21 and the capstan driving circuit 22, in response to the baseband/MUSE selecting signal supplied from the mode designating circuit 18, runs the tape 10 at a constant speed of $V_t$.

Figure 23:
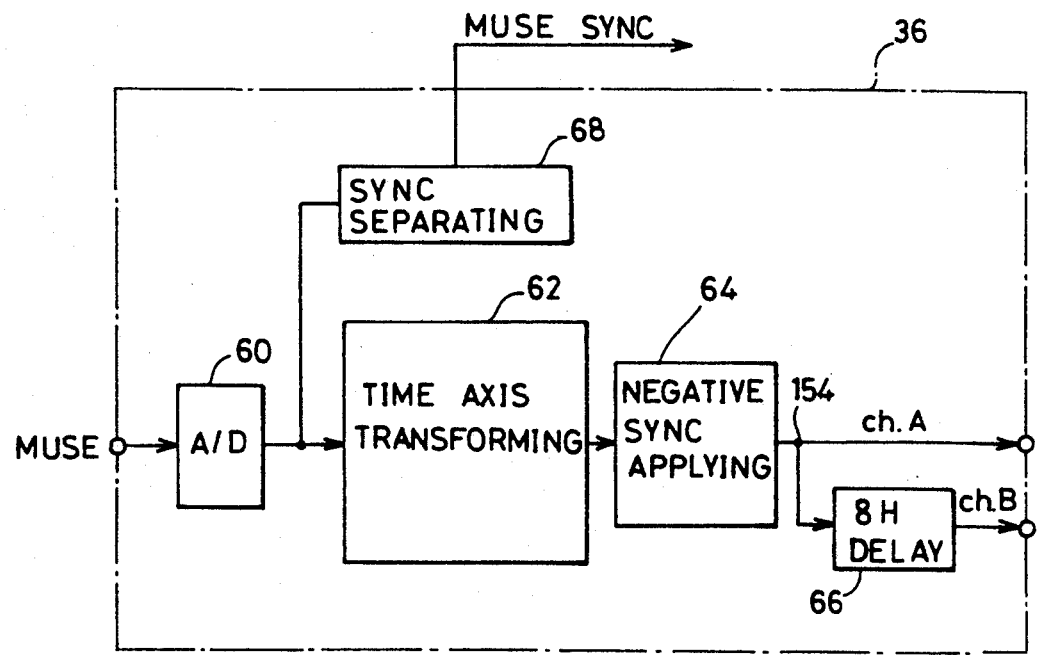
FIG. 23 is a block diagram of a MUSE signal processing circuit.

By the above-described operation of the respective switches in the apparatus in response to the signal outputted from the mode designating circuit 18, a recording system for the MUSE signal as shown in FIG. 32 (a) is formed in the apparatus. Note that, in FIG. 32 (a), to simplify the figure, only the circuits subsequent to the negative synchronizing signal applying circuit 64 of FIG. 23 are shown.

Referring to FIGS. 9-32, the system for recording the MUSE signal operates as follows. Referring to FIG. 21, the MUSE signal is supplied to the MUSE signal processing circuit 36. Referring to FIG. 23, the supplied MUSE signal is digitalized by an A/D converter 60 and supplied to the time-axis transforming circuit 62 and the synchronization separating circuit 68. The synchronization separating circuit 68 separates synchronizing signals from the digitized MUSE signal and supplies the same to the timing signal generating circuit 42 (FIG. 21).

The time-axis-transforming circuit 62, performing time-axis-transforming process of the MUSE signal already described referring to FIGS. 7 and 8, provides a signal having a quasi TCI waveform. The negative synchronizing signal applying circuit 64 adds a negative synchronizing signal applying to the outputted signal.

Referring to FIG. 32 (a), the MUSE signal provided from the negative synchronizing signal applying circuit 64 and supplied to the terminal 154 is separated into two channels A and B. Note that a "channel" in this description is used for a convenience of description, and is different from the term "channel" used when describing the baseband signal processing.

The signal in the channel A is supplied to the D/A converter 44 and analogized. The analogized signal in the channel A is frequency modulated by the FM modulator 46 and supplied to the head switching circuit 30.

The channel B signal is delayed by a period corresponding to 8H from the channel A signal by the delay circuit 66 and supplied to D/A converter 44. The channel B signal analogized by the D/A converter 44 is modulated by the FM modulator 46 and supplied to the head switching circuit 30. That is to say, there is a phase difference corresponding to 8H between the channel A and the channel B signals supplied to the head switching circuit 30.

The recording head switching circuit 30 supplies the channel A signal to the rotary heads 2, 6 and the channel B signal to the rotary heads 3, 7, respectively. The switch 110 (FIGS. 28 and 32), as described above, connects the reproduction side circuit to the respective rotary heads through an amplifier not shown. Therefore, by the rotary head 2, a main track A shown in FIG. 14 is formed on the tape 10. A subtrack E is formed by the rotary head 6. A main track B is formed by the rotary head 3. A subtrack E is formed by the rotary head 7.

The phase difference of 5.12° corresponding to 8H of the MUSE signal as described above (refer to FIGS. 10 and 11) is provided between the rotary heads 2 and 3 and between the rotary heads 6 and 7. Due to this phase difference, without the 8H delay circuit 66, some portions of the signals would be omitted on the track formed by the rotary heads 3 and 7. However, by providing a time delay corresponding to 8H to the signal supplied to the rotary heads 3 and 7 by the delay circuit 66, the rotary heads 3 and 7 can record the signal from the beginning of track without phase error or omission.

(B) Reproduction

In the reproduction of the MUSE signal, the speed can be switched either to a normal and a high speed.

(a) Reproduction at a normal speed

In reproduction at a normal speed, the mode designating circuit 18 makes the normal/high speed reproduction designating signal "low" level, for example. The mode designating circuit 18 also makes the recording/reproducing designating signal "low" level.

Referring to FIG. 9, the speed controlling circuit 21 and the capstan driving circuit 22, in response to the selection of the MUSE signal processing, runs the magnetic tape 10 at a constant speed of $V_t$.

Referring to FIGS. 20 and 27, the control head 108 reproduces the identifying signal 24b indicating the MUSE signal from the control track 23 of the magnetic tape 10, and supplies the same to the baseband/MUSE detecting circuit 104. In practice, nothing is recorded as a MUSE identifying signal, but only the signal identifying the baseband signal is recorded. In reproduction, the baseband signal processing is performed when a signal identifying the baseband signal is detected, and otherwise, the MUSE signal process is performed.

The baseband/MUSE detecting circuit 104, in response to externally applied reproduction instructing signal and normal speed reproduction instructing signal, and a baseband/MUSE identifying signal reproduced by the control head 108, sets the recording/reproducing designating signal at a value indicating reproduction, and the baseband/MUSE detecting signal at a value indicating the MUSE signal, and the normal/high speed designating signal at a value indicating normal reproduction, respectively.

Referring to FIG. 24, the switch 74, in response to the baseband/MUSE detecting signal, connects the FM demodulator 76 and the MUSE signal reproducing circuit 72. The field switching signal generating circuit 78, as shown in FIG. 33 (a), by alternately attaining a "high" level and a "low" level for each field, generates a signal indicating field switching timing.

Referring to FIG. 26, the video switching circuit 96 of the MUSE signal reproducing circuit 72, in response to the field switching signal, switches alternately the output of the 8H delay circuit 98 and the output of the TBC circuit 102 and supplies the same to the time-axis transforming circuit 94.

Referring to FIG. 28, the switch 110 of the head switching circuit 19, in response to the recording/reproducing designating signal, connects the head portion 112 and the reproducing amplifier system 20b. The reproducing head switching circuit 32 operates in response to the baseband/MUSE designating signal and the normal/high speed designating signal.

By setting respective switches in the apparatus as described above, a system for MUSE signal reproduction shown in FIG. 32 (b) is formed in this apparatus. Also in FIG. 32 (b), only circuits subsequent to the video switching circuit 96 are not shown for convenience of describing.

In reproduction, the switch 110 connects circuits on the reproducing side and rotary heads 2, 3, 6 and 7. The signals picked up by the rotary heads 2, 3, 6 and 7 are combined into two signals of channel A and B in the reproducing head switching circuit 32. The channel A signal is formed by combining signals picked up by the rotary heads 2 and 6. The channel B signal is formed by combining signals provided from the rotary heads 3 and 7. As described above, the signals picked up by the rotary heads 3 and 7 have been recorded on the magnetic tape, being delayed by a time corresponding to 8H. Therefore, the channel B signal provided from the reproducing head switching circuit 32 is delayed by a time corresponding to 8H compared to the channel A signal.

Outputs from the reproducing head switching circuit 32 are respectively demodulated by the FM demodulator 76 and supplied to the TBC circuit 100. The TBC circuit 100 corrects the time-base error of the reproduced channel A and channel B signals and outputs it. Among outputs of the TBC circuit 100, the channel A signal is delayed by the 8H delay circuit 98 by a time corresponding to 8H. The output of the 8H delay circuit 98 is provided to one input terminal of the video switching circuit 96. The channel B signal provided from the TBC circuit 100 is supplied to the other input terminal of the video switching circuit 96.

The video switching circuit 96, in response to the field switching signal supplied from the field switching signal generating circuit 78 shown in FIG. 24, switches two input signals for every field to output it as a single-system signal to the output terminal 156.

Referring to FIG. 26, the signal outputted from the video switching circuit 96 is supplied to the time-axis transforming circuit 94 as a single-system signal. The time-axis transforming circuit 94 performs a process reverse to that performed by the time-axis transforming circuit 62 in recording shown in FIG. 23 and reconstructs and provides the MUSE signal. The provided MUSE signal is D/A converted by the D/A converter 92 and outputted therefrom.

As the channel A signal is delayed by a time corresponding to 8H, its phase synchronous with that of the channel B signal which has been delayed and recorded with a time delay corresponding to 8H. Therefore, the signal provided to the time-axis transforming circuit 94 coincides with the original MUSE signal.

The time relation of the respective signals in recording and reproducing of the MUSE signal above-described is shown in FIG. 33. Referring to FIG. 33 (a), the field switching signal alternately takes a "high" level and a "low" level for every field. Referring to FIG. 33 (b), the MUSE signal to be recorded includes successive signals of fields alternating with each other in synchronization to the field switching signal.

The signals supplied to the rotary heads 3 and 7 are delayed by the 8H delay circuit 66 by a time corresponding to 8H. Therefore, as shown in FIG. 33 (c), the fields of the signal are switched with a time lag of 8H compared to the original signal.

The signals supplied to the rotary heads 2 and 6 are hatched portions of signal shown in FIG. 33 (b) and one shown in FIG. 33 (d). On the other hand, the signals supplied to the rotary heads 3 and 7 are signals of not hatched portions in the signal shown in FIG. 33 (c) and shown in FIG. 33 (e).

Therefore, while the signals picked up by the rotary heads 2 and 6 are one shown in FIG. 33 (d), the signals picked up by the rotary heads 3 and 7 are, as shown in FIG. 33 (e), one delayed by 8H from the signal picked up by the rotary heads 2 and 6.

The 8H delay circuit 98 of the reproducing system is for compensating the 8H phase gap. By delaying the channel A signal by the 8H delay circuit 98, the channel A signal provided to the video switching circuit 96 becomes one shown in FIG. 33 (f). The signal supplied to the other input terminal of the video switching circuit 96 is shown in FIG. 33 (g). Between the two signals, there is no phase difference. The video switching circuit 96 switches the input signals by a field switching signal delayed by 8H from the field switching signal shown in FIG. 33 (a). Thus, as shown in FIG. 33 (h), the output of the video switching circuit 96 becomes a one-system signal in which the respective fields are combined without omission.

(b) High speed reproduction

When reproducing the MUSE signals at a high speed, the mode designating circuit 18 makes a normal/high speed reproduction designating signal "low" level. The mode designating circuit 18 also makes the recording-/reproducing designating signal "low" level. The tape 10, for example, in the case of reproduction at a doubled speed, runs at a constant speed of $2V_t$.

A method for the baseband/MUSE detecting circuit 104 to detect that the signal being reproduced is a MUSE signal is the same as that in the case of normal reproduction.

Respective switches of the apparatus are set similarly to that in normal reproduction. Therefore, in the apparatus, as well as in the case of normal reproduction, the system shown in FIG. 32 (b) is formed.

The rotary heads 2, 6 and the rotary heads 3, 7 have azimuth angles opposite to each other. Therefore, also when reproducing the MUSE signal at a high speed, signals similar to those shown in FIG. 31B (a) and (b) can be obtained by these heads. As the head switching circuit 32 switches and combines these signals at a high speed, the signal shown in FIG. 31B (c) can be obtained similarly to the case of high speed reproduction of the baseband signal.

As described above, the apparatus according to the first preferred embodiment of the present invention can selectively record the baseband signal and the MUSE signal on a magnetic tape, and reproduce these signals at a normal speed and a speed different from the normal speed. Employing a rotary drum with head arrangement as shown in FIGS. 10 and 11 and considering phase difference between the respective rotary head positions, a track pattern as shown in FIGS. 13 and 14 can be obtained by providing a suitable phase difference between two channel signals.

In the track pattern shown in FIG. 13, the baseband signals can be two-channel-recorded by the "1.1 head system". In the track pattern shown in FIG. 14, the MUSE signal can be one-channel-recorded by the "1.1 head system". The track pattern shown in FIG. 13 is similar to that of a conventional apparatus with normal "two channels per track" recording system. The track pattern shown in FIG. 14 also includes a similar form to that formed in a conventional one channel recording system of the "1.1 head system". Therefore, the compatibility of the apparatus according to the present invention with apparatuses specialized for processing the baseband signal or the MUSE signal, can be easily assured.

In the above-described preferred embodiment, a signal in one channel is delayed by 36H from a signal in the other channel in recording the baseband signal. However, the time delay is decided in accordance with the head arrangement as shown in FIGS. 10 and 11. Therefore, the time delay limited to 36H. That is to say, by changing the head speed, the time delay changes depending on the same.

Also, in processing the MUSE signal, one signal is delayed by 8H from the other signal. However, this is just an example, and the time delay also can vary depending on the head arrangement.

Second Preferred Embodiment

In the above-described first preferred embodiment, an apparatus is disclosed which can record two signals with bandwidth considerably different from each other, such as the baseband signal and the MUSE signal, and which can reproduce them at different speeds. However, in the apparatus of the first preferred embodiment, there are some points to be considered as follows.

(1) In the above-described apparatus, the baseband signal is recorded in two channels, but the MUSE signal is recorded in one channel. However, for processing the MUSE signal, apparatuses such as TBC circuits for two channels are required. These apparatuses should be reduced in number as much as possible.

(2) The signals provided to the FM demodulator 76 shown in FIG. 24, to the TBC circuit 100 or 102 shown in FIG. 26 are alternated for every field. That is to say, signals provided to these circuits disappear alternately for every field. Therefore, it is required that the above-mentioned circuits do not operate abnormally during the period without signals, and that the same circuits can shift to a normal operation in a moment when the signal is supplied. Thus, in the step of apparatus circuit design, consideration must be given especially to the points.

Especially, to solve the problems mentioned in the above-described (2), process dedicated thereto should be performed. Generally, the above-described circuits are designed on the assumption that inputted signals are continuous. In the TBC circuit, particularly, the correcting process is performed on the assumption that the reproduced signal is continuous. Therefore, in the TBC circuit, when it enters into a signal existing period from a no-signal period, the time base error of the reproduced signal can not be corrected in a moment. Thus, the quality of the obtained signals may possibly be degraded.

The second preferred embodiment described below is directed to solve the points considered described above by devising a format of a track formed on the tape.

Before describing the apparatus according to the second preferred embodiment of the present invention, referring to FIG. 34, a track format according to this second preferred embodiment will be described. The track format for recording the baseband signal in this embodiment is similar to that in the first preferred embodiment, which is shown in FIG. 13. The format shown in FIG. 34 is defined, and hereinafter referred to, as a "zigzag" format for recording the MUSE signal.

Referring to FIG. 34, a feature of the zigzag format is that the tracks A and B formed on the tape 10 are formed at positions different from each other. The track A is provided in the main track region 13 having a track lead angle $\theta_3$. The track B is formed with downward displacement along a track direction by a distance corresponding to 8H from the starting point of the track A. To obtain such a format, in the apparatus of the second preferred embodiment, the tape 10 is wrapped around the rotary drum 1 longer by 8H of the MUSE signal than that of the first preferred embodiment in recording/reproducing the MUSE signal.

By the above contrivance, the recording length $\theta_{V}$ of a main track becomes longer by a length corresponding to 8H than the recording length $\theta_1$ for one frame. To implement such track pattern, if the effective main track recording width $W_1$ and the effective subtrack recording width $W_2$ are the same as that shown in FIG. 13, the track lead angle $\theta_3$ in FIG. 34 must be smaller than the track lead angle $\theta_2$ in FIG. 14.

The subtracks E, F are also arranged with a mutual displacement of a length corresponding to 8H of the MUSE signal as well as the main tracks A and B.

By employing the zigzag format, unavailable region on the magnetic tape expands slightly and the recording efficiency of the magnetic tape is slightly lowered. The zigzag format, however, can considerably simplifies a circuit for processing the MUSE signal. The advantages thereof become apparent in the following description of the second preferred embodiment.

Figure 34A:
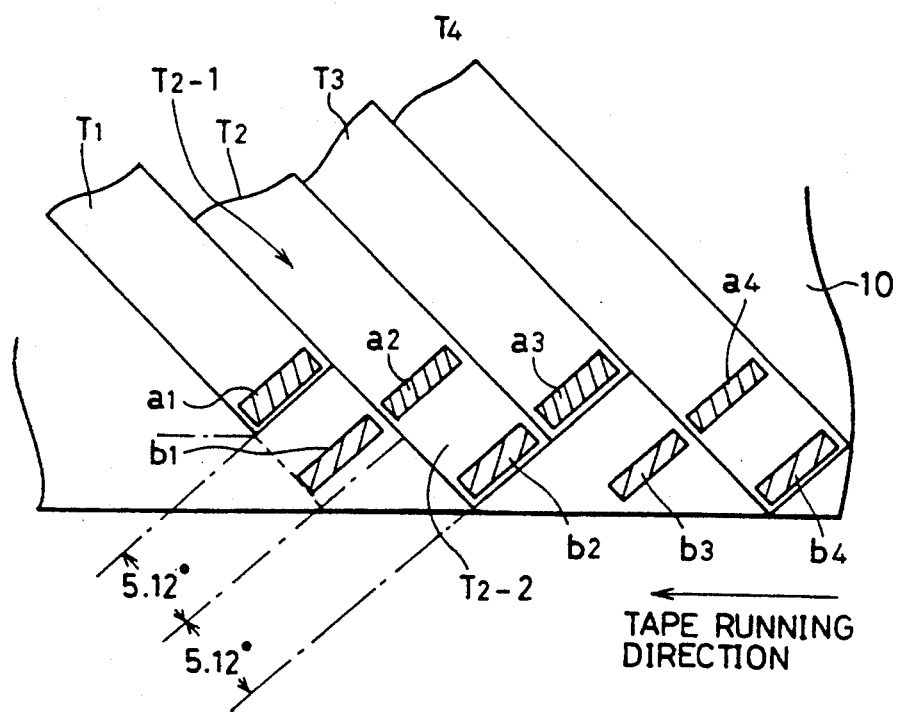

Referring to FIG. 34A, the zigzag format is described in further detail. On the magnetic tape 10, main tracks T1, T2, T3 and T4 are formed according to the zigzag format. The main tracks T1 and T3 start at the same position. However, the tracks T2 and T4 begin at a lower position along the direction of tracks than the tracks T1 and T3. In the case of the zigzag format shown in FIG. 34A, this displacement corresponds to a phase difference of 5.12°. This value is selected in the case where such a rotary head arrangement is employed as already described in the first preferred embodiment referring to FIGS. 10 and 11.

In recording the MUSE signal, the same heads employed in the first embodiment are also employed. Therefore, the rotary drum 1 shown in FIGS. 10 and 11 will be described as an example in the followings.

With the first revolution of the rotary drum 1, the main track T1 is formed by the rotary head 2. The position of the rotary head 2 at the beginning of forming the main track T1 is shown in FIG. 34A by portion a1 with oblique lines. At this time, the rotary head 3 is at a position shown by oblique line portion b1. The interval between the oblique line portion a1 and b1 is 5.12° measured by the angle around the center of the rotary drum 1.

In the subsequent one revolution of the rotary drum, the main track T2 is formed by the rotary head 3. As already described in the first preferred embodiment, when the signal applied to the rotary head 3 is not delayed at all, the recording of signal begins when the rotary head 3 is at the oblique line portion b2. At this time, the rotary head 2 is at the position shown by the oblique line portion a2. In the first preferred embodiment, to solve the phase gap, the signal applied to the rotary head 3 is delayed by a portion corresponding to 8H. As a result, the rotary head 3 begins to record the signal when it arrives at the position shown in the oblique line portion a2 of FIG. 34A.

However, in the second preferred embodiment of present invention, the signal supplied to the rotary head 3 is not delayed at all. Consequently, the rotary head 3 begins forming the track T2 from the position of the oblique line portion b2 in FIG. 34A. While a portion of the main track T2-1 is employed for recording in the first preferred embodiment, the MUSE signal is also recorded in the portion T2-2 lower than the oblique line portion a2 in the second embodiment. However, the rear end of tracks are shorter.

The same stands for the formation forming of the third track T3 and the fourth track T4. That is, the third track T3 is formed starting at the oblique line portion a3 by the rotary head 2. At this time, the rotary head 3 is at the position of the oblique line portion b3. On the other hand, the track T4 is formed by the rotary head 3 as the rotary drum 1 rotates subsequently to form the track T3. Forming the track T4 is started at a position where the rotary head 3 is at the oblique line portion b4. At this time, the rotary head 2 is at the oblique line portion a4.

That is to say, in the zigzag format, the second and fourth tracks T2, T4 are displaced downward by a distance corresponding to a phase of 5.12° from the first and third tracks T1, T3. By employing the zigzag format, the signal does not have to be delayed in order to make the starting point of tracks flushed, so that the circuits can be configured simply.

Figure 35:
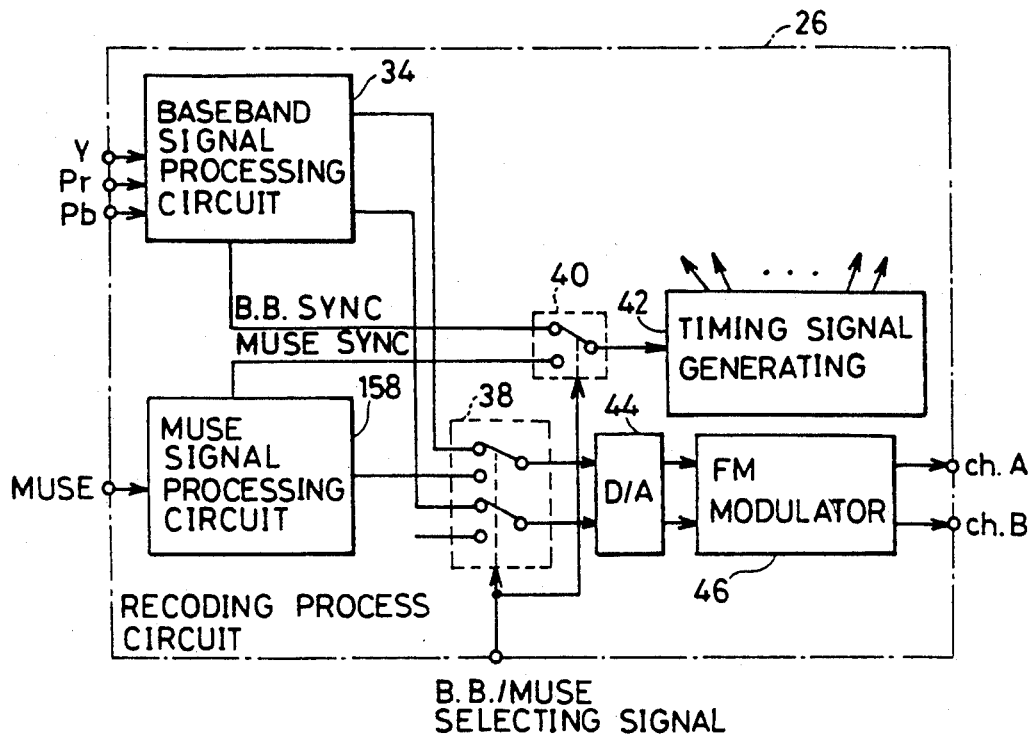
FIG. 35 is a block diagram of a recording process circuit of the second preferred embodiment of the present invention.

FIG. 35 is a block diagram of a recording process circuit 26 in an apparatus for recording the video signals in accordance with the present invention. The apparatus of the second preferred embodiment is the same as the structure of the first preferred embodiment, except a recording process circuit 26, a reproducing process circuit and a reproduction head switching circuit 32. Therefore, in the following description, devices which have corresponding ones in the first embodiment are referred to with like names and like reference numerals, and the detailed description thereof will not be repeated here.

Referring to FIG. 35, the recording process circuit 26 is different from the recording process circuit 26 of the first preferred embodiment in that it has a MUSE signal processing circuit 158 with a simpler structure instead of the MUSE signal processing circuit 36 of FIG. 21. The MUSE processing circuit 158 provides only one output which is connected to one of input terminals on the channel A side of the switch 38. In departure from the switch 38 in the first preferred embodiment, the input terminal of the switch 38 on the channel B side which is not connected to the circuit 34 is not connected to the MUSE signal processing circuit 158.

Figure 36:
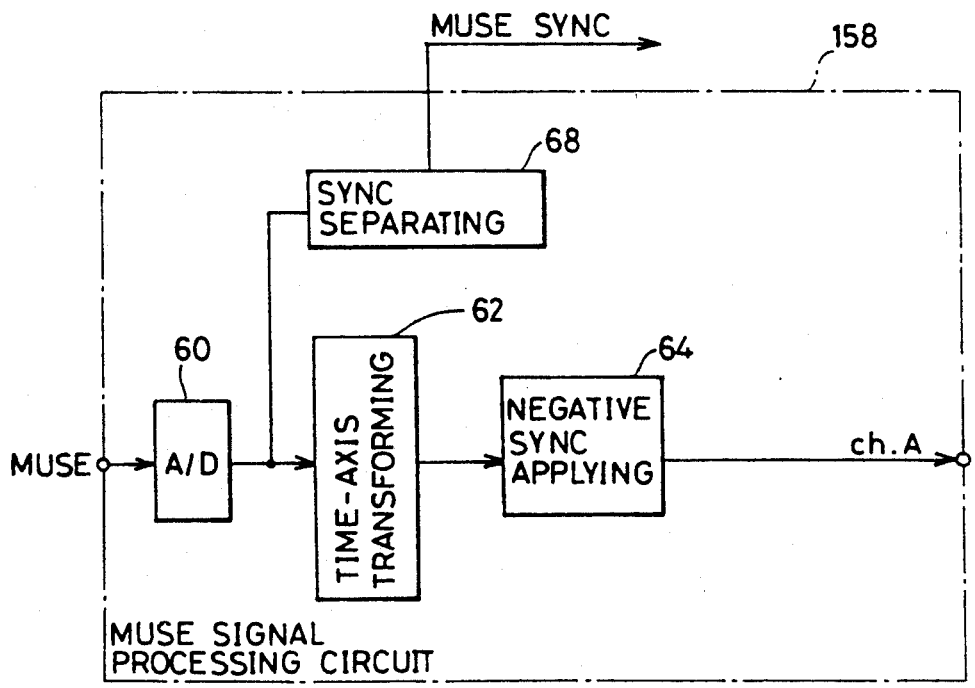
FIG. 36 is a block diagram of a MUSE signal processing circuit of the second preferred embodiment of the present invention.

Referring to FIG. 36, the MUSE signal processing circuit 158 is different from the MUSE signal processing circuit 36 shown in FIG. 23 in that it does not have the 8H delay circuit 66 subsequent to the negative synchronizing signal applying circuit 64, and the output of the circuit 64 is provided to the only one channel A. In the apparatus shown in FIGS. 36 and 23, like devices are given like names and like reference numerals. Their functions are also the same. Therefore, a detailed description thereof will not be repeated here.

Figure 37:
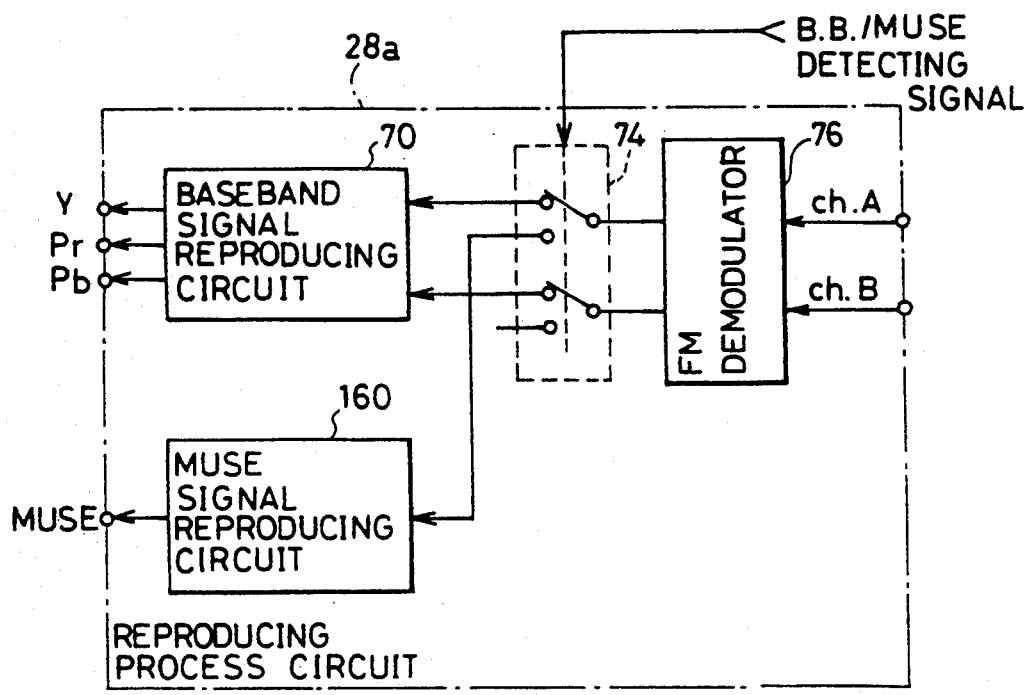
FIG. 37 is a block diagram of a reproducing process circuit of the second preferred embodiment of the present invention.

Referring to FIG. 37, the apparatus according to the second preferred embodiment is further different from the apparatus of the first preferred embodiment in that it includes a reproducing process circuit 28a instead of the reproducing process circuit 28 shown in FIG. 24. The reproducing process circuit 28a is different from the circuit 28 in that it includes a MUSE signal reproducing circuit 160 with a simpler structure compared to the MUSE signal reproducing circuit 72 shown in FIG. 24, that one of the output terminals on the channel B side of the switch 74 is not connected to the MUSE signal reproducing circuit 160, and that a field switching signal generating circuit 78 (FIG. 24) for reproducing is not employed therein. In the apparatus shown in FIGS. 24 and 37, like names and like reference numerals are given to like circuits. Their functions are also the same. Therefore, the detailed description thereof will not be repeated here.

Figure 38:
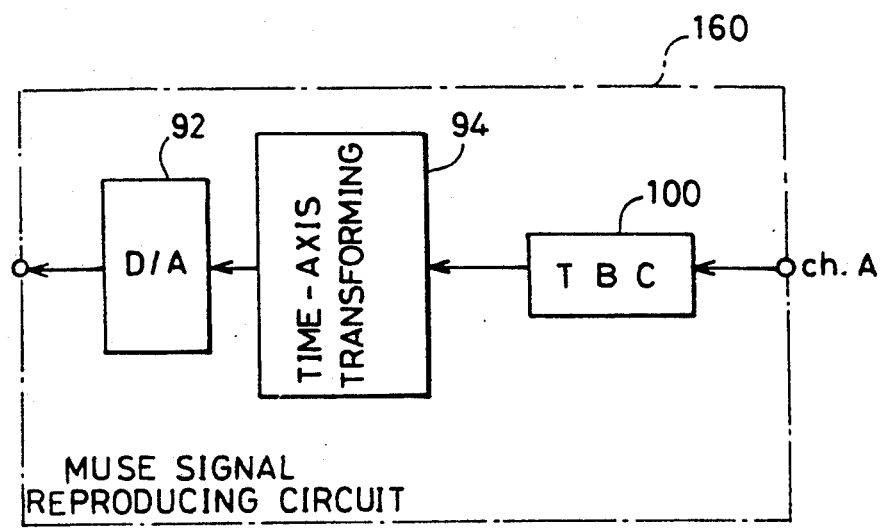
FIG. 38 is a block diagram of a MUSE signal reproducing circuit of the second preferred embodiment of the present invention.

Referring to FIG. 38, the MUSE signal reproducing circuit 160 according to this preferred embodiment includes a TBC circuit 100 receiving a channel A signal from the FM demodulator 76 through the switch 74 for correcting the time base error; a time-axis transforming circuit 94 for performing transformation reverse to the time-axis transforming process as shown in FIGS. 7 and 8 to the MUSE signal; and a D/A converter 92 for D/A converting the output of the time-axis transforming circuit 94 to provide the same as an analog MUSE signal. As easily seen by comparing FIGS. 38 and 26, the MUSE signal reproducing circuit 160 according to this embodiment has a much simpler structure compared to that of the MUSE signal reproducing circuit 72 of the first embodiment.

Figure 39:
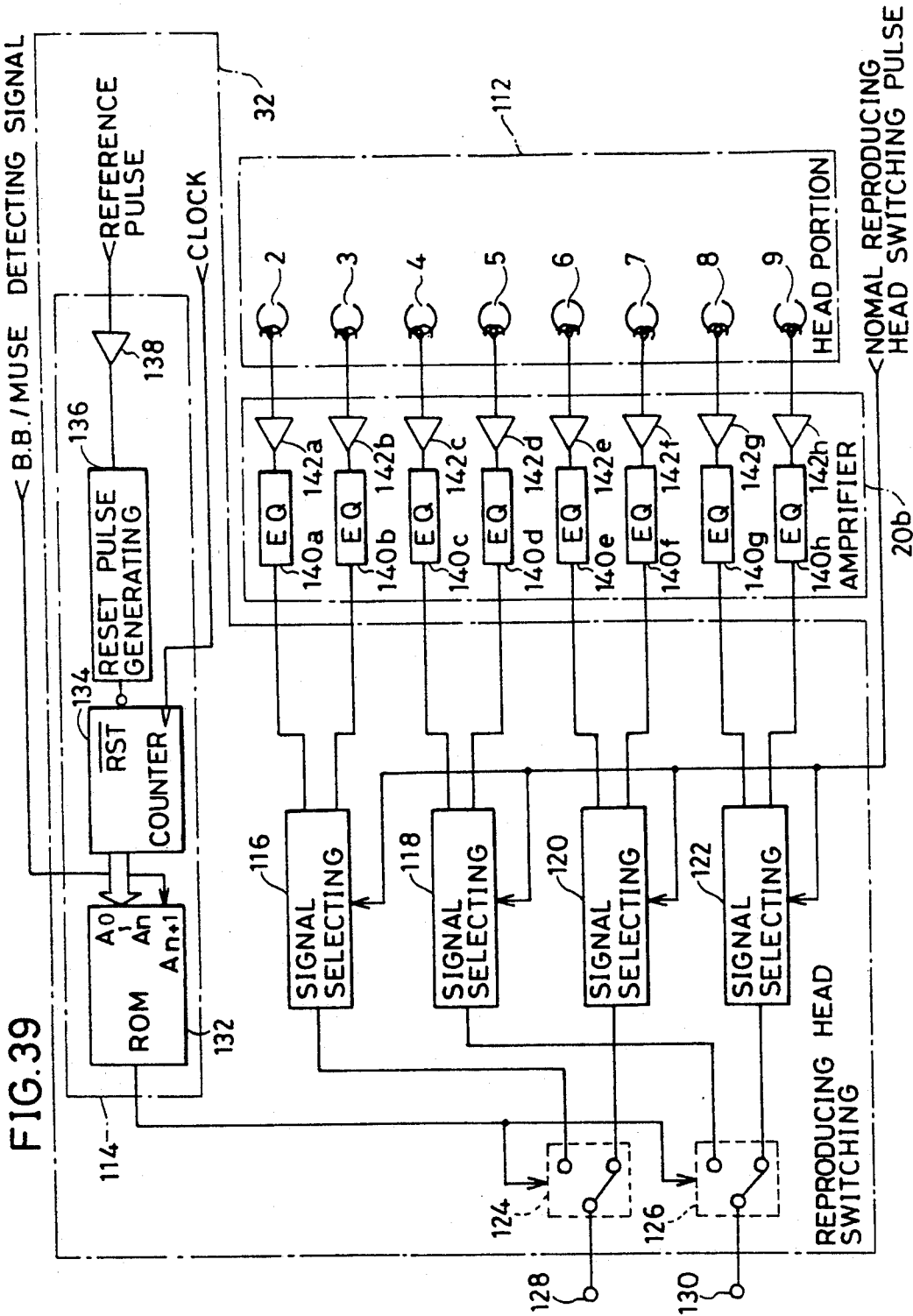
FIG. 39 is a block diagram of a reproducing head switching circuit.

Referring to FIG. 39, the head portion 112 includes rotary heads 2-9. The reproducing amplifier system 20b includes amplifiers 142a-142h connected to the rotary heads 2-9, respectively, for amplifying the signals picked up by the rotary heads; and equalizers 140a-140h connected to the amplifiers 142a-142h, respectively, for equalizing the amplified signals.

The reproducing head switching circuit 32 includes a circuit 114 for generating a head switching signal indicating timing for head switching; a signal selecting circuit 116 connected to the equalizers 140a, 140b, in response to a normal reproduction head switching pulse indicating timing for head switching of normal reproduction supplied from a timing signal generating circuit not shown, for selecting and providing one of outputs of the equalizers 140a, 140b according to the type of the baseband/MUSE signals; a signal selecting circuit 118, 120, 122, having their inputs connected to the equalizers 140c and 140d, the equalizers 140e and 140f, equalizers 140g and 140h, respectively, as well, for selecting and providing one of two signals provided according to the operational mode; a switch 124, having its one input terminal connected to the signal selecting circuit 116 and the other connected to the signal selecting circuit 120, in response to the head switching signal supplied from the circuit 114, for selecting and providing one of the outputs of the signal selecting circuits 116 and 120 to the output terminal 128; and a switch 126, having its one input terminal connected to the signal for selecting circuits 118 and the other connected to the signal selecting circuit 122, in response to the head switching signal, for selecting one of outputs of the circuits 118 and 122 to provide the same to the output terminal 130. The output terminals 128, 130 are connected to the channel A input terminal and the channel B input terminal of the FM demodulator 76 in FIG. 24.

The circuit 114 includes an amplifier 138 receiving and amplifying a reference pulse generated once for every rotation of the rotary drum 1; a reset pulse generator 136, in response to the output of the amplifier 138, for generating a reset pulse for resetting a counter described below; a counter 134, being reset in response to the reset pulse from the reset pulse generator 136, for generating an address signal of a ROM described below by counting clocks provided from a timing signal generating circuit not shown; and a ROM 132 receiving a baseband/MUSE detecting signal from the mode designating circuit 18 at the most significant bit of the input address, receiving the address signal from the counter 134 at other bits of the input address, for generating a head switching signal for operating the switches 124, 126 according to the type of signals and the operational mode in response to the provided address signal.

Figure 39A:
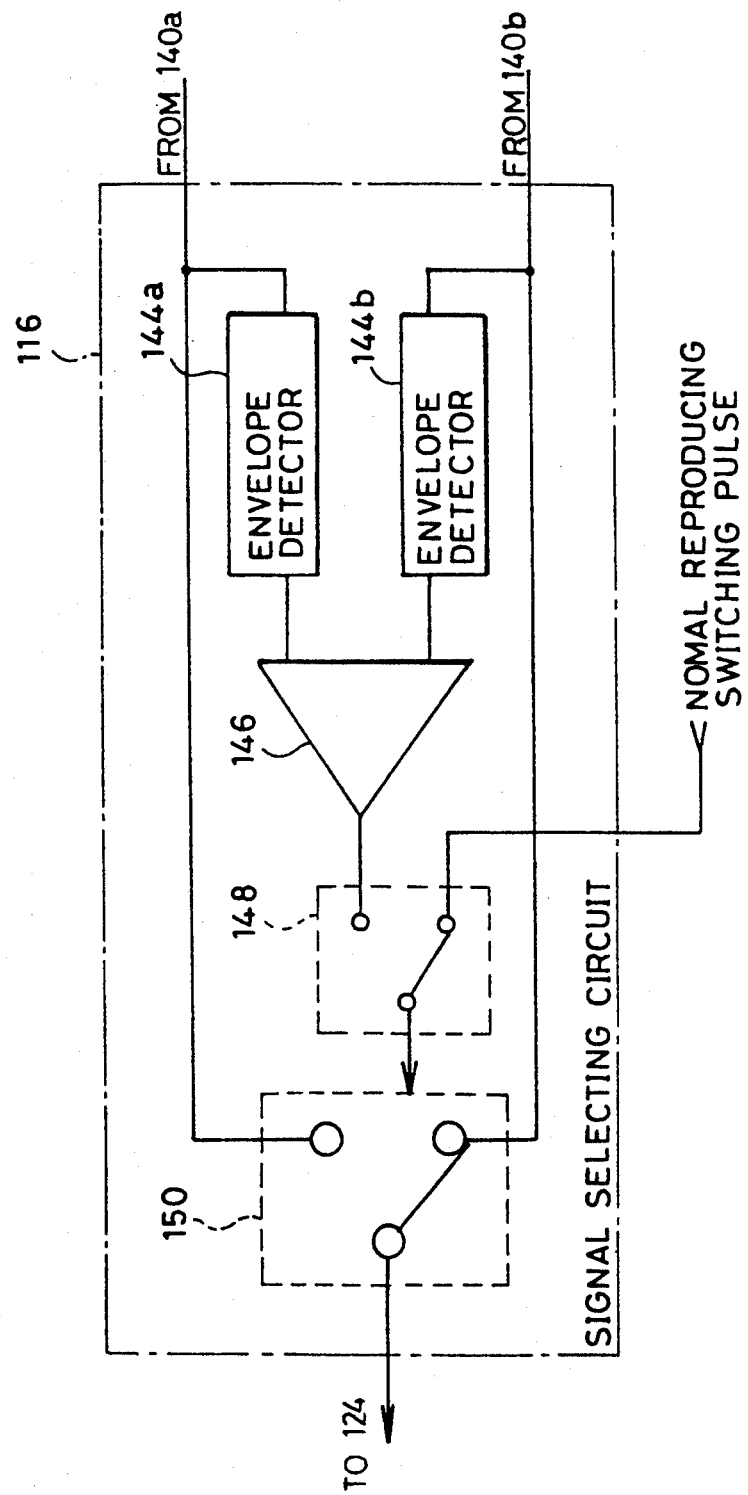
FIG. 39A is a block diagram of a signal selecting circuit.

The signal selecting circuits 116-122 have the same structures. Referring to FIG. 39A, the signal selecting circuit 116 includes an envelope detector 144a connected to an output of the equalizer 144a for detecting the level of the output signal of the equalizer 140a; an envelope detector 144b connected to the output of the equalizer 140b for detecting the level of the output signal of the equalizer 140b; a comparator 146 having its inputs respectively connected to the envelope detectors 144a, 114b for outputting a selecting signal for determining which equalizer output to be selected by comparing the magnitudes of the two inputs; a selector 148 having its one input connected to an output of the comparator 146 and having the other input supplied with a normal reproducing head switching pulse for selecting and providing one of inputs according to the operational mode; and a switch 150 having its one input connected to the output of the equalizer 140a and the other connected to the output of the equalizer 140b, controlled by the selector 148, for selecting and providing one of the inputs.

This apparatus operates as follows. The baseband signal recording process of this apparatus is the same as that of the first preferred embodiment. Therefore, the description thereof is not repeated here.

(1) Baseband signal reproduction

The reproducing head switching circuit 32 reproduces the baseband signal as described below. The system for reproducing the baseband signal other than the circuit 32 is the same as that of the first preferred embodiment. The description below concerns only to the operation of the reproducing head switching circuit 32.

(a) Normal reproduction

The reproducing head switching circuit 32 is connected to the reproducing amplifier system 20b. The circuit 32 is supplied with a signal which indicates the baseband signal reproduction and a signal which indicates the reproduction at a normal speed.

Referring to FIG. 39, the baseband/MUSE detecting signal is provided to the most significant bit $A_{n-1}$ of the input of the ROM 132. The reference pulse is supplied to the reset pulse generating circuit 136 every revolution of the rotary drum 1. The reset pulse generating circuit 136 generates a reset pulse for resetting the counter 134 in response to the reference pulse and provides the same to the counter 134.

The counter 134, after reset by the reset pulse, counts the supplied clocks and provides an input address signal of the ROM 132. The ROM 132, in response to the address signal supplied from the counter 134 and the baseband/MUSE detecting signal, in the case of this example, generates a head switching signal for reproducing the baseband signal and provides it to the switches 124 and 126.

Referring to FIG. 39A, the selector 148 of the signal selecting circuit 116, in response to the signal indicating a normal reproduction supplied from the mode designating circuit 18, selects the normal reproduction head switching pulse and controls the switch 150 with this pulse. Accordingly, the switch 150 of the signal selecting circuit 116 operates according to the normal reproduction head switching pulse.

The hand switching pulse however, fixes the switch 150 such that only the reproduced signal from the equalizer 140a is outputted from the signal selecting circuit 116, because only the rotary head 2 should be selected in the case of normal reproduction of basebound signals. As a result, the output of the rotary head 2 is always selected and provided to the switch 124 in the normal reproduction.

The signal selecting circuits 118, 120, 122 also operate similarly to the signal selecting circuit 116. That is to say, the signal selecting circuit 18 provides the output of the rotary head 4 to the switch 126. The signal selecting circuit 120 provides the output of the rotary head 6 to the switch 124. The signal selecting circuit 122 provides the output of the rotary head 8 to the switch 126.

The switches 124 and 126, in response to the head switching pulse for baseband signal reproduction supplied from the circuit 114, supplies one of outputs of the rotary heads 2, 6 and rotary heads 4, 8 to the output terminals 128, 130, respectively. Therefore, the channel A signal as a single-system signal in which the signals reproduced by the heads 2 and 6 are combined is provided to the terminal 128. The channel B signal as a single-system signal in which the signals picked up by the heads 4 and 8 are combined is provided to the terminal 130.

The subsequent process of the channel A and B signals formed as described above is the same as that in the first embodiment. Therefore, the detailed description thereof will not be repeated here.

(b) High speed reproduction

Referring to FIG. 39, the baseband/MUSE detecting signal which indicates the baseband signal process is supplied to the most significant bit $A_{n-1}$ of the address of the ROM 132. The switches 124 and 126, in response to the head switching signal provided from the ROM 132, switch the signals provided from the respective heads and provide them as channel A and B signals to the FM demodulator 76 of the reproducing process circuit 28 (FIG. 24) through the terminals 128 and 130.

Referring to FIG. 39A, the selector 148, in response to the normal/high speed reproduction instructing signal, selects an output of the comparator 146 and controls the switch 150 thereby. The two signals provided to the comparator 146 are signals picked up by the rotary heads 2 and 3 and envelope-detected by the envelop detectors 144a and 144b, respectively. The comparator 146 compares the input signals and provides the result to the selector 148. Accordingly, the switch 150, controlled by the selector 148, selects an output from a head with a larger level and provides it to the switch 124 of FIG. 39.

The signal selecting circuits 118, 120 and 122 also operate similarly to the signal selecting circuit 116. That is to say, the signal selecting circuit 118 selects a signal with a larger level out of the signals respectively reproduced by the rotary heads 4 and 5, and supplies it to the switch 126. The signal selecting circuit 120 selects a signal with a larger level out of the signals picked up by the rotary heads 6 and 7 and provides it to the switch 124. The signal selecting circuit 122 selects a signal with a larger level out of the signals picked up by the rotary heads 8 and 9, and provides it to the switch 126.

(c) Reproduced baseband signals

FIGS. 40 (a)-(h) are schematic diagrams showing waveforms of signals supplied to the respective rotary heads 2-9 in baseband signal recording in a top to bottom order. In normal reproduction, each signal is reproduced by the same head that recorded it. Therefore, the normally reproduced signal waveforms, as shown in FIGS. 41 (a)-(h), have the same waveforms as those of the recorded signals.

In high speed reproduction, in departure from normal reproduction, the speed of the magnetic tape 10 is high. On the other hand, the rotation speed of the rotary drum 1 is maintained at the same speed as that of normal reproduction. In the following, a case where the running speed of the magnetic tape is selected to be twice that in normal production.

As the rotary drum 1 rotates at the same speed as that in normal reproduction and the magnetic tape 10 runs at a two fold speed, each of the rotary heads scans a larger number of tracks during one revolution of the rotary drum 1 than in the normal reproduction. These respective tracks have been alternately recorded by the rotary heads 2 and 4 (or the rotary heads 6 and 8). As the rotary heads 2 and 6 have a positive azimuth angle and the rotary heads 4 and 8 have an azimuth angle opposite to that, as described above, the adjacent tracks can be recorded on the magnetic tape with a high density without a guardband. On the other hand, in high speed reproduction of the baseband signal, the waveforms of signals provided by respective rotary heads are such those shown in FIG. 42 as the respective rotary heads have the above-described azimuth angles.

Referring to FIG. 42 (a), the signal level reproduced by the rotary head 2 is high when the channel of the signal has been recorded by the same head 2, and is low when the scanned channel of the signal has been formed by the rotary head 4 because of the difference in their azimuth angles. Referring to FIG. 42 (b), as the rotary head 3 has an azimuth angle opposite to that of the rotary head 2, the size of the signal reproduced by that has a complementary relationship to that of the signal reproduced by the rotary head 2.

Referring to FIG. 39A, as described above, the switch 150 of the signal selecting circuit 116 selects a larger one of the two signal provided and outputs the same to the switch 124 (FIG. 24). Therefore, the signal provided by the signal selecting circuit 116, as shown in FIG. 42 (b-2), becomes a signal in which signals picked up by the rotary heads 2 and 3 are alternately combined.

Similarly, the signals reproduced by the rotary heads 4 (FIG. 42 (c)) and 5 (FIG. 42 (d)) are alternately combined to be a signal shown in FIG. 42 (d-2).

In a 0.1 head system (the subtrack forming heads), the same process as that in a one head system (the maintrack forming heads) in which a main track is formed is also performed. That is to say, only portions with a large level of the outputs of the rotary heads 6 and 7 (FIGS. 42 (e), (f)), are combined to be a signal shown in FIG. 42 (f-2). Similarly, the signals reproduced by the rotary heads 8 and 9 (FIGS. 42 (g), (h) compose a signal shown in FIG. 42 (h-2).

The above-mentioned signals shown in FIGS. 42 (b-2), (d-2), (f-2) and (h-2) are provided from the respective signal selecting circuits 116, 118, 120 and 122, and supplied to the corresponding input terminals of the switches 124 and 126.

The switch 124, in response to the head switching signal supplied from the circuit 114, combines the output signals of the circuits 116 and 120 to provide them as a channel A signal. Similarly, the switch 126 combines signals provided from the circuits 118 and 122 and supplies them as a channel B signal.

The following process is the same as that in the previously described first preferred embodiment. Therefore, the detailed description thereof will not be repeated here.

(2) MUSE signal

(A) Recording

When the MUSE signal recording is selected, referring to FIGS. 35–39A, the apparatus operates as describe below. The MUSE signal supplied to the MUSE signal processing circuit 158 is digitized by the A/D converter 60 and supplied to the time-axis-transforming circuit 62 and the synchronization separating circuit 68. The synchronizing signal separated in the synchronization separating circuit 68 is supplied to the timing signal generating circuit 42 to be employed for generating a required timing signal.

The time-axis-transforming circuit 62 performs time-axis-transforming process to the MUSE signal as already described referring to FIGS. 7 and 8, and supplies the transformed signal to the negative synchronizing signal applying circuit 64. The MUSE signal with a negative synchronous signal added by the circuit 64 becomes a transformed MUSE signal as shown in FIG. 7 (b), and is supplied only to the channel A of the D/A converter 44 through the switch 38.

FIG. 43 simply shows extracted circuits subsequent to the FM demodulator 46. Referring to FIG. 43, a signal indicating a recording mode is previously supplied to the switch 110. The switch 110 connects the recording head switching circuit 30 and the rotary heads 2, 3, 6 and 7.

The MUSE signals demodulated by the FM demodulator 46 are alternately assigned to the pair of the rotary heads 2 and 6 or 3 and 7 for every field by the head switching circuit 30. The pair of the rotary heads 2 and 6 or 3 and 7 alternately form tracks according to the "1.1 head system" on the magnetic tape 10 for every rotation of the rotary drum 1.

It should be noted that the signals supplied to the rotary heads 3 and 7 are not delayed at all in this second preferred embodiment. The tracks formed on the magnetic tape 10 by the rotary heads 3 and 7 are displaced by a portion corresponding to the phase difference in the arrangement of the rotary heads 2 and 3 from the tracks formed by the rotary heads 2 and 6. That is, as a result of scanning by the rotary heads 2, 3, 6 and 7, the zigzag format as shown in FIGS. 34 and 34A is formed.

(B) Reproduction

(a) Normal reproduction

In normally reproducing the signal recorded with a track pattern of the zigzag format, the apparatus operates as follows. A signal instructing reproduction is supplied to the switch 110 in advance, which connects the rotary heads 2, 3, 6 and 7 and the reproducing head switching circuit 32.

As the rotary drum 1 rotates, the pair of the rotary heads 2 and 6 and the pair of the rotary heads 3 and 7 alternately reproduce signals for every field according to the "1.1 head system" and supply them to the reproducing head switching circuit 32. In this case, it should be noted that the signals recorded according to the zigzag system are alternately reproduced by the respective pairs of the rotary heads 2 and 6 and the rotary heads 3 and 7. The signal reproduced by the rotary heads 3 and 7 has no phase difference to the signal reproduced by the rotary heads 2 and 6.

As shown in the portions with oblique lines b2, b4 of FIG. 34A, it is because the track format is displaced by a distance corresponding to the phase difference between the rotary heads 2 and 3 for every field. As the recording starting points are previously advanced, the reproduced signal has no phase delay.

The reproducing head switching circuit 32 combines the signals picked up by the rotary heads 2, 3, 6 and 7 to produce a signal as a single-system as follows and provides it to the FM demodulator 76.

Referring to FIG. 39, the baseband/MUSE detecting signal is supplied to the most significant bit $A_{n-1}$ of the address of the ROM 132. The ROM 132 generates a head switching signal for MUSE signal reproducing process, and supplies the same to the switches 124 and 126.

Referring to FIG. 39A, the selector 148, in response to the normal/high speed designating signal, selects the normal reproducing head switching pulse and controls the switch 150 with the same. The switch 150, in response to the normal reproducing head switching pulse, switches the signals from the heads 2 and 3 and provides it to an input terminal of the switch 124 shown in FIG. 39.

The signal selecting circuits 118, 120 and 122 also operate in a manner similar to the signal selecting circuit 116. However, when the MUSE signal is normally reproduced, the signal selecting circuits 118 and 122 do not operate in practice, as only the signals picked up by the heads 2, 3, 6 and 7 are employed for reproduction. Both of the outputs of the signal selecting circuits 118 and 122 are provided to the switch 126, and the output of the switch 126 is not used.

To the switch 124, the signals picked up by the heads 2 and 3 switched in the signal selecting circuit 116 and the signals picked up by the heads 6, 7 switched by the signal selecting circuit 120 are provided. The switch 124, in response to the head switching signal supplied from the circuit 114, in an order of the rotary heads 2, 6, 3, 7, connects the signals reproduced by the respective rotary heads to unify them into a single-system signal and provides it to the FM demodulator 76 through the terminal 128.

In FIG. 44 (a), a waveform of a field switching signal indicating timing for field switching is shown. In FIG.

44 (b), a schematic waveform of a MUSE signal synchronous to this field switching signal is shown. By dividing the MUSE signal into two groups of signals shown in FIG. 44 (c), (d) in synchronization with the field switching signal and by providing it to the rotary heads 2, 6, 3, 7, the MUSE signal is recorded. As described above, by reproducing the recorded signal in its original form by the rotary heads 2, 3, 6 and 7, without requiring any delay process, the signals shown in FIG. 44 (c) and FIG. 44(d) can be obtained from the pair of rotary heads 2, 6 and the pair of the rotary heads 3, 7, respectively. The head switching circuit 32 can produce the same signal as the original, as shown in FIG. 44 (e), by combining these two signals in synchronization with the field switching signal.

The signal supplied to the FM demodulator 76 is demodulated therein and is supplied to the TBC circuit 100. The TBC circuit 100 corrects the time base error of the provided signal and outputs it to the output terminal 156. The MUSE signal supplied to the output terminal 156, referring to FIG. 44, is supplied to the time-axis-transforming circuit 94. The circuit 94 produces a duplicate of the original signal by performing transforming process to the inputted MUSE signal reverse to that in recording, and provides it to the D/A converter 92. The D/A converter 92 converts the signal provided by the time-axis-transforming circuit 94 and provides it as an analog MUSE signal.

(b) High speed reproduction

When reproducing the signal recorded with the zigzag format track pattern at a high speed, the apparatus operates as described below. As the operation is characterized by head switching, only FIGS. 39 and 39A are referred to in the following.

Referring to FIG. 39, the baseband/MUSE detecting signal which indicates MUSE signal process is supplied to the most significant bit $A_{n-1}$ of the addresses of the ROM 132. The switch 124, in response to the head switching signal provided from the ROM 132, switches the signals provided from the respective heads and provides it as a channel A signal to the FM demodulator 76 of the reproducing process circuit 28 (FIG. 24) through the terminal 128. The output of the switch 126 is not used.

Referring to FIG. 39A, the selector 148, in response to the normal/high speed reproduction instructing signal, selects the output of the comparator 146, and thereby controls the switch 150. The two signals provided to the comparator 146 are signals picked up by the rotary heads 2 and 3 and envelope-detected by the envelop detectors 144a and 144b, respectively. The comparator 146 compares the input signal and provides the result thereof to the selector 148. Therefore, the switch 150 is controlled by the selector 148, selects an output from a head with a larger level of a picked up signal, and provides it to the switch 124 shown in FIG. 39.

The signal selecting circuit 120 also operates similarly to the signal selecting circuit 116. That is, the signal selecting circuit 120 selects a signal with a larger level out of the signals picked up by the rotary heads 6 and 7 and provides the same to the switch 124.

The switch 124 switches the signals provided from the signal selecting circuits 116 and 120 with timing for high speed reproduction and compose a signal as a single-system, and provides the same to the FM demodulator 76.

(c) Reproduced MUSE signal

FIGS. 45 (a)-(h) in a top to bottom order, are schematic diagrams showing the waveforms of signals supplied to the respective rotary heads 2-9 in MUSE signal recording. In normal reproduction, each of the signals is reproduced by the same head as that recorded the same signals. Therefore, the normally reproduced signal waveforms, as shown in FIGS. 46 (a)-(h), have the same waveforms as those of recorded signals.

In high speed reproduction, different from normal reproduction, the magnetic tape 10 runs at a high speed. On the other hand, the rotation speed of the rotary drum 1 is maintained at the same speed as that in normal reproduction. In the following, a case where the running speed of the magnetic tape 10 is selected to be twice that in the normal case.

Similarly to high speed reproduction of the baseband signal, in MUSE signal high speed reproduction, the waveforms of the signals provided by the respective rotary heads are such as shown in FIG. 47, as the respective rotary heads have the above-described azimuth angles.

Referring to FIG. 47 (a), the signal level reproduced by the rotary head 2 is high when the head 2 reproduces a signal of channel formed by the head 2, and is low when the head 2 scans a signal of a channel formed by the rotary head 3 because of the difference of azimuth angles. Referring to FIG. 47 (b), as the rotary head 3 has an azimuth angle opposite to that of the rotary head 2, the level of signal reproduced by the head 3 has a complementary relationship to that of signal reproduced by the rotary head 2.

Referring to FIGS. 39A, as described above, the switch 150 of the signal selecting circuit 116 selects a larger one out of the provided two signals and output the same to the switch 124 (FIG. 24). The signal provided by the signal selecting circuit 116, as shown in FIG. 47 (b-2), is a signal in which signals picked up by the rotary heads 2 and 3 alternately appear.

On the other hand, the signals picked up by the rotary heads 4 and 5 are not used in the subsequent process. In FIGS. 47 (c), (d), the output signals of the rotary heads 4 and 5 are assumed not to exist.

Also in the 0.1 head system, the same process is performed. That is, only portions with larger level of the outputs of the rotary heads 6 and 7 (FIG. 47 (e), (f)) are combined and form a signal shown in FIG. 47 (f-2).

The signals reproduced by the heads 8 and 9 (FIGS. 47 (g), (h)) are not employed in the subsequent process.

The above-mentioned signals shown in FIGS. 47 (b-2) (f-2) are provided from the signal selecting circuit 116 and 120, respectively, and are provided to the corresponding input terminals of the switch 124.

The switch 124, in response to the head switching signal supplied from the circuit 114, combines output signals of the signal selecting circuit 116 and 120 and provides the same as a single system signal to the channel A. The outputted signal is formed of portions with sufficient levels of the signals picked up by the rotary heads 2, 3, 6 and 7. By performing the same process as that in normal reproduction to the signal obtained in the channel A, a high-speed reproduced MUSE signal can be obtained.

As has been described above, in the apparatus for recording video signals according to the second preferred embodiment, the circuit for recording and reproducing the MUSE signal is much simpler than that shown in the first preferred embodiment. Especially, e.g., in a household apparatus, by employing the zigzag format, the apparatus can be simplified and decreased in cost.

In the second preferred embodiment, the phase difference between the rotary heads 2 and 3 is 5.12°, which corresponds to 8H of the MUSE signal. However, the difference is not limited thereto, and an apparatus which functions similarly to the above-described second preferred embodiment can be obtained with different phase differences between positions at which the rotary heads 2 and 3 are provided, although the form of zigzag format on the tape should be varied.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for selectively recording on a recording medium a first signal having a first frequency bandwidth and a second signal having a second frequency bandwidth narrower than said first frequency bandwidth, and for reproducing at different speeds said first or second signal recorded on said recording medium, comprising:
   magnetic head means including first and second separate head portions,
   each head portion including four rotary heads for scanning said recording medium successively and helically, for selectively recording said first and second signals, respectively, on said recording medium, and for reproducing said signal recorded on said recording medium,
   means for providing a mode designating signal for designating operational modes of said apparatus;
   signal processing means for processing one of said first and said second signals in response to said mode designating signal;
   head switching means, in response to said mode designating signal, for switching a connection between said signal processing means and each of said rotary heads; and
   scanning speed adjusting means for adjusting relative speed of scanning of said recording medium by said rotary heads in response to said mode designating signal.

2. The apparatus according to claim 1, wherein
   both of said first and second signals include video signals having a plurality of frame periods defining a frame,
   each of said frame period includes two field periods,
   each of said rotary heads is provided to rotate around a common rotation axis, and
   said relative scanning speed is selected so that a length corresponding to said one field period on said recording medium is scanned by one revolution of said rotary heads.

3. The apparatus according to claim 2, wherein
   each of said head portions includes first, second, third and fourth rotary heads,
   each of said first, second, third and fourth rotary heads of said second head portion is paired with said first, second, third and fourth rotary heads of said first head portion, respectively, and
   said respective paired two rotary heads are provided having a predetermined phase difference from each other with respect to said rotation axis.

4. The apparatus according to claim 3, wherein said predetermined phase difference is 180°.

5. The apparatus according to claim 4, wherein
   said first and second signals have a predetermined common frame-frequency,
   each of said frames of said first and second signals have a predetermined common integral number of horizontal scanning lines,
   said second rotary head of said first head portion has a predetermined first phase difference in relation to said first rotary head of said first head portion, and
   said fourth rotary head of said first head portion has said first phase difference in relation to said third rotary head of said first head portion.

6. The apparatus according to claim 5, wherein
   each of said field periods of said first and second signals includes a predetermined plurality of horizontal scanning periods,
   said third rotary head of said first head portion is provided having a predetermined second phase difference in relation to said first rotary head of said first head portion, and
   said first and second phase differences are selected so that a positive integral number of said horizontal scanning periods of said first and second signals are recorded by scanning performed during a time corresponding to each of said phase differences.

7. The apparatus according to claim 6, wherein each of said rotary heads of said second head portion is provided having a displacement of a predetermined distance in a longitudinal direction crossing a direction of said scanning in relation to respective corresponding heads of said rotary heads of said first head portion.

8. The apparatus according to claim 7, wherein a position of said third rotary head is selected so that said third rotary head form a locus of scanning adjacent to a track on said magnetic recording medium scanned by said first rotary head in one revolution of said rotary heads.

9. The apparatus according to claim 8, wherein the position of said second rotary head is selected so that said second rotary head forms a second scanning locus adjacent to a first scanning locus formed on said recording medium by said first rotary head during a preceding revolution of said rotary heads, said second scanning locus being formed by said second rotary head during a succeeding revolution of said rotary heads.

10. The apparatus according to claim 9, wherein
    in said first head portion said first rotary head has a predetermined first azimuth angle,
    said second and third rotary heads have a common second azimuth angle opposite in phase to said first azimuth angle, and
    said fourth rotary head has said first azimuth angle.

11. The apparatus according to claim 10, wherein
    in said second head portion, said first rotary head has a predetermined third azimuth angle,
    said second and third rotary heads have a common fourth azimuth angle opposite in phase to said third azimuth angle, and
    said fourth rotary head has said third azimuth angle.

12. The apparatus according to claim 11, wherein said first azimuth angle and said third azimuth angle are equal to each other.

13. The apparatus according to claim 12, wherein said second azimuth angle is equal to said fourth azimuth angle.

14. The apparatus according to claim 13, wherein said signal processing means comprises:
   a first signal processing means for processing said first signal;
   a second signal processing means for processing said second signal; and
   means for selecting and operating one of said first and second signal processing means responsive to said mode designating signal.

15. The apparatus according to claim 14, wherein said first signal processing means comprises:
   first signal dividing means connected to receive said first signal for transforming said first signal for every field into divided signals of two channels including first and second channels,
   each of said divided signals having a third frequency bandwidth narrower than said first frequency bandwidth, respectively, and being to be recorded on said recording medium separately,
   first signal reproducing means for transforming said divided signals of two channels, including said first and second channel reproduced from said recording medium by said rotary heads, into said first signal as a single-system signal and outputting the same, and
   means, responsive to said mode designating signal, for selecting and operating one of said first signal dividing means and said first signal reproducing means.

16. The apparatus according to claim 15, wherein said second signal processing means comprises:
   second signal transforming means for transforming said second signal into one channel transformed signal having a bandwidth not more than said third frequency bandwidth and recorded on said recording medium,
   one field period of said transformed signal coinciding with one field period of said first signal;
   second signal reproducing means for reconstructing said second signal from said one channel transformed signal reproduced by said magnetic head means from said recording medium; and
   means, responsive to said mode designating signal, for selecting and operating one of said second signal transforming means and said second signal reproducing means.

17. The apparatus according to claim 16, wherein said head switching means comprises:
   first selecting means connected to said first signal processing means for selecting a plurality of said pairs said rotary heads and for switching the same in response to said mode designating signal in order to record/reproduce divided signals of said first and second channels,
   second selecting means connected to said second signal processing means for selecting a plurality of said pairs of said rotary heads, and for switching the same to record/reproduce said transformed signal, and
   means for selecting and operating one of said first and second selecting means in response to said mode designating signal.

18. The apparatus according to claim 17, wherein said operational modes include a recording mode for recording said signal, a first reproducing mode for reproducing said recorded signal at a first speed, and a second speed reproducing mode for reproducing said recorded signal at a second speed higher than said first speed, for each of said first signal processing and said second signal processing.

19. The apparatus according to claim 18, wherein said first selecting means comprises:
   means for selecting a pair of said first rotary heads and a pair of said third rotary heads when said recording mode or said first reproducing mode is designated, and for switching each of said selected rotary heads so that in one revolution of said rotary heads, said pair of said first rotary heads is employed in recording and reproducing said first channel divided signals and that said pair of said third rotary heads is employed in recording and reproducing said second channel divided signals, and
   means for selecting all of said pairs of said rotary heads to be used when said second speed reproducing mode is selected.

20. The apparatus according to claim 19, wherein said first signal processing means further comprises phase difference compensation means for compensating said second phase difference.

21. The apparatus according to claim 20,
   wherein said phase difference compensation means comprises first delay means for delaying said second channel divided signal supplied to said third rotary head by a period corresponding to said second phase difference, whereby
   said first and second channels of said divided signals to be recorded on said recording medium are recorded in the same phase.

22. The apparatus according to claim 21, wherein said phase difference compensation means further comprises second delay means for delaying said first channel divided signal by a period corresponding to said second phase difference in order to compensate a phase difference occurring between said first and second channel divide signals, recorded on the same track on said recording medium in the same phase, during reproduction by said first rotary head and said third rotary head, respectively.

23. The apparatus according to claim 18, wherein said second selecting means comprises means for selecting said pair of said first rotary heads and said pair of said second rotary heads when said second signal processing is selected, and for switching said pair of said first rotary heads and said pair of said second rotary heads for every field.

24. The apparatus according to claim 23,
   wherein said second signal transforming means comprises phase difference compensation means for compensating a phase difference occurring between said transformed signal recorded by said first rotary head and said transformed signal recorded by said second rotary head on said recording medium, due to said first phase difference, whereby
   said transformed signal is recorded in the same phase on said recording medium by said first and second rotary heads.

25. The apparatus according to claim 24, wherein said phase difference compensating means comprises:
   delayed signal generating means for generating a delayed signal delayed by a period corresponding to said first phase difference with respect to said transformed signal, and
   distributing means for distributing said transformed signal to said first rotary head and said delayed signal to said second rotary head.

26. The apparatus according to claim 23, wherein
said first rotary head and said second rotary head, in response to a selection of said second signal reproducing mode, successively reproduce said one channel transformed signal track by track recorded on said recording medium,
the signal reproduced by said second rotary head is delayed in phase by a period corresponding to said first phase difference from the signal reproduced by said first rotary head, and
said second signal reproducing means further comprises delay means for delaying the signal reproduced by said first rotary head by a period corresponding to said first phase difference.

27. The apparatus according to claim 23, further comprising guiding means for guiding said recording medium around said magnetic head means so that scanning within one revolution of said rotary head can be performed during a time period which exceeds the length of time corresponding to said first phase difference plus one field period on said recording medium.

28. The apparatus according to claim 3, wherein said speed adjusting means comprises recording medium driving means for running said recording medium at a predetermined first speed in the case where one of said operational mode in processing said first signal is designated, said first speed being twice as large as a speed of said recording medium selected in the case where corresponding one of said mode in processing said second signal is designated.

* * * * *